US008551341B2

(12) United States Patent (10) Patent No.: US 8,551,341 B2
Conner et al. (45) Date of Patent: Oct. 8, 2013

(54) SUSPENDED MEDIA MEMBRANE BIOLOGICAL REACTOR SYSTEM INCLUDING SUSPENSION SYSTEM AND MULTIPLE BIOLOGICAL REACTOR ZONES

(75) Inventors: William G. Conner, Dhahran (SA); Mohammed A. Al-Hajri, Dhahran (SA); Thomas E. Schultz, Waukesha, WI (US); Michael Howdeshell, Ringle, WI (US); Chad L. Felch, Mosinee, WI (US); Matthew Patterson, Ringle, WI (US); Samuel Shafarik, Wausau, WI (US); Curt Cooley, Wausau, WI (US)

(73) Assignees: Saudi Arabian Oil Company, Dhahran (SA); Siemens Energy, Inc., Orlando, FL (US)

( * ) Notice: Subject to any disclaimer, the term of this patent is extended or adjusted under 35 U.S.C. 154(b) by 369 days.

(21) Appl. No.: 12/816,160

(22) Filed: Jun. 15, 2010

(65) Prior Publication Data

US 2011/0017664 A1 Jan. 27, 2011

Related U.S. Application Data

(60) Provisional application No. 61/224,000, filed on Jul. 8, 2009, provisional application No. 61/186,983, filed on Jun. 15, 2009.

(51) Int. Cl.
 *C02F 3/00* (2006.01)
(52) U.S. Cl.
 USPC ......... 210/739; 210/767; 210/800; 210/198.1
(58) Field of Classification Search
 USPC ................. 210/614–618, 620, 739, 767, 800, 210/198.1
 See application file for complete search history.

(56) References Cited

U.S. PATENT DOCUMENTS 3,776,853 A 12/1973 Minter
3,966,599 A * 6/1976 Burkhead ..................... 210/618

(Continued)

FOREIGN PATENT DOCUMENTS

CN 1098815 C 1/2003
CN 1490263 A 4/2004

(Continued)

OTHER PUBLICATIONS

International Search Report and Written Opinion, PCT/US08/13987, Mar. 19, 2009.

(Continued)

*Primary Examiner* — Chester Barry
(74) *Attorney, Agent, or Firm* — Abelman, Frayne & Schwab

(57) ABSTRACT

A wastewater treatment system is provided comprising a biological reactor having a separation subsystem, a suspension system and a membrane operating system. The separation subsystem is constructed and arranged to maintain adsorbent material in the biological reactor with a mixed liquor. The suspension system is positioned in the biological reactor and is constructed and arranged to maintain adsorbent material in suspension with mixed liquor. The membrane operating system is located downstream of the biological reactor and is constructed and arranged to receive treated mixed liquor from the biological reactor and discharge a membrane permeate. In addition, a wastewater treatment system is provided comprising a first biological reaction zone, a second biological reaction zone and a membrane operating system. The first biological reaction zone is constructed and arranged to receive and treat the wastewater. The second biological reaction zone includes a separation subsystem and is constructed and arranged to receive effluent from the first biological reaction zone. A suspension system for adsorbent material is provided in the second biological reaction zone. The membrane operating system is located downstream of the second biological reaction zone and is constructed and arranged to receive treated wastewater from the second biological reaction zone and discharge a membrane permeate.

51 Claims, 26 Drawing Sheets

(56) References Cited

U.S. PATENT DOCUMENTS

| | | |
|---|---|---|
| 4,221,695 A | 9/1980 | Hino et al. |
| 4,265,747 A | 5/1981 | Copa et al. |
| 4,371,454 A | 2/1983 | Hisatsugu et al. |
| 4,495,056 A | 1/1985 | Venardos et al. |
| 4,563,277 A * | 1/1986 | Tharp .................... 210/220 |
| 4,623,464 A | 11/1986 | Ying et al. |
| 4,626,354 A | 12/1986 | Hoffman et al. |
| 4,656,153 A | 4/1987 | Wennerberg |
| 4,749,492 A | 6/1988 | Berrigan, Jr. et al. |
| 4,778,598 A | 10/1988 | Hoffman et al. |
| 4,810,386 A | 3/1989 | Copa et al. |
| 4,897,196 A | 1/1990 | Copa et al. |
| 4,919,815 A | 4/1990 | Copa et al. |
| 4,956,093 A | 9/1990 | Pirbazari et al. |
| 5,126,050 A | 6/1992 | Irvine et al. |
| 5,192,442 A | 3/1993 | Piccirillo et al. |
| 5,200,081 A * | 4/1993 | Stuth .................... 210/615 |
| 5,202,027 A * | 4/1993 | Stuth .................... 210/615 |
| 5,302,288 A | 4/1994 | Meidl et al. |
| 5,486,292 A | 1/1996 | Bair et al. |
| 5,505,841 A | 4/1996 | Pirbazari et al. |
| 5,560,819 A | 10/1996 | Taguchi |
| 5,649,785 A | 7/1997 | Djerf et al. |
| 5,650,070 A * | 7/1997 | Pollock .................... 210/612 |
| 5,653,883 A | 8/1997 | Newman et al. |
| 5,932,099 A | 8/1999 | Cote et al. |
| 5,972,211 A | 10/1999 | Jones |
| 6,007,712 A | 12/1999 | Tanaka et al. |
| 6,030,529 A | 2/2000 | Biskner et al. |
| 6,048,459 A | 4/2000 | Khudenko |
| 6,077,424 A | 6/2000 | Katsukura et al. |
| 6,132,600 A | 10/2000 | Marchesseault et al. |
| 6,280,625 B1 * | 8/2001 | Jackson et al. .................... 210/617 |
| 6,290,852 B1 * | 9/2001 | Heine et al. .................... 210/622 |
| 6,544,421 B2 * | 4/2003 | Haridas et al. .................... 210/617 |
| 6,761,823 B2 * | 7/2004 | Maddux et al. .................... 210/615 |
| 6,773,598 B2 | 8/2004 | Byers et al. |
| 6,863,818 B2 | 3/2005 | Daigger et al. |
| 6,982,037 B2 | 1/2006 | Horng et al. |
| 7,018,534 B2 * | 3/2006 | Frisch .................... 210/616 |
| 7,172,701 B2 * | 2/2007 | Gaid et al. .................... 210/616 |
| 7,252,766 B2 * | 8/2007 | Stuth et al. .................... 210/605 |
| 7,329,344 B2 | 2/2008 | Jordan et al. |
| 7,329,351 B2 * | 2/2008 | Roberts et al. .................... 210/620 |
| 7,396,453 B1 | 7/2008 | Probst |
| 7,419,594 B2 * | 9/2008 | Frisch .................... 210/608 |
| 7,678,268 B2 | 3/2010 | Smith et al. |
| 7,722,768 B2 * | 5/2010 | Abma et al. .................... 210/605 |
| 7,972,512 B2 | 7/2011 | Conner |
| 8,137,557 B2 * | 3/2012 | Ladouceur .................... 210/615 |
| 2003/0132160 A1 | 7/2003 | Khudenko |
| 2005/0178725 A1 * | 8/2005 | Frisch .................... 210/616 |
| 2006/0225574 A1 | 10/2006 | Braeunling et al. |
| 2007/0021300 A1 | 1/2007 | Farant |
| 2007/0114182 A1 | 5/2007 | Depoli et al. |
| 2007/0122609 A1 | 5/2007 | Hiltzik et al. |
| 2007/0123419 A1 | 5/2007 | Le Bec |
| 2007/0209999 A1 | 9/2007 | Smith et al. |
| 2008/0047895 A1 | 2/2008 | Elefritz, Jr. et al. |
| 2008/0283469 A1 | 11/2008 | Pollock |
| 2009/0218281 A1 | 9/2009 | Saivugnet et al. |
| 2009/0272689 A1 * | 11/2009 | Ladouceur .................... 210/615 |
| 2010/0133182 A1 | 6/2010 | Sun et al. |
| 2010/0200500 A1 * | 8/2010 | Rezania et al. .................... 210/614 |
| 2011/0005284 A1 | 1/2011 | Conner et al. |
| 2011/0006002 A1 | 1/2011 | Conner et al. |
| 2012/0097608 A1 | 4/2012 | Conner et al. |
| 2012/0279920 A1 | 11/2012 | Conner et al. |

FOREIGN PATENT DOCUMENTS

| | | |
|---|---|---|
| CN | 1792872 A | 6/2006 |
| CN | 2009643668 Y | 10/2007 |
| EP | 543579 A1 | 5/1993 |
| EP | 1258460 A2 | 11/2002 |
| EP | 861808 B1 | 9/2009 |
| GB | 1200366 | 7/1970 |
| GB | 1296233 | 11/1972 |
| GB | 1487789 | 10/1977 |
| GB | 1579623 | 11/1980 |
| JP | 58110412 A | 7/1983 |
| JP | S62286591 | 12/1987 |
| JP | S6316096 | 1/1988 |
| JP | 10202280 A | 8/1998 |
| JP | 10296297 A | 11/1998 |
| JP | 10323683 A | 12/1998 |
| JP | 11042497 A | 2/1999 |
| JP | 2002192181 A | 7/2002 |
| JP | 2002192184 A | 7/2002 |
| JP | 2003094088 A | 4/2003 |
| JP | 2008246386 A | 10/2008 |
| KR | 100302469 B1 | 7/2001 |
| KR | 20010096080 A | 11/2001 |
| RU | 74122 U1 | 6/2008 |
| RU | 2351551 C1 | 4/2009 |
| WO | 9010602 A1 | 9/1990 |
| WO | 9519322 A1 | 7/1995 |
| WO | 9521794 A1 | 8/1995 |
| WO | 9637444 A1 | 11/1996 |
| WO | 0210077 A1 | 2/2002 |
| WO | 03062153 A1 | 7/2003 |
| WO | 2006053402 A1 | 5/2006 |
| WO | 2007062216 A2 | 5/2007 |
| WO | 2008066244 A1 | 6/2008 |

OTHER PUBLICATIONS

International Preliminary Report on Patentability, PCT/US08/13987, Jun. 18, 2010.

International Search Report and Written Opinion, PCT/US 10/38644, Aug. 11, 2010.

International Search Report and Written Opinion, PCT/US 10/38650, Aug. 23, 2010.

International Search Report and Written Opinion, PCT/US 10/41317, Sep. 1, 2010.

International Search Report and Written Opinion, PCT/US 10/41322, Sep. 1, 2010.

International Search Report and Written Opinion, PCT/US07/05775, Jul. 15, 2008.

"PACT Systems: Cleaning up Industrial Wastewater in One Step," Siemens, Water Technologies, 301 West Military Road, Rothschild, WI 54474, 2006, 6 pages.

Thuy, Q.T.T. (2003) Removal of inhibitory phenolic compounds by membrane bioreactor. Master's Thesis. Asian Institute of Technology, Thailand, 8 pages.

DynaSand, PDynaSand Filter Continuous Filtration Process, Parkson, 2009, 4 pages.

Chinese Patent Application No. 200880127140.8, Office Action dated Dec. 16, 2011.

NSF Product and Service Listing, "Picasprb 16," http://www/nsf.org/Certified/PwsComponents/listings.asp?standard=061&company=57090& (undated) (downloaded Sep. 26, 2011).

* cited by examiner

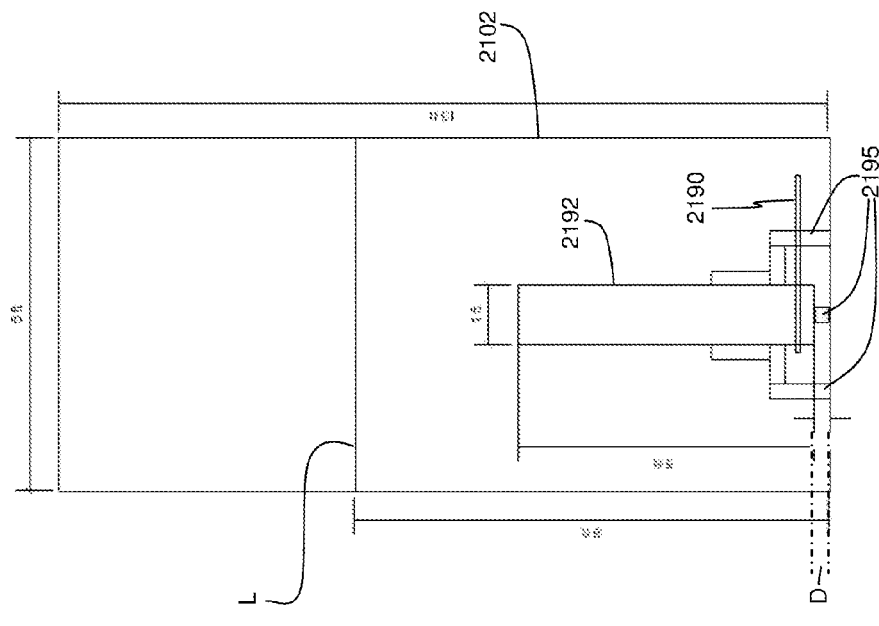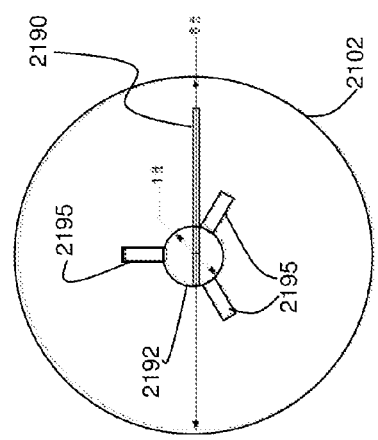
FIG. 21

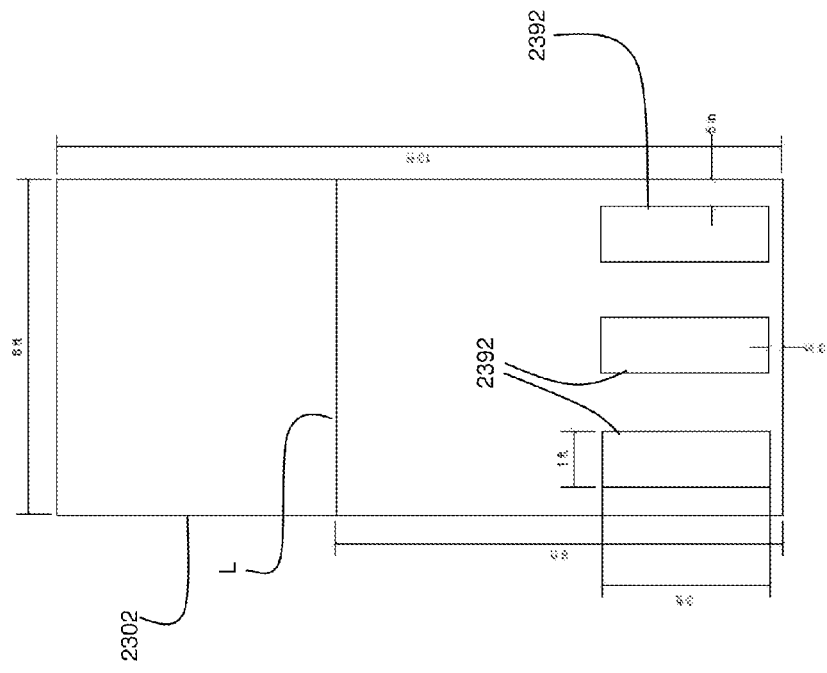
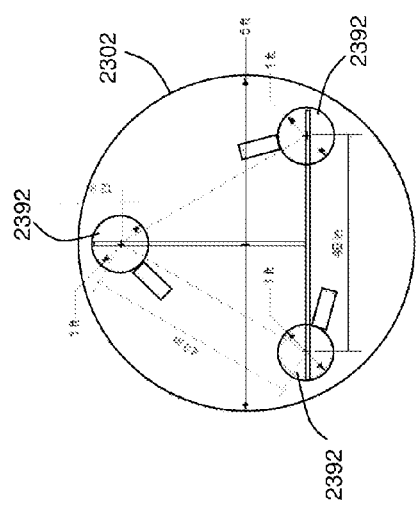
FIG. 23

US 8,551,341 B2

SUSPENDED MEDIA MEMBRANE BIOLOGICAL REACTOR SYSTEM INCLUDING SUSPENSION SYSTEM AND MULTIPLE BIOLOGICAL REACTOR ZONES

RELATED APPLICATIONS

This application claims the benefit of U.S. Provisional Patent Application No. 61/224,000 filed Jul. 8, 2009, and U.S. Provisional Patent Application No. 61/186,983 filed on Jun. 15, 2009, the disclosures of which are hereby incorporated by reference in their entireties.

BACKGROUND OF THE INVENTION

1. Field of the Invention

This invention relates to wastewater treatment systems and methods.

2. Description of Related Art

Effective handling of domestic sewage and industrial wastewater is an extremely important aspect of increasing the quality of life and conservation of clean water. The problems associated with simply discharging wastewater in water sources such as rivers, lakes and oceans, the standard practice up until about a half century ago, are apparent—the biological and chemical wastes create hazards to all life forms including the spread of infectious diseases and exposure to carcinogenic chemicals. Therefore, wastewater treatment processes have evolved into systems ranging from the ubiquitous municipal wastewater treatment facilities, where sanitary wastewater from domestic populations is cleaned, to specialized industrial wastewater treatment processes, where specific pollutants in wastewater from various industrial applications must be addressed.

Biologically refractory and biologically inhibitory organic and inorganic compounds are present in certain industrial and sanitary wastewater streams to be treated. Various attempts have been made to address treatment of such biologically refractory and biologically inhibitory compounds. Certain types of known treatment include use of powdered activated carbon to adsorb and subsequently remove biologically refractory and biologically inhibitory organic compounds.

Nonetheless, a need exists to treat wastewater containing biologically refractory and biologically inhibitory organic and inorganic compounds without disadvantages associated with using powdered activated carbon and other existing technologies.

SUMMARY OF THE INVENTION

In accordance with one or more embodiments, the invention relates to a system and method of treating wastewater.

In accordance with one or more embodiments, the invention relates to a wastewater treatment system comprising a biological reactor having a separation subsystem, a suspension system and a membrane operating system. The separation subsystem is constructed and arranged to maintain adsorbent material in the biological reactor with a mixed liquor. The suspension system is positioned in the biological reactor and is constructed and arranged to maintain adsorbent material in suspension with mixed liquor. The membrane operating system is located downstream of the biological reactor and is constructed and arranged to receive treated mixed liquor from the biological reactor and discharge a membrane permeate.

In accordance with one or more embodiments, the suspension system comprises a gas lift suspension system. The gas lift suspension system can include at least one draft tube positioned in the biological reactor and a gas conduit having one or more apertures positioned and dimensioned to direct gas to an inlet end of the draft tube. The gas lift suspension system can alternatively include at least one draft trough positioned in the biological reactor and a gas conduit having one or more apertures positioned and dimensioned to direct gas to a lower portion of the draft trough.

In accordance with one or more embodiments, the suspension system comprises a jet suspension system.

In accordance with one or more embodiments, the separation subsystem includes a screen positioned at an outlet of the biological reactor.

In accordance with one or more embodiments, the separation subsystem includes a settling zone located proximate the outlet of the biological reactor. The settling zone can include a first baffle and a second baffle positioned and dimensioned to define a quiescent zone in which the adsorbent material separates from mixed liquor and settles into the mixed liquor in a lower portion of the biological reactor. Further, the settling zone can include a screen or a weir positioned proximate the outlet of the biological reactor.

In accordance with one or more embodiments, the invention relates to a wastewater treatment system in which a source of adsorbent material introduction apparatus in communication with the biological reactor. In addition, a sensor is constructed and arranged to measure a parameter of the system. Further, a controller is in electronic communication with the sensor and programmed to instruct performance of an act based on the measured parameter of the system. The measured parameter can be the concentration of one or more predetermined compounds. The act can include removing at least a portion of the adsorbent material from the biological reactor, and/or adding adsorbent material to the biological reactor.

In accordance with one or more embodiments, the invention relates to a wastewater treatment system for treating wastewater. The system includes a biological reactor with a wastewater inlet, a mixed liquor outlet, and a separation subsystem associated with the mixed liquor outlet. The system also includes a suspension system for adsorbent material positioned in the biological reactor, and a membrane operating system located downstream of the biological reactor having an inlet in fluid communication with the mixed liquor outlet, and a treated effluent outlet.

In accordance with one or more embodiments, the invention relates to a process for treating wastewater. The process includes introducing mixed liquor into a biological reactor; introducing adsorbent material into the biological reactor with the mixed liquor; suspending the adsorbent material in the mixed liquor using a gas, under operating conditions that promote adsorption of contaminants from the mixed liquor by the adsorbent material; and passing an effluent that is substantially free of adsorbent material from the biological reactor to a membrane operating system while maintaining adsorbent material in the biological reactor.

In accordance with one or more embodiments, the invention relates to a wastewater treatment system for treating wastewater. The system includes a first biological reaction zone, a second biological reaction zone and a membrane operating system. The first biological reaction zone is constructed and arranged to receive and treat the wastewater. The second biological reaction zone includes a separation subsystem and is constructed and arranged to receive effluent from the first biological reaction zone. A suspension system for adsorbent material is provided in the second biological reaction zone. The membrane operating system is located downstream of the second biological reaction zone and is constructed and arranged to receive treated wastewater from the second biological reaction zone and discharge a membrane permeate.

In accordance with one or more embodiments, the first biological reaction zone and the second biological reaction zone are segregated sections of the same vessel.

In accordance with one or more embodiments, the first biological reaction zone and the second biological reaction zone are located in separate vessels.

In accordance with one or more embodiments, the invention relates to a wastewater treatment system for treating wastewater. The system includes a first biological reaction zone having a wastewater inlet and a first zone mixed liquor outlet. The system also includes a second biological reaction zone having a mixed liquor inlet in fluid communication with the first zone mixed liquor outlet, a suspension system for adsorbent material, a second zone mixed liquor outlet, and a separation subsystem associated with the second zone mixed liquor outlet. The system further includes a membrane operating system located downstream of the second biological reaction zone having an inlet in fluid communication with the second zone mixed liquor outlet, and a treated effluent outlet.

In accordance with one or more embodiments, the invention relates to a process for treating wastewater. The process includes introducing mixed liquor into a first biological reaction zone to form a treated mixed liquor; passing the treated mixed liquor to a second biological reaction zone; suspending adsorbent material in the treated mixed liquor of the second biological reaction zone, the action of suspension operating under conditions that promote adsorption of contaminants in treated mixed liquor on the adsorbent material; and passing an effluent that is substantially free of adsorbent material from the second biological reaction zone to a membrane operating system while maintaining adsorbent material in the second biological reaction zone.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. The accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

BRIEF DESCRIPTION OF THE DRAWINGS

The invention will be described in further detail below and with reference to the attached drawings all of which describe or relate to apparatus, systems and methods of the present invention. In the figures, which are not intended to be drawn to scale, each similar component that is illustrated in various figures is represented by a like numeral. In the figures:

FIG. 21 depicts a top and a sectional view of an embodiment of a biological reactor using a gas lift suspension system;

FIG. 23 depicts a top and a sectional view of an embodiment of a biological reactor using another configuration of a gas lift suspension systems.

DETAILED DESCRIPTION OF THE INVENTION

Figure 1:
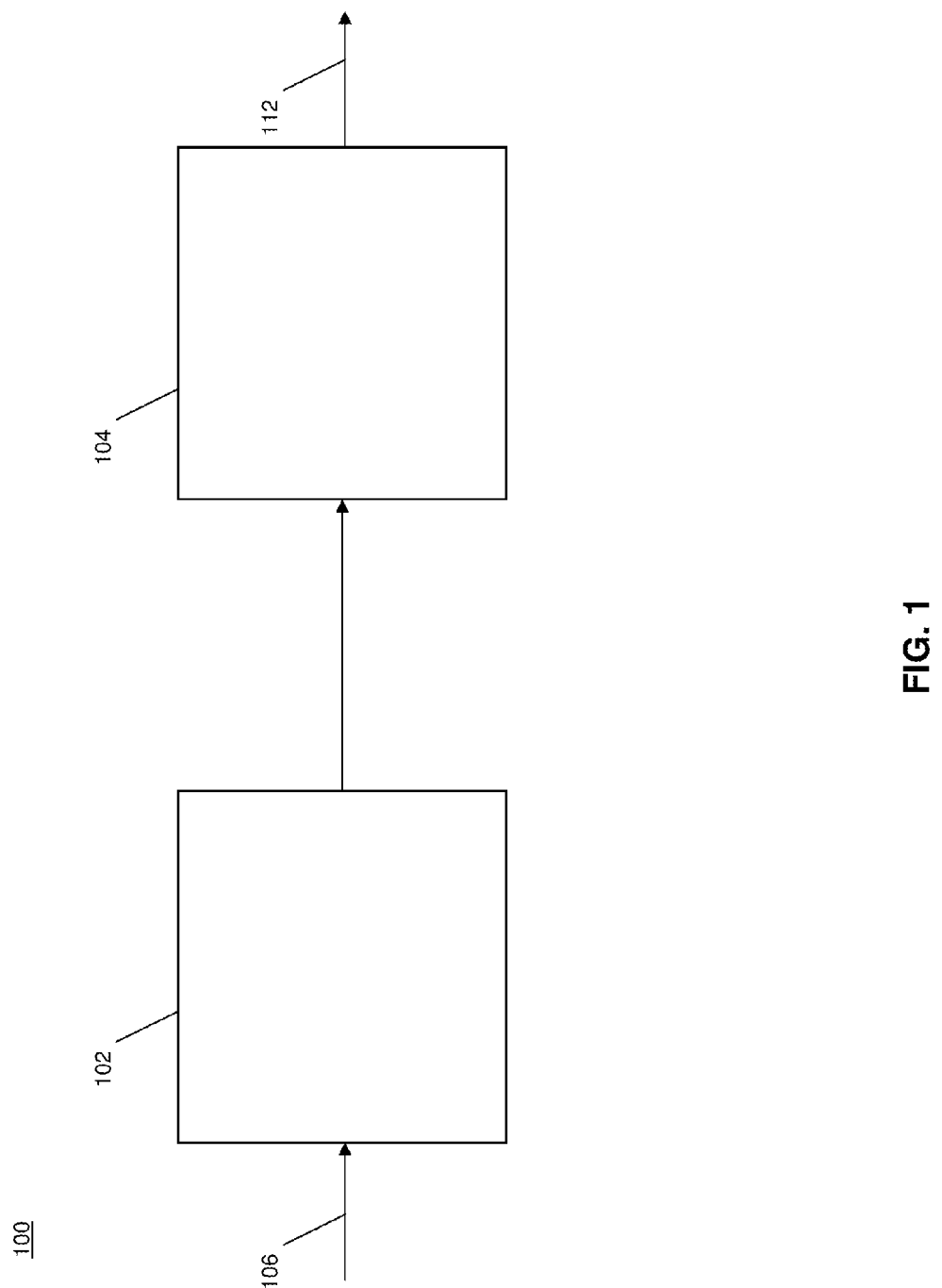
FIG. 1 is a schematic diagram of a membrane biological reactor system using a biological reactor which contains one or more zones with adsorbent material in suspension.

As used herein, "biologically refractory compounds" refer to those types of chemical oxygen demand ("COD") compounds (organic and/or inorganic) in wastewater that are difficult to biologically break down when contacted with microorganisms. The "biologically refractory compounds" can have varying degrees of refractory, ranging from those that are mildly refractory to those that are highly refractory.

"Biologically inhibitory compounds" refer to those compounds (organic and/or inorganic) in wastewater that inhibit the biological decomposition process.

"Biologically labile" means easy-to-digest, simple organics such as human and animal waste, food waste, and inorganics, such as ammonia and phosphorous-based compounds.

"COD" or "Chemical Oxygen Demand," refers to a measure of the capacity of water to consume oxygen during a chemical reaction that results in the oxidation (decomposition) of organic matter and the oxidation of inorganic chemicals such as ammonia and nitrite. COD measurement includes biologically labile, biologically inhibitory and biologically refractory compounds.

"Mixed liquor suspended solids," or "MLSS," means microbes and other substances, both dissolved and suspended, present in wastewater being treated; "mixed liquor volatile suspended solids," or "MLVSS," means the active microbes in the MLSS; and "mixed liquor" means the combined mixture of wastewater and MLSS.

"Adsorbent" or "adsorbent materials" as used herein means one or more of granular activated carbon, including granular activated carbon that has been treated to provide affinity to predetermined chemical species, metals or other compounds found to be present in the wastewater that is to be treated; granular iron-based compounds, e.g., iron oxide composites; synthetic resins; and granular alumino-silicate composites.

"Substantially free" or "substantially prevented" in the context of describing the presence of adsorbent material in effluent passing from one section of a system to another, e.g., from a biological reactor containing suspended adsorbent material to a membrane operating system, refers to limiting the amount of adsorbent material passing to the membrane operating system to an amount that does not adversely effect the requisite efficacy of the membrane filtration process therein. For instance, in certain embodiments, "substantially free" or "substantially prevented" refers to retaining at least about 80% by volume of the predetermined amount of adsorbent material to be used in a given system within the biological reactor or one or more biological reaction zones, in further embodiments, at least about 90% by volume and in still further embodiments at least about 95% by volume, and in yet still further embodiments at least about 99% by volume. However, it will be appreciated by one of ordinary skill in the art based upon the teachings herein that these percentages are merely illustrative, and can vary depending on factors including but not limited to the type of membrane(s) used and their resistance to abrasion, the requisite effluent quality, the predetermined amount of adsorbent material to be used in a given system, and other factors.

This invention in directed to wastewater treatment systems and methods. "Wastewater" as used herein, defines any water to be treated such as surface water, ground water, and a stream of wastewater from industrial, agricultural and municipal sources, having pollutants of biodegradable material, inorganic, labile organic compounds capable of being decomposed by bacteria, biologically refractory compounds, and/or biologically inhibitory compounds, flowing into the wastewater treatment system.

Wastewater from industrial and municipal sources typically contains biological solids, and inert material and organics, including biologically inhibitory and refractory organics. Examples of biologically inhibitory and refractory organics may include synthetic organic chemicals, such as polyelectrolyte treatment chemicals. Other biologically inhibitory and refractory organics include polychlorinated biphenyls, polycyclic aromatic hydrocarbons, polychlorinated dibenzo-p-dioxin, and polychlorinated dibenzofurans. Endocrine disrupting compounds are also a class of biologically inhibitory and refractory organics which can affect hormone systems in organisms and are found in the environment. Examples of endocrine disrupting compounds include: alkylphenolics, such as nonylphenol used for removing oil as well as natural hormones and synthetic steroids found in contraceptives, such as 17-b-estradiol, estrone, testosterone, ethynyl estradiol.

Other examples of wastewaters to be treated include: high strength wastewater; low strength wastewater; and leachate from landfills. Waters may also be treated to remove viruses. Other examples of pollutants in wastewater include: flame retardants, solvents, stabilizers, polychlorinated biphenyls (PCBs); dioxins; furans; polynuclear aromatic compounds (PNAs); pharmaceuticals, petroleum; petrochemical products; petrochemical byproducts; cellulose; phosphorous; phosphorous compounds and derivatives; and agricultural chemicals such as those derived from or used to produce fertilizers, pesticides, and herbicides.

Wastewater from industrial and municipal sources may also contain trace constituent compounds that originate during the water treatment process and are subsequently difficult to remove. Examples of trace constituents introduced during the water treatment process include nitrosamines, such as N-nitrosodimethylamine (NDMA) which may be released from proprietary cationic and anionic resins.

In general, wastewater treatment facilities use multiple treatment stages to clean water so that it may be safely released into bodies of water such as lakes, rivers, and streams. Presently, many sanitary sewage treatment plants include a preliminary treatment phase in which mechanical means are used to remove large objects (e.g., bar screens), and a sand or grit channel where sand, grit and stones settle. Some treatment systems also include a primary stage where certain fats, greases and oils float to the surface for skimming, and heavier solids settle to the bottom, and are subsequently treated in an aerobic or anaerobic digester to digest biomass and reduce the levels of biological solids.

After preliminary and/or primary treatment, the wastewater is then sent to a secondary biological activated sludge treatment phase. Biological treatment of wastewater is widely practiced. Wastewater is commonly treated with waste activated sludge, in which biological solids are acted upon by bacteria within a treatment tank. Activated sludge processes involve aerobic biological treatment in an aeration tank, typically followed by a clarifier/settling tank. Settled sludge is recycled back to the aeration tank in order to maintain an adequate mixed liquor suspended solids concentration to digest the contaminants. Some alternatives available for disposal of excess bio-solids, e.g., sludge, include but are not limited to incineration, disposal in a landfill, or use as fertilizer if there are no toxic components.

In the aeration tank, an oxygen-containing gas such as air or pure oxygen is added to the mixed liquor. The oxygen from the air is typically used by the bacteria to biologically oxidize the organic compounds that are either dissolved or carried in suspension within the wastewater feed. Biological oxidation is typically the lowest cost oxidation method available to remove organic pollutants and some inorganic compounds, such as ammonia and phosphorous compounds, from wastewater and is the most widely used treatment system for wastewater contaminated with biologically treatable organic compounds. Wastewaters that contain compounds entirely resistant to bio-decomposition, biologically inhibitory compounds, and/or biologically refractory compounds may not be treated adequately by a conventional simple biological wastewater treatment system. These compounds can only be acted upon by the bacteria only during a hydraulic retention time within a treatment tank. Because the hydraulic retention time is generally insufficient for biological oxidation of sufficient biologically inhibitory compounds and/or biologically refractory compounds, it is likely that some of these recalcitrant compounds may not be treated or destroyed and can pass through a treatment process unchanged or only partially treated prior to discharge in either an effluent or excess residual sludge.

The mixed liquor effluent from the aeration tank typically enters a clarifier/settling tank where sludge, including concentrated mixed liquor suspended solids, settles by gravity. Excess biomass is wasted, i.e., discharged, to off-site disposal. However, based on the wastewater and economic needs, some biological oxidation systems use a different treatment method to remove the solids from the wastewater effluent. The clarifier/settling tank can be replaced with a membrane operating system, or another unit operation such as a dissolved/induced air flotation device can be used. The liquid effluent from the clarifier/settling tank, operating system or dissolved air flotation device is either discharged or given further treatment prior to discharge. The solids that are removed from the mixed liquor are returned to the aeration tank as return activated sludge for further treatment and in order to retain an adequate concentration of bacteria in the system. Some portion of this return activated sludge is periodically removed from this recycle line in order to control the concentration of bacteria in the mixed liquor.

One recent advance in conventional industrial biological wastewater treatment plant technology includes the addition of powdered activated carbon particles to the mixed liquor. In biological treatment processes utilizing powdered activated carbon, the organics can be adsorbed onto the activated carbon and remain within the treatment tank for a hydraulic retention time that is similar to the sludge residence time and therefore undergo both adsorptive and biological treatments that result in enhanced removal of certain biologically inhibitory or refractory compounds. In these processes, certain organic and inorganic compounds are physically adsorbed to the surface of the powdered activated carbon particles.

Powdered activated carbon has been used in conventional biological treatment plants because of its ability to adsorb biologically inhibitory and biologically refractory compounds, thereby providing an effluent with lower concentrations of these pollutants. Inclusion of powdered activated carbon in the mixed liquor provides a number of operational benefits. The carbon provides the advantages of a suspended media biological treatment system which include increased pollutant removal and increased tolerance to upset conditions. Additionally, the carbon allows the biologically inhibitory and biologically refractory compounds to adsorb onto the surface of the carbon and to be exposed to the biology for a significantly longer period of time than in a conventional biological treatment system, thereby providing benefits similar to that of a fixed film system. The carbon also allows for the evolution of specific strains of bacteria that are more capable of digesting the biologically inhibitory organic materials. The fact that the carbon is continuously recycled back to the aeration tank with the return activated sludge, i.e., the sludge residence time, means that the bacteria can work on digesting the biologically inhibitory organic compounds adsorbed onto the surface of the carbon for a period of time longer than the hydraulic detention time of the biological treatment system. This process also results in biological regeneration of the carbon and allows the carbon to remove significantly more biologically inhibitory and biologically refractory compounds than it could in a simple packed bed carbon filter system which would also require frequent replacement or costly physical regeneration of the carbon once the adsorption capacity of the carbon is exhausted. The carbon in the mixed liquor can also adsorb certain compounds and therefore provide an effluent that is free of or has a substantially reduced concentration of compounds that are not treatable by conventional biological oxidation or otherwise entirely resistant to bio-decomposition. One example of a known powder activated carbon system is offered by Siemens Water Technologies under the trademark "PACT®."

However, because both biological growth and adsorption of organic and inorganic compounds occurs on the activated carbon in powder form, wasting of excess solids is required. In addition, the powdered activated carbon is discharged from the treatment process with the removal of biosolids and must, therefore, be continually replaced.

Increasingly, sanitary wastewater is being treated using membrane biological reactor technology, which offers improved effluent quality, a smaller physical footprint (more wastewater can be treated per unit area), increased tolerance to upsets, improved ability to process hard-to-treat wastewaters and a variety of other operational advantages. For example, wastewaters containing high total dissolved solids can experience settling problems in a conventional clarifier/settling tank and requires significantly more difficult-to-operate solids separation devices such as a dissolved air flotation device or some other solids removal system. However, while membrane biological reactors eliminate the settling problems experienced with clarifier/settling tank systems, they often present problems of membrane fouling and foaming that do not occur in conventional systems using clarifiers. Membrane fouling may be the result of extra-cellular polymeric compounds that result from the break-down of the biological life forms in the mixed liquor suspended solids, accumulation of organic materials such as oils, or by scaling by inorganic materials.

In addition, to date, membrane biological reactors have not been utilized commercially with powdered activated carbon addition. There has been some use of powdered activated carbon in surface water treatment systems that utilize membranes for filtration. However, it has been reported that these surface water treatment systems using membranes and powdered activated carbon have problems with the carbon abrading the membranes and the carbon permanently plugging and/or fouling the membranes.

Industrial wastewater that must be treated prior to discharge or reuse often include oily wastewaters, which can contain emulsified hydrocarbons. Oily wastewaters can come from a variety of industries including steel and aluminum industries, chemical processing industries, automotive industries, laundry industries, and crude oil production and petroleum refining industries. As discussed above, a certain amount of non-emulsified oils and other hydrocarbons may be removed in primary treatment processes, where floating oils are skimmed from the top. However, biological secondary wastewater processes are generally employed to remove the remaining oils from wastewater, typically the dissolved and emulsified oils, though some free oil may exist. Typical hydrocarbons remaining after primary treatment can include lubricants, cutting fluids, tars, grease, crude oils, diesel oils, gasoline, kerosene, jet fuel, and the like. These hydrocarbons typically must be removed prior to discharge of the water into the environment or reuse of the water in the industrial process. In addition to governmental regulations and ecological concerns, efficient removal of the remaining hydrocarbons also has benefits, as adequately treated wastewater may be used in many industrial processes and eliminate raw water treatment costs and reduce regulatory discharge concerns.

Other types of wastewater that must be treated includes contaminated process water from other industrial processes such as manufacturing of pharmaceuticals, various goods, agricultural products (e.g., fertilizers, pesticides, herbicides), and paper processing, as well as medical wastewater.

Commercial deployment of membrane biological reactors in the treatment of oily/industrial wastewater has been very slow to develop, mainly due to maintenance problems associated with oil and chemical fouling of the membranes. Testing of industrial/oily wastewater treated in a membrane biological reactor having powdered activated carbon added to the mixed liquor indicated the same treatment advantages as observed in conventional biological wastewater treatment systems including powdered activated carbon. It was also noted that the advantages of using a membrane biological reactor can also achieved. However, a side-by-side comparison of membrane biological reactors with and without the addition of powdered activated carbon demonstrated that the membrane biological reactor with powdered activated carbon provided treatment advantages as compared to the membrane biological reactors without activated carbon. Additionally, the membrane biological reactor without the carbon addition was very difficult to operate because of dissolved organics and extra cellular polymeric compounds fouling the membranes. Testing further demonstrated that while the addition of powdered activated carbon provided a very viable biological wastewater treatment system, the carbon had the deleterious effect of a significant amount of abrasion to and non-reversible fouling of the membranes. This abrasion and non-reversible fouling was significant enough to result in this system being very costly to operate, because of the significantly decreased life expectancy of the membranes and membrane cleaning frequency.

The systems and methods of the present invention overcome the deleterious effects of using powdered activated carbon, while providing the same and additional advantages.

Referring to FIG. 1, a wastewater treatment system 100 is schematically depicted including a biological reactor system 102 upstream of a membrane operating system 104. In certain embodiments, biological reactor system 102 includes a single biological reactor vessel. In additional embodiments, biological reactor system 102 includes a plurality of biological reactor vessels, one biological reactor vessel divided into separate sections, or a plurality of biological reactor vessels some or all of which can be divided into separate sections. The individual reactor vessels or segregated sections are generally referred to herein as biological reaction zones. During wastewater treatment operations according to the present invention, adsorbent material along with micro-organisms are maintained in suspension in all of the biological reaction zones or a subset of the total number of biological reaction zones. The membrane operating system 104 is maintained substantially free of adsorbent material using one or more of the separation subsystems described herein. An influent wastewater stream 106 can be introduced from a primary treatment system, a preliminary screening system, or as a direct flow of previously untreated wastewater. In further embodiments, the influent wastewater stream 106 can be previously treated wastewater, e.g., an effluent from one or more upstream biological reactors, including but not limited to aerobic biological reactors, anoxic biological reactors, continuous flow reactors, sequencing batch reactors, or any number of other types of biological treatment systems capable of biologically degrading organic and in certain embodiments some inorganic compounds.

The biological reactor(s) and/or certain biological reactor zones can be various types of biological reactors, including but not limited to aerobic biological reactors, anoxic biological reactors, continuous flow reactors, sequencing batch reactors, trickling filters, or any number of other types of biological treatment systems capable of biologically degrading organic and in certain embodiments some inorganic compounds.

In addition, the biological reactor(s) and/or certain biological reactor zones used herein can be of any size or shape suitable to suspend adsorbent material in conjunction with the suspension system. For example, the vessel may have a cross sectional area of any shape, such as circular, elliptical, square, rectangle, or any irregular shape. In some embodiments, the vessel may be constructed or modified in order to promote suitable suspension of the adsorbent material.

Figure 2:
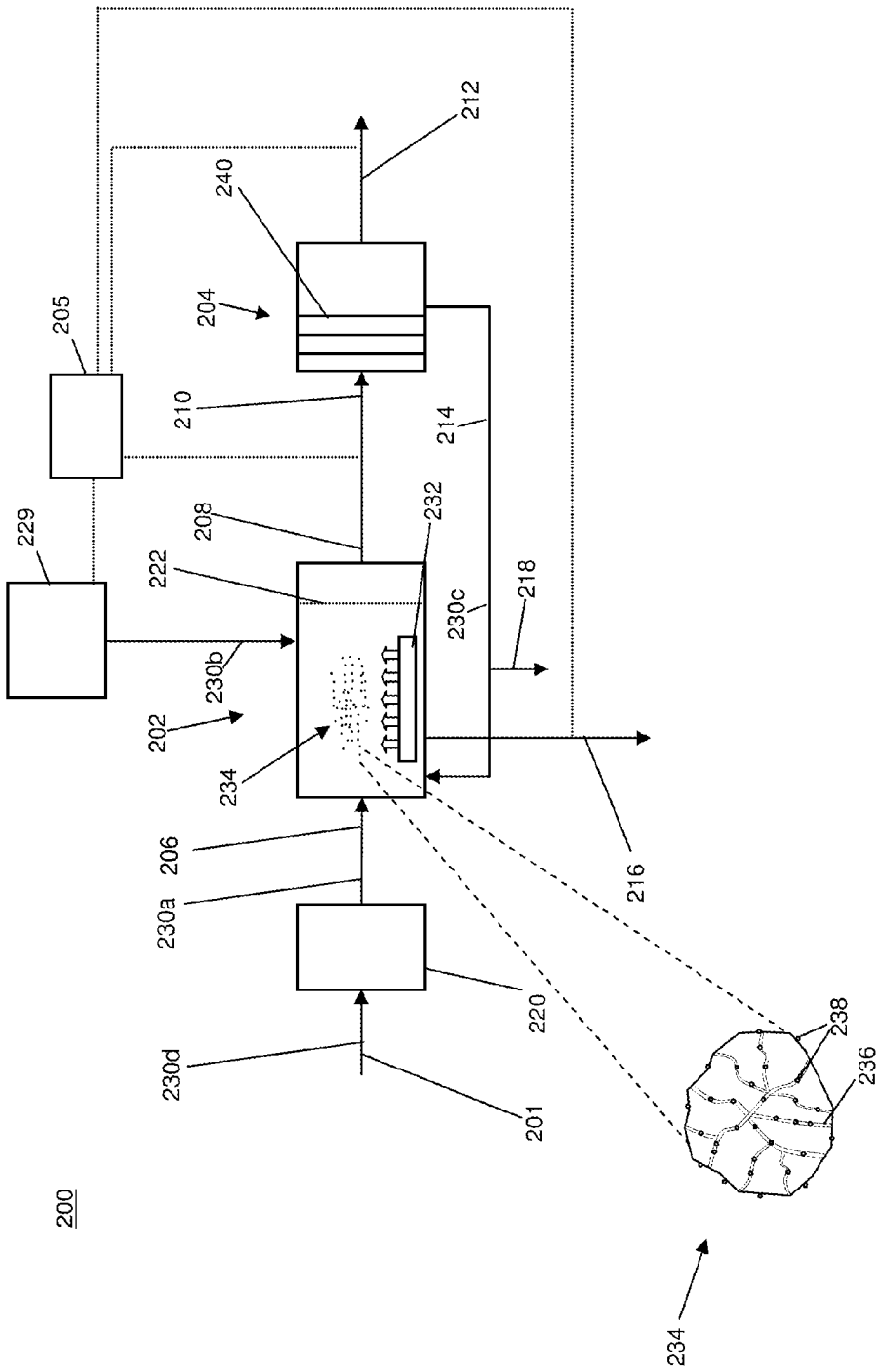
FIG. 2 is a schematic diagram of an embodiment of a system for treatment of wastewater using adsorbent material in a biological reactor upstream of a membrane operating system.

FIG. 2 schematically depicts the process flow of a wastewater treatment system 200 for producing a treated effluent having reduced concentrations of biologically labile, biologically refractory, biologically inhibitory and/or organic and inorganic compounds that are entirely resistant to biological decomposition. System 200 generally includes a biological reactor 202 and a membrane operating system 204. Biological reactor 202 includes an inlet 206 for receiving wastewater and an outlet 208 for discharging effluent that has been biologically treated, including mixed liquor volatile suspended solids and/or mixed liquor, to the membrane operating system 204.

The biological reactor 202 includes a distributed mass of porous 236 adsorbent material 234, and an effective amount of one or more micro-organisms 238, that are both adhered to the adsorbent material and free-floating and separate from the adsorbent material in the mixed liquor, for acting on biologically labile and certain biologically refractory and/or biologically inhibitory compounds in the mixed liquor. The adsorbent material adsorption sites, including the outer surface of the adsorbent granules or particles, and the wall surfaces of pores 236, initially serve as adsorption sites for the biologically labile, biologically refractory, biologically inhibitory and/or organic and inorganic compounds that are entirely resistant to biological decomposition. In addition, micro-organisms 238 can be adsorbed on the adsorption sites of the adsorbent material. This allows for higher digestion levels of certain biologically refractory and/or biologically inhibitory compounds without requiring proportionally longer hydraulic retention times and sludge retention times, due to the fact those certain biologically refractory and/or biologically inhibitory compounds are retained for extended periods of time on the adsorbent material, which are isolated or retained in the biological reactors.

Generally, biologically labile compounds and certain inorganics will be digested relatively quickly and predominantly by the micro-organisms that are not adhered to the adsorbent material, i.e., the free floating micro-organisms in the mixed liquor. Certain components including organics and inorganics that are entirely resistant to biological decomposition and very refractory biologically refractory and biologically inhibitory compounds will remain adsorbed on the adsorbent material or may be adsorbed and/or absorbed by free-floating biological material in the reactor(s). Ultimately, these non-digestible compounds will concentrate on the adsorbent to the point where the replacement of the adsorbent will be required to maintain the effluent at an acceptable level of adsorptive capacity. As the adsorbent material remains in the system according to the present invention, micro-organisms grow and are retained on the adsorbent material, generally long enough to break down at least certain biologically refractory and/or biologically inhibitory compounds in the particular influent wastewater, which have been concentrated on the adsorbent material. In addition, while not wishing to be bound by theory, it is believed that micro-organisms can eventually evolve into mature strains with specific acclimation necessary to break down the hard-to-treat compounds in the particular influent wastewater. Over additional time, e.g., several days to several weeks, in which adsorbent material having certain biologically refractory and/or biologically inhibitory compounds is maintained in the system, the micro-organisms having a high degree of specificity become second, third, and higher generations, thereby increasing their efficacy to biodegrade at least certain of the specific biologically refractory and/or biologically inhibitory compounds that are present in the particular influent wastewater as the system becomes acclimated. This is depicted by the step change in residual COD depicted in FIG. 14, which shows a plot of feed concentration (in milligrams per liter) of biologically refractory and biologically inhibitory compounds, and the remaining effluent concentrations (as percentages of the original), at various stages of the acclimation of a membrane biological reactor system with adsorbent material added, i.e., stage A that is before adsorbent material is added, stage B that is during the acclimation period, and stage C that is after acclimation.

Various influent wastewaters can be deficient in certain nutrients beneficial to the biology that occurs in the biological reactor 202. Further, certain influent wastewaters can have pH levels that are excessively acidic or caustic. Accordingly, as will be apparent to a person having ordinary skill in the art, phosphorus, nitrogen, and pH adjustment materials or chemicals can be added to maintain optimal nutrient ratios and pH levels for the biological life and associated activity, including biological oxidation, in the reactor 202.

Effluent from the biological reactor 202 is introduced via a separation subsystem 222 to an inlet 210 of the membrane operating system 204. This transferred mixed liquor, having been treated in biological reactor 202, is substantially free of adsorbent material. In the membrane operating system 204, the wastewater passes through one or more microfiltration or ultra-filtration membranes, thereby eliminating or minimizing the need for clarification and/or tertiary filtration. Membrane permeate, i.e., liquid that passes through the membranes 240, is discharged from the membrane operating system 204 via an outlet 212. Membrane retentate, i.e., solids from the biological reactor 202 effluent, including activated sludge, is returned to the biological reactor 202 via a return activated sludge line 214.

Spent adsorbent material from the biological reactor 202, e.g., granular activated carbon that is no longer effective in adsorbing contaminants such as certain compounds entirely resistant to bio-decomposition, biologically refractory compounds and biologically inhibitory compounds, can be removed via a mixed liquor waste discharge port 216 of the biological reactor 202. A waste outlet 218 can also be connected to the return pipe 214 to divert some or all the return activated sludge for disposal, for instance, to control the concentration of the mixed liquor and/or culture. Sludge is discharged from the apparatus with the waste activated sludge when it increases to the point where the mixed liquor solids concentration is so high that it disrupts the operation of the particular membrane biological reactor system. In addition, the mixed liquor waste discharge port 216 can be used to remove a portion of the adsorbent material, thereby removing some portion of the biologically refractory compounds, biologically inhibitory compounds, and/or organic and inorganic compounds that are entirely resistant to biological decomposition, rather than from the return activated sludge line with the waste activated sludge, resulting in a lower concentration of these biologically refractory compounds, biologically inhibitory compounds, and/or organic and inorganic compounds that are entirely resistant to biological decomposition in the discharge and a more stable biomass in the membrane biological reactor. An equivalent quantity of fresh or regenerated adsorbent material can be added.

A preliminary screening and/or separation system 220 can be provided upstream of the inlet 206 of the biological reactor 202. This preliminary screening and/or separation system can include a dissolved air floatation system, a coarse screen or a combination of these and/or other preliminary treatment devices for separating suspended matter of the type known in the art. Optionally, the preliminary screening and/or separation system 220 can be eliminated, or other types of preliminary treatment devices may be included, depending on the particular wastewater being treated.

In order to prevent at least a majority of the adsorbent material 234 from entering the membrane operating system 204 and causing undesirable abrasion and/or fouling of the membranes 240, separation subsystem 222 is provided. As shown, in FIG. 2, the separation subsystem 222 is located proximate the outlet of the biological reactor 202. However, in certain embodiments, the separation subsystem 222 can be positioned in a separate vessel downstream of the biological reactor 202. In either case, the separation subsystem 222 includes suitable apparatus and/or structures for preventing contact between at least a majority of the adsorbent 234 and the membranes 240 in the membrane operating system 204. Separation subsystem 222 can comprise one or more of a screening apparatus, a settling zone, and/or other suitable separation apparatus.

Suitable types of screens or screening apparatus for use in certain embodiments of the present invention include wedge wire screens, metal or plastic apertured plates, or woven fabrics, in cylindrical or flat configurations and arranged at various angles including vertically oriented, horizontally oriented, or at any angle therebetween. In further embodiments, an active screening apparatus can be employed such as a rotating drum screen, vibrating screen or other moving screening apparatus. In general, for systems in which the separation subsystem 222 is a screening apparatus, the mesh size is smaller than the bottom limit of the effective granule or particle size of the adsorbent material that is being used.

Other types of separation subsystems can also be used in the separation subsystem, as alternatives to, or in combination with, a screening apparatus. For instance, as further described below, a settling zone can be provided, in which adsorbent material settles by gravity.

In alternative embodiments, or in conjunction with previously described embodiments, separation subsystems can include a centrifugal system (e.g., hydrocyclone, centrifuge, or the like), an aerated grit chamber, a floatation system (such as induced gas flotation or dissolved gas), or other known apparatus.

Optionally, or in combination with the separation subsystem 222 proximate the outlet of biological reactor 202, a separation subsystem can be provided between biological reactor 202 and the membrane operating system 204 (not shown). This alternative or an additional separation subsystem can be the same as or different as separation subsystem 222, in type and/or dimension. For instance, in certain embodiments, a settling zone, a clarifier, a hydrocyclone separator, a centrifuge, or a combination of these can be provided as a distinct unit operation between biological reactor 202 and membrane operating system 204.

Note that the separation subsystem 222 is highly effective for preventing passage of adsorbent material in its original dimension to the membrane operating system. In certain preferred embodiments, the separation subsystem 222 prevents substantially all of the adsorbent material 234 from passage to the membrane operating system 204. However, during operation of the system 200, various causes of attrition of the adsorbent material, including inter-granule collisions, shearing, circulation, or collisions of granules within stationary or moving equipment, can cause particles to be created that are too small to be effectively retained with the separation subsystem 222. In order to minimize the detriment to the membranes and loss of adsorbent material to wasting, certain embodiments include a separation subsystem 222 that is capable of preventing passage of substantially all of the adsorbent material 234 within about 70 to about 80 percent of its original dimension. The acceptable percentage reduction in the original dimension can be determined by a person having ordinary skill in the art, for instance, based on an economic evaluation. If the reduction in the dimension results in an increase in the particles passing through the screening system, the membranes will experience increased abrasion. Thus, a cost-benefit analysis can be used to determine what is an acceptable percentage reduction of adsorbent material based on the cost of abrasion and eventual replacement of the membranes as compared to the costs associated with adsorbent material that minimizes breakage, and handling and operational costs associated with a separation subsystem capable of preventing passage of particles much smaller than the original adsorbent material granules or particles. In addition, in certain embodiments, some degree of inter-granule collisions, or collisions of granules within stationary or moving equipment, is desirable to strip excess biomass from the outer surfaces of the adsorbent material.

Screened or separated mixed liquor effluent from the biological reactor 202 can be pumped or flow by gravity (depending on the design of the particular system) into the membrane operating system 204. In a system using an external separation subsystem (not shown), the apparatus is preferably configured such that adsorbent material separated from the mixed liquor passing through an external fine screen or separator subsystem falls by gravity back into the biological reactor 202.

Adsorbent material such as granular activated carbon, e.g., suitably pre-wetted to form a slurry of adsorbent material, can be added to the wastewater at various points in the system 200, e.g., from a source 229 of adsorbent material. As shown in FIG. 2, adsorbent material can be introduced at one or more locations 230a, 230b, 230c and/or 230d. For instance, adsorbent material can be added to the feedstream downstream of the preliminary screening system 220 (e.g., location 230a). Optionally, or in combination, adsorbent material can be added directly to the biological reactor 202 (i.e., location 230b). In certain embodiments, adsorbent material can be introduced via the return activated sludge line 214 (e.g., location 230c). In additional embodiments, it can be desirable to add the adsorbent material upstream of the preliminary screening system 220 (e.g., location 230d), where the preliminary screening system 220 is designed specifically for this application by including screening that allows the adsorbent material to pass through and into the biological reactor 202. Mixed liquor passes through the separation subsystem 222 and the adsorbent material is substantially prevented from passing into the membrane operating system 204 with the mixed liquor suspended solids.

As the adsorbent material remains in the system and is exposed to wastewater constituents including biologically refractory, biologically inhibitory compounds and/or organic and inorganic compounds that are entirely resistant to biological decomposition, some or all of the adsorbent material will become ineffective for treating the constituents, i.e., the adsorption capacity decreases. This will result in a higher concentration of these constituents entering the membrane operating system 204, where they pass through the membranes, and are discharged with the membrane effluent 212. In addition, adsorbent material can become ineffective due to coating with bacteria, polysaccharides and/or extracellular polymeric substances. This layer of coating can reach levels where it blocks the pore sites and thereby prevents access for biologically refractory, biologically inhibitory and/or organic and inorganic compounds that are entirely resistant to biological decomposition, and consequently prevents adsorption and inhibits biodegradation. In certain embodiments of the present invention, this coating can be removed by a shearing action produced by one or more mechanisms in the system, such as collisions between adsorbent material granules suspended in the mixed liquor or shearing forces associated with suspension and/or movement of the adsorbent material.

When adsorbent material has lost all or a portion of its efficacy for reducing the effluent concentration of biologically refractory, biologically inhibitory and/or organic and inorganic compounds that are entirely resistant to biological decomposition, a portion of the adsorbent material can be wasted via waste port 216, e.g., by discharging a portion of the mixed liquor containing adsorbent material dispersed therein.

Additional fresh or regenerated adsorbent material can be introduced into the system, as described above, via adsorbent material introduction apparatus 229 and/or at one or more suitable addition locations. The inlet wastewater and the effluent wastewater COD compound concentrations and/or inorganic compound concentrations, can be monitored to determine when the adsorbent material and its accompanying biomass in the system have experienced reduced effectiveness. A plot of the difference between the inlet and effluent COD divided by the inlet COD concentration will show gradual loss of the efficacy of the adsorbent material in the mixed liquor. The same type of plot can be used to monitor the inorganic removal capacity of the system. The amount of COD removed from the feed stream can provide an indication of the relative amount of biologically refractory and/or biologically inhibitory organic compounds that are being removed from the wastewater feed. As the operators of the system develop experience with treating a particular wastewater, they will be able to determine when this ratio indicates a point at which there is a need to remove a portion of the adsorbent material in the biological reactor and replace it with fresh adsorbent material. The system's required efficiency will be regained for the compounds that are biologically refractory, biologically inhibitory and/or entirely resistant to bio-decomposition, for instance, to produce an effluent that is in compliance with regulatory requirements. Sampling and analysis of the effluent for concentrations of specific organic and inorganic compounds can also be used to determine when efficacy of the adsorbent material and its accompanying biomass in the mixed liquor has been reduced and partial replacement should be initiated.

The operator of a membrane biological reactor system 200 according to the invention can begin replacing some of the adsorbent material when the effluent concentrations of specific organic or inorganic compounds start to approach the facility's permitted discharge concentrations for these compounds. The allowed discharge concentrations are typically limited by the facility's permit, for instance, as determined by the National Pollutant Discharge Elimination System (NPDES) permit program that is regulated by the United States Environmental Protection Agency, or other similar regulating body in a particular state or nation. As operators gain experience in operating this system with their particular wastewater, they will be able to anticipate when to commence replacement of adsorbent material. When the operator determines that the efficacy of the adsorbent material and its accompanying biomass is approaching an inability to achieve the requisite effluent concentration of pollutants, the normal wasting of excess biomass that is performed by wasting return activated sludge from line 218 can cease and the excess biomass and the accompanying adsorbent material is wasted from the biological reactor 202 via waste port 216. The amount of material wasted is determined by what is required to maintain the mixed liquor suspended solids within the optimum operating range for the particular membrane biological reactor system. After replacement of a portion of the adsorbent material, the effluent is monitored by the operator to determine whether the requisite contaminant removal efficiency has been restored. Additional replacement can be made as needed based on operating experience.

In some embodiments, the system and/or individual apparatus of the system can include a controller to monitor and adjust the system as desired. A controller can direct any of the parameters within the system depending upon the desired operating conditions, which may, for example, be based on governmental regulations regarding effluent streams. The controller can adjust or regulate valves, feeders or pumps associated with each potential flow based upon one or more signals generated by sensors or timers positioned within the system or individual apparatus. The controller can also adjust or regulate valves, feeders or pumps associated with each potential flow based upon one or more signals generated by sensors or timers, which indicate a specific trend, for example an upward or downward trend in a characteristic or property of the system over a predetermined period of time. For example, a sensor in an effluent stream can generate a signal indicating that the concentration of pollutants such as biologically refractory compounds, biologically inhibitory compounds, and or compounds entirely resistant to bio-decomposition has reached a predetermined value or trend, or indicating that the COD level, thereby triggering the controller to perform some act upstream from, downstream from, or at the sensor. This act can include any one or more of removing adsorbent material from the biological reactor, adding new or regenerated adsorbent material to the biological reactor, adding a different type of adsorbent material, adjusting flow of the wastewater at the feed inlet or inlet to another apparatus within the system, redirecting flow of the feed inlet or inlet to another apparatus within the system to a storage tank, adjusting air flow within the biological reactor, adjusting residence time within the biological reactor or other apparatus, and adjusting temperature and/or pH within the biological reactor or other apparatus. One or more sensors can be utilized in or with the one or more apparatus or streams of the system to provide an indication or characteristic of the state or condition of any one or more processes being performed in the system.

The system and controller of one or more embodiments of the invention provide a versatile unit having multiple modes of operation, which can respond to multiple inputs to increase the efficiency of the wastewater treatment system of the present invention. The controller can be implemented using one or more computer systems which can be, for example, a general-purpose computer. Alternatively, the computer system can include specially-programmed, special-purpose hardware, for example, an application-specific integrated circuit (ASIC) or controllers intended for water treatment systems.

The computer system can include one or more processors typically connected to one or more memory devices, which can comprise, for example, any one or more of a disk drive memory, a flash memory device, a RAM memory device, or other device for storing data. The memory is typically used for storing programs and data during operation of the system. For example, the memory can be used for storing historical data relating to the parameters over a period of time, as well as operating data. Software, including programming code that implements embodiments of the invention, can be stored on a computer readable and/or writeable nonvolatile recording medium, and then typically copied into memory wherein it can then be executed by one or more processors. Such programming code can be written in any of a plurality of programming languages or combinations thereof.

Components of the computer system can be coupled by one or more interconnection mechanisms, which can include one or more busses, e.g., between components that are integrated within a same device, and/or a network, e.g., between components that reside on separate discrete devices. The interconnection mechanism typically enables communications, e.g., data, instructions, to be exchanged between components of the system.

The computer system can also include one or more input devices, for example, a keyboard, mouse, trackball, microphone, touch screen, and other man-machine interface devices as well as one or more output devices, for example, a printing device, display screen, or speaker. In addition, the computer system can contain one or more interfaces that can connect the computer system to a communication network, in addition or as an alternative to the network that can be formed by one or more of the components of the system.

According to one or more embodiments of the invention, the one or more input devices can include sensors for measuring any one or more parameters of system and/or components thereof. Alternatively, one or more of the sensors, pumps, or other components of the system, including metering valves or volumetric feeders, can be connected to a communication network that is operatively coupled to the computer system. Any one or more of the above can be coupled to another computer system or component to communicate with the computer system over one or more communication networks. Such a configuration permits any sensor or signal-generating device to be located at a significant distance from the computer system and/or allow any sensor to be located at a significant distance from any subsystem and/or the controller, while still providing data therebetween. Such communication mechanisms can be affected by utilizing any suitable technique including but not limited to those utilizing wireless protocols.

Although the computer system is described by way of example as one type of computer system upon which various aspects of the invention can be practiced, it should be appreciated that the invention is not limited to being implemented in software, or on the computer system as exemplarily shown. Indeed, rather than implemented on, for example, a general purpose computer system, the controller, or components or subsections thereof, can alternatively be implemented as a dedicated system or as a dedicated programmable logic controller (PLC) or in a distributed control system. Further, it should be appreciated that one or more features or aspects of the invention can be implemented in software, hardware or firmware, or any combination thereof. For example, one or more segments of an algorithm executable by a controller can be performed in separate computers, which in turn, can be in communication through one or more networks.

In some embodiments, one or more sensors can be included at locations throughout of the system 200, which are in communication with a manual operator or an automated control system to implement a suitable process modification in a programmable logic controlled membrane biological reactor system. In one embodiment, system 200 includes a controller 205 which can be any suitable programmed or dedicated computer system, PLC, or distributed control system. The concentration of certain organic and/or inorganic compounds can be measured at the membrane operating system effluent 212 or the effluent from outlet 208 of the biological reactor 202, as indicated by dotted line connections between the controller 205 and both the effluent line 212 and the intermediate effluent line between outlet 208 and inlet 210. In another embodiment, the concentration of volatile organic compounds or other property or characteristic of the system may be measured at one or more of inlets 201, 206, or 210. Sensors known to those of ordinary skill in the art of process control apparatus can include those based on laser-induced fluorescence or any other sensor suitable for in situ real time monitoring of the concentration of organic or inorganic compounds in the effluent or other property or characteristic of the system. Sensors that may be used include submersible sensors for use in oil-in-water measurement which use UV fluorescence for detection, such as enviroFlu-HC sensors available from TriOS Optical Sensors (Oldenburg, Germany). The sensors may comprise lenses which are coated or otherwise treated to prevent or limit the amount of fouling or film that occurs on the lenses. When one or more sensors in the system generate a signal that the concentration of one or more organic and/or inorganic compounds exceeds a predetermined concentration, the control system can implement a responsive action such as a suitable feedback action or feedforward action, including but not limited to removing adsorbent material via waste discharge port 216 (as indicated by dotted line connections between the controller 205 and the waste discharge port 216); adding new or regenerated adsorbent material via adsorbent material introduction apparatus 229 or at one of the other locations (as indicated by dotted line connections between the controller 205 and the adsorbent material introduction apparatus 229); adding a different type of adsorbent material; modifying the hydraulic retention time; modifying the biological characteristics such as simple carbon food for micro-organisms or adding phosphorus, nitrogen and/or pH adjustment chemicals; and/or other modifications as described above or that will be apparent to those of ordinary skill in the art.

Note that while the controller 205 and the adsorbent material introduction apparatus 229 are shown only with respect to FIG. 2, it is intended that these features and the various feedback and feedforward capabilities can be incorporated in any of the systems described herein. In addition, the controller 205 can be electronically connected to other components such as a wastewater feed pump and the suspension system 232.

After the mixed liquor is aerated and treated by the adsorbent material in the biological reactor 202, the processed mixed liquor passes through separation subsystem 222, and is transferred to the membrane operating system 204 substantially free of adsorbent material. The separation subsystem 222 prevents adsorbent material from passing into the membrane operating system 204. By maintaining the adsorbent material in the biological reactor 202, or otherwise upstream of the membrane operating system 204, the method and system of the present invention minimizes or eliminates the likelihood of fouling and/or abrasion of the membrane operating system tank membranes by the adsorbent material.

The membrane operating system 204 contains filtering membranes 240 to filter the biomass and any other solids in the mixed liquor in the membrane operating system tank 204 from the effluent from the bioreactor 212. These membranes 240, which can be in the form of hollow fiber membranes or other suitable configurations, as is known to those of ordinary skill in the art, are typically very expensive and it is highly desirable to protect them from damage in order to maximize their useful life. In the method and system of the present invention, the life of the membranes in the operating system tank are extended, since the separation subsystem 222 substantially reduces or eliminates entry of the adsorbent material such as granular activated carbon, and/or any other solid granules and particles, into the membrane operating system 204.

Outlet 212 transports filtered effluent from the membrane operating system tank 204. Return activated sludge line 214 transports a return activated sludge stream from the membrane operating system tank 204 to the biological reactor 202 for further use in processing of the wastewater feedstream. Excess sludge is wasted from the system using waste line 218 as in a conventional membrane biological reactor system.

In systems in which biological reactor 202 is an aerobic reactor such as an aeration tank and the micro-organisms are aerobic micro-organisms, an air diffusion apparatus or mechanical mixing system can be used to maintain the adsorbent material in suspension. As described in further detail below, various additional embodiments of the present invention include alternative or supplemental suspension apparatus or system 232 to maintain the adsorbent material in suspension.

Maintaining the relatively large granules of adsorbent material in suspension typically requires considerable more energy than a prior art system not using the adsorbent material, or that employs powdered activated carbon. Nonetheless, the advantages of using granules of adsorbent material according to the present invention, including increased rate and degree of contaminant removal, thereby minimizing or obviating the need for further downstream treatment, outweighs any increase in energy consumption for operating the system.

The suspension system 232 in certain embodiments of the present invention, utilizes one or more of jet mixing, mechanical mixing, jet aeration, coarse bubble aeration, and other types of mechanical or air suspension to maintain the adsorbent material 234 in suspension while minimizing attrition of the adsorbent material 234.

In certain embodiments, after an initial period of time in which the adsorbent material 234 is within the biological reactor 202 and some granule breakage occurs, e.g., some of the rough and/or protruding surfaces of the adsorbent material 234 break off and becomes powder, fines, needles or other smaller particulates, the adsorbent material 234 maintained in suspension by the jet suspension system 232 stabilizes, whereby little or no further breakage or degradation in size occurs.

In additional embodiments of the present invention, prior to introduction of adsorbent material into the system, the material can be preconditioned by removing easy-to-break portions of the adsorbent material, thereby minimizing creation of fines and other undesirable smaller particles that are difficult to separate and can abrade the membranes. Preconditioning can occur with or prior to pre-wetting, for instance, in a suitable conditioning apparatus such as a wet or dry particle tumbler.

The concentration of adsorbent material in the mixed liquor is generally determined based upon the specific system parameters and wastewater to treat the particular combination of biologically refractory and/or biologically inhibitory organic or inorganic compounds to meet a facility's discharge requirements. Testing has indicated that operating a membrane biological reactor with a typical industrial mixed liquor suspended solids concentration (in a normal range for the particular membrane biological reactor configuration employed) and an adsorbent material concentration, such as granular activated carbon, of about 20% (of the total mixed liquor suspended solids concentration) was adequate to remove the biologically refractory and/or biologically inhibitory organic compounds present in the wastewater feed without creating fouling problems on the screening system used. Higher concentrations of adsorbent material can be added to provide an additional margin of safety against process upsets that could cause higher than normal effluent concentrations of biologically refractory compounds, biologically inhibitory compounds, and/or organic or inorganic compounds entirely resistant to biological decomposition. Note that this additional adsorbent material will result in increased screening and/or settling requirements. The lowest concentration of adsorbent material that can be utilized and still achieve the required effluent quality can be empirically determined, based upon a desired margin of safety against process upsets that is based on experience or otherwise deemed appropriate for the particular system and process.

The present invention using adsorbent material upstream of a membrane operating system tank to adsorb organic and inorganic materials (biologically refractory, biologically inhibitory or otherwise) as well as to provide for a suspended media membrane biological reactor is applicable for a variety of different configurations. In addition, various separation devices may also be used to maintain the adsorbent material in the biological reactor. It will be appreciated by one of ordinary skill in the art that different systems will have different economic benefits based on the individual characteristics of the wastewater and the region where the facility is to be installed.

The factors that are controlled to produce optimal treatment conditions include the type of adsorbent material, including its size, shape, hardness, specific gravity, settling rate, requisite air flow or other suspension needs for granule suspension in the mixed liquor, i.e., to maintain the granular activated carbon as a suspended media, the screen bar spacing or opening size and hole configuration, the concentration of adsorbent material in the mixed liquor, the concentration of the mixed liquor volatile suspended solids, the total concentration of mixed liquor suspended solids, the ratio of the return activated sludge flow rate divided by the flow rate of the mixed liquor entering the membrane operating system tank, the hydraulic retention time and the sludge retention time. This optimization provides adsorption of some portion of the biologically refractory compounds, easy to degrade biological oxygen demand compounds ($BOD_5$), biologically inhibitory compounds, organic or inorganic compounds entirely resistant to biological decomposition, and extra-cellular polymeric substances by the adsorbent material such as granular activated carbon suspended in the mixed liquor.

Another benefit of the apparatus of the present invention is providing sites to which the micro-organisms in the mixed liquor suspended solids can adhere. This aspect of the process produces a mixed liquor volatile suspended solids stream that is more stable and resilient in its response to upset conditions and allows enhanced biodegradation of the organics present in the wastewater as compared to a non-granular activated carbon enhanced membrane biological reactor operated with similar hydraulic retention times and sludge retention times. A source of micro-organisms inside the pore spaces, or on the surface, of the adsorbent material serves as a source of seed bacteria in the event of an upstream process upset resulting in the loss of some of the viable micro-organisms floating free in the mixed liquor. In the event of a thermal or toxic chemical shock to the system, which would, in conventional systems, terminate certain bacteria, some of the micro-organisms within the pore spaces or on the surface can survive, thus only a fraction of the recovery time is necessary as compared to conventional systems without adsorbent. For instance, in systems where the bacteria is mesophilic, the adsorbent can allow some bacteria within the pore sites to survive in the event of thermal shock due to increased temperature. Likewise, in systems where the bacteria is thermophilic, the adsorbent allows some bacteria within the pore sites to survive in the event of thermal shock due to decreased temperature. In both of these circumstances, the time required for the cultures to re-acclimate can be greatly reduced. In addition, in the event of a system shock that terminates all or a portion of the micro-organism population, the presence of adsorbent material allows for continued operation, in which labile, refractory, and inhibitory contaminants can be adsorbed while the micro-organism population is adjusted.

The various benefits result in a more rapid acclimation of the mixed liquor to the wastewater feed, reduce fouling of the membranes, an improved tolerance to variations in feed concentrations and flow rate, produce a sludge that can be dewatered more quickly with a less oily nature that is easier to handle, and an effluent having a lower concentration of organic and inorganic impurities than can be obtained from a conventional membrane biological reactor apparatus.

The use of an adsorbent such as granular activated carbon in place of powdered activated carbon eliminates the membrane fouling and/or abrasion that have been identified as a problem in powdered activated carbon membrane biological reactors testing.

Although the use of granular activated carbon in place of powdered activated carbon does not use carbon as efficiently on a weight basis, the system and method of the present invention substantially prevents the granular activated carbon from entering the membrane operating system thereby minimizing or eliminating the likelihood of abrasion and fouling of the membranes. The impact of the reduced adsorption efficiency as a result of using granular activated carbon in place of powdered activated carbon does not, however, significantly impact the efficacy of the overall activated carbon-enhanced membrane biological reactor apparatus.

Testing has indicated that the principal mechanism of removal of certain biologically inhibitory organics and/or biologically refractory compounds is related to an increase in the residence time that the biologically refractory and biologically inhibitory compounds are exposed to the micro-organisms in the powdered activated carbon enhanced apparatus. Micro-organisms in the mixed liquor volatile suspended solids adsorbed on the adsorbent material such as granular activated carbon have a longer period of time to digest these certain biologically refractory and biologically inhibitory compounds. Increased residence time for biodegradation has been shown to be a major factor in reducing the concentration of certain biologically refractory and biologically inhibitory compounds in the membrane biological reactor effluent, and the higher adsorption efficiency of the powdered activated carbon is not required to achieve the desired results.

Granular activated carbon in a carbon-assisted membrane biological reactor performs as well or better than a powdered activated carbon enhanced membrane biological reactor in enhancing the removal of biologically refractory compounds, biologically inhibitory compounds, compounds that are entirely resistant to biological decomposition, and extra-cellular polymeric compounds. Also, because of its larger size, it can be effectively filtered or otherwise separated from the mixed liquor that enters the membrane operating system tank(s). The abrasion that occurs when using the powdered activated carbon can be eliminated or significantly reduced by employing granular activated carbon in accordance with the present invention.

While the use of the powdered activated carbon particles in a membrane biological reactor has demonstrated some of the same advantages described above for the granular activated carbon system, the observed membrane abrasion from the powdered activated carbon particles in the membrane operating system tank(s) is unacceptable since the membrane's useful life can be reduced to an unacceptable level, e.g., significantly less than a typical membrane warranty. Since the cost of the membranes represents a significant portion of the total cost of a membrane biological reactor system, an extension of their useful life is an important factor in the operating cost of the membrane operating system.

Figure 3:
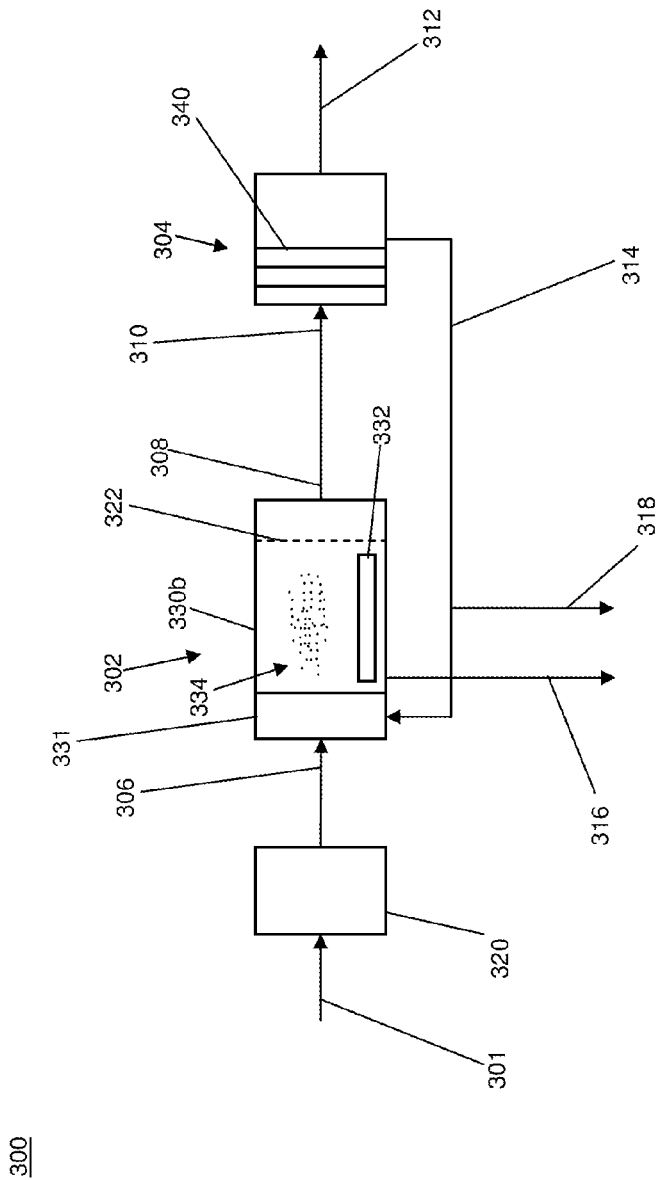
FIG. 3 is a schematic diagram of a second embodiment of a system similar to that shown in FIG. 2 which includes a denitrification zone.

FIG. 3 shows an alternative embodiment of a membrane biological reactor system 300 that utilizes a biological denitrification operation. Other specialized biological or chemical treatment systems required by a specific influent wastewater can also be incorporated in the system of the present invention generally shown with respect to FIG. 2, as will be apparent to a person having ordinary skill in the art. The embodiment of FIG. 3 is similar to the embodiment of FIG. 2, with the addition of an anoxic (low oxygen concentration) zone 331. In the embodiments herein using an anoxic zone or vessel, a simple organic carbon source, such as methanol or the biochemical oxygen demand content of the wastewater itself, provides for the consumption by biological organisms. Wastewater 306 is introduced into the anoxic zone 331, which is in fluid communication with the biological reactor 302 containing adsorbent material 334. The anoxic zone 331 can include a mixer and/or an aeration device (not shown). In embodiments herein in which an aeration device is used, the dissolved oxygen concentration is controlled to maintain anoxic conditions. Effluent from the biological reactor 302 is introduced via a separation subsystem 322 to an inlet 310 of the membrane operating system 304. In the membrane operating system 304, the wastewater passes through one or more microfiltration or ultra-filtration membranes, thereby eliminating or minimizing the need for clarification and/or tertiary filtration. Membrane permeate, i.e., liquid that passes through the membranes 340, is discharged from the membrane operating system 304 via an outlet 312. Membrane retentate, i.e., solids from the biological reactor 302 effluent, including activated sludge, is returned to the anoxic zone 331 via a return activated sludge line 314. Spent adsorbent material from the biological reactor 302 can be removed via a mixed liquor waste discharge port 316 of the biological reactor 302. A waste outlet 318 can also be connected to the return pipe 314 to divert some or all the return activated sludge for disposal, for instance, to control the concentration of the mixed liquor and/or culture. The mixed liquor waste discharge port 316 can also be used to remove a portion of the adsorbent material. An equivalent quantity of fresh or regenerated adsorbent material can be added.

As in the system described in FIG. 2, there are multiple locations at which the adsorbent material 334 can be added to the system. In a preferred embodiment, adsorbent material is added at a location 330b that prevents passage into anoxic zone 331.

Figure 4:
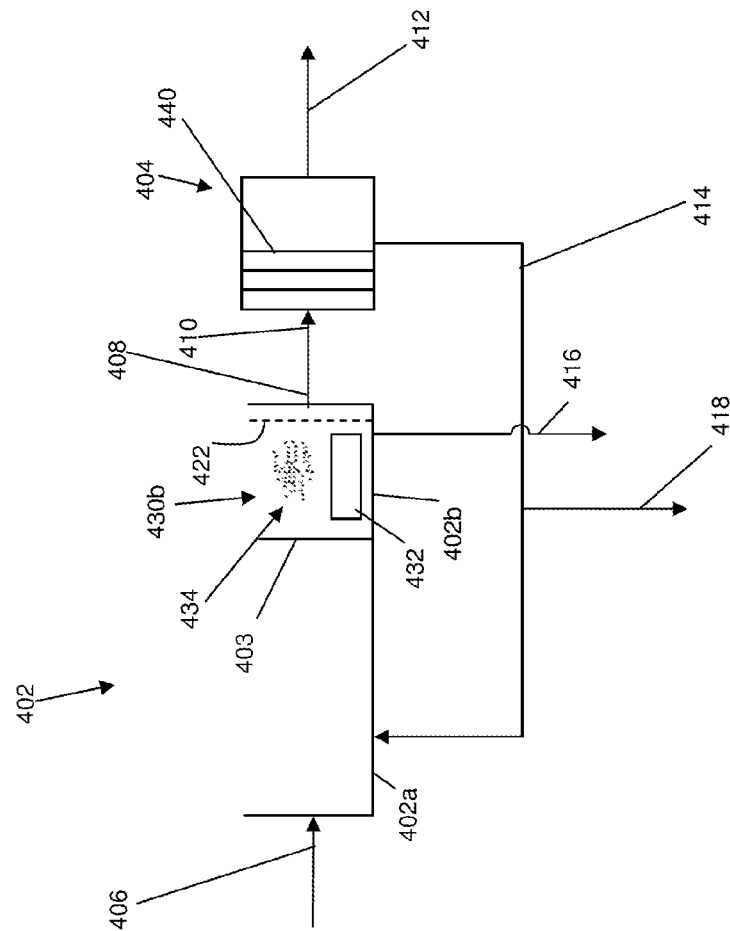
FIG. 4 is a schematic diagram of another embodiment in which adsorbent material is maintained in suspension in only a portion of a biological reactor tank.

FIG. 4 is a schematic depiction of a water treatment system 400 which is one embodiment of a system 100 shown in FIG. 1. In system 400, a biological reactor 402 is divided or partitioned into multiple sections 402a and 402b, e.g., using a baffle wall 403. A membrane operating system 404 is positioned downstream of biological reactor 402.

The hydraulic flow between zones 402a and 402b is engineered to provide a flow in the downstream direction. This can be accomplished by configurations and/or apparatus including, but not limited to an overflow weir, submerged orifices, and/or various distribution piping arrangements, for the purpose of maintaining positive separation between zones 402a and 402b and to maintain adsorbent material 434 only in zone 402b. These various configurations can also be designed so as to control the rate of flow between zones 402a and 402b. Further specific arrangements are not illustrated as these will be known to one of ordinary skill in the art.

During operation, an influent wastewater stream 406 is introduced into the biological reactor 402, and in particular to the first zone 402a of the biological reactor 402. As was discussed above, it will be apparent to a person having ordinary skill in the art, phosphorus, nitrogen, and pH adjustment materials or chemicals can be added to maintain optimal nutrient ratios and pH levels for the biological life and associated activity, including biological oxidation, in the first zone 402a. The micro-organisms in the first zone 402a are capable of breaking down at least a portion of the biologically labile content of the mixed liquor suspended solids. The simple carbon, i.e., biologically labile compounds, in the mixed liquor suspended solids serve as a food source for the micro-organisms. Wastewater can be treated in zone 402a to remove substantially all of the biologically labile content of the mixed liquor suspended solids, or, in certain embodiments, a portion of the biologically labile content of the mixed liquor suspended solids can be retained for passage into the biological reaction zone 402b. In embodiments in which the biologically labile content of the mixed liquor suspended solids is reduced in zone 402a to a level that is insufficient to efficiently support micro-organisms downstream, one or more controls are implemented to maintain an effective concentration of a micro-organism food source, particularly in the downstream biological reaction zone 402b. This control can be, for instance, based on the residence time of wastewater in the upstream zone 402a, passing a slipstream of untreated influent wastewater directly to the zone 402b, controlling the return activated sludge, introducing methanol or other simple carbon food source for the micro-organisms, or provide intermittent aeration in zone 402a, or other methods that promote a healthy biomass in zone 402b.

Adsorbent material 434 is maintained in suspension in biological reaction zone 402b using a suspension apparatus 432, which can include one or more of the suspension systems described herein, e.g., as shown in FIG. 7, 8, 9, 10, 11 or 12, in the examples herein, or any suitable conventional apparatus for circulating air, liquid or a combination of air and liquid. These conventional apparatus include, but are not limited to, air diffusion bubblers, paddles, mixers, surface aerators, liquid circulating pumps, and others that are known to one of ordinary skill in the art. It should be appreciated that, while in certain embodiments it is desirable to use a suspension apparatus 432 having relatively low energy consumption to maintain the adsorbent material 434 in suspension, such as those described in conjunction with FIG. 7, 8, 9, 10, 11, or 12, or in Example 3, Example 4, or Example 5, other embodiments using less efficient apparatus are also suitable, as the overall volume of the zone 402b within which adsorbent material 434 must be maintained in suspension is only a portion of the total volume of the biological reactor 402.

A screening/separation system 422 is positioned in section 402b to substantially prevent passage of adsorbent material 434 to the membrane operating system 404. In certain embodiments, adsorbent material is added only at location 430b, i.e., corresponding to zone 402b.

Note that while system 400 is shown with one substantially adsorbent-free biological reactor zone, and one zone containing adsorbent material 434, it will be appreciated by one of ordinary skill in the art that a fewer or a greater number of zones of each type can be employed. The concentration of adsorbent material 434 in section 402b can be the same concentration as employed, e.g., in the system of FIG. 1, or a higher or lower concentration can be used depending on the wastewater being treated.

In addition, the biological reactor zones can be formed in various configurations. For instance, in a prismatic biological reactor tank, a partition wall can be provided across the width of the tank to divide it into zones. In a cylindrical tank, for example, a partition wall can be provided as a chord, or plural walls, e.g., as radii, can be provided that form two or more sectors.

By having adsorbent material only in the final biological reaction zone or zones, biologically labile compounds can be treated in the upstream section without adsorbent material and hence without the need to suspend the adsorbent material in the mixed liquor of the adsorbent-free zones of system 400. This also permits development of a colony of micro-organisms that can biodegrade at least certain biologically refractory and/or biologically inhibitory compounds that cannot be biologically decomposed by the traditional microorganisms that would exist in the upstream sections of this system. It will also be appreciated by one of ordinary skill in the art that a system similar to system 400 can be provided according to the present invention using separate tanks rather than divided sections of a biological reactor, as shown schematically in FIG. 6, or a combination of divided sections of a biological reactor and separate vessels.

Still referring to FIG. 4, effluent from the biological reaction zone 402b is introduced via the screening/separation system 422 to an inlet 410 of the membrane operating system 404. In the membrane operating system 404, the wastewater passes through one or more microfiltration or ultra-filtration membranes 440, and membrane permeate is discharged via an outlet 412 while membrane retentate, including activated sludge, is returned to the biological reaction zone 402a via a return activated sludge line 414.

Spent adsorbent material from the biological reaction zone 402b can be removed periodically via a mixed liquor waste discharge port 416. A waste outlet 418 can also be connected to the return activated sludge line 414 to divert some or all the return activated sludge for disposal, for instance, to control the concentration of the mixed liquor and/or culture. The mixed liquor waste discharge port 416 can also be used to remove a portion of the adsorbent material. An equivalent quantity of fresh or regenerated adsorbent material can be added.

Figure 5:
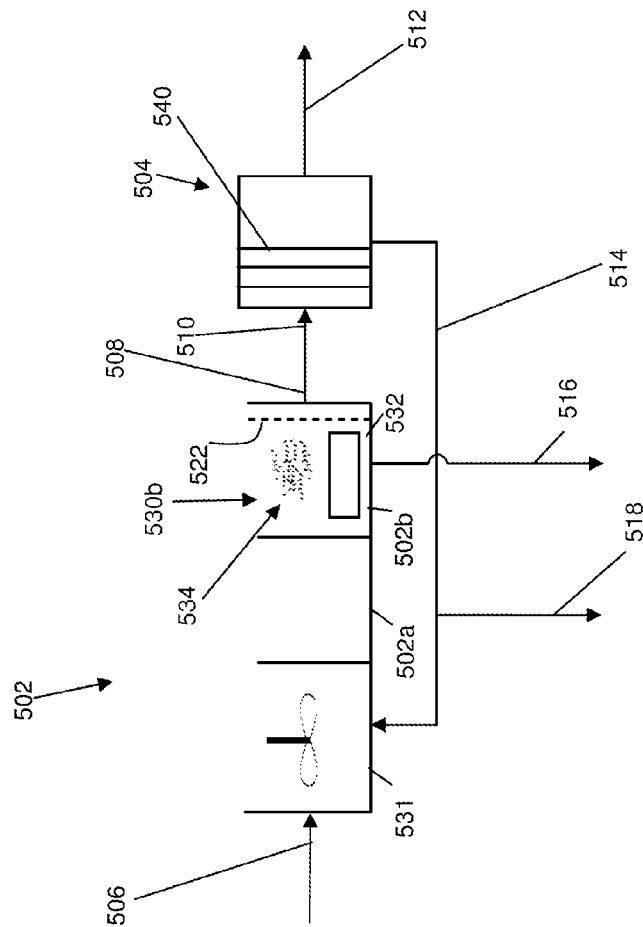
FIG. 5 is a schematic diagram of a further embodiment of a biological reactor divided into multiple sections that includes an anoxic zone.

FIG. 5 shows a system 500 that operates in a manner similar to system 400, with a biological reactor 502 that is divided into multiple zones 502a and 502b, and includes a biological denitrification step that is integrated with the biological reactor 502. In this embodiment, adsorbent material 535 added, e.g., a location 530b, and is maintained in suspension in zone 502b and not introduced into the anoxic zone 531 or zone 502a.

Effluent from the biological reaction zone 502b is introduced via the screening/separation system 522 to an inlet 510 of the membrane operating system 504. In the membrane operating system 504, the wastewater passes through one or more microfiltration or ultra-filtration membranes 540, and membrane permeate is discharged via an outlet 512 while membrane retentate, including activated sludge, is returned to the anoxic zone 531 via a return activated sludge line 514.

Spent adsorbent material from the biological reaction zone 502b can be removed periodically via a mixed liquor waste discharge port 516. A waste outlet 518 can also be connected to the return activated sludge line 514 to divert some or all the return activated sludge for disposal, for instance, to control the concentration of the mixed liquor and/or culture. The mixed liquor waste discharge port 516 can also be used to remove a portion of the adsorbent material. An equivalent quantity of fresh or regenerated adsorbent material can be added.

Under certain operational conditions, it may be necessary to introduce a simple organic carbon source, such as methanol to the anoxic zone, to assist with the denitrification process. Alternatively, the biological oxygen demand content of the raw wastewater can typically provide the necessary food source for consumption by biological organisms.

In further embodiments, an anoxic zone can be provided downstream (not shown) of zone 502b, or between zones 502a and 502b. In either case, it will likely be necessary to add a food source for consumption by biological organisms in the anoxic zone to assist with the denitrification process.

Figure 6:
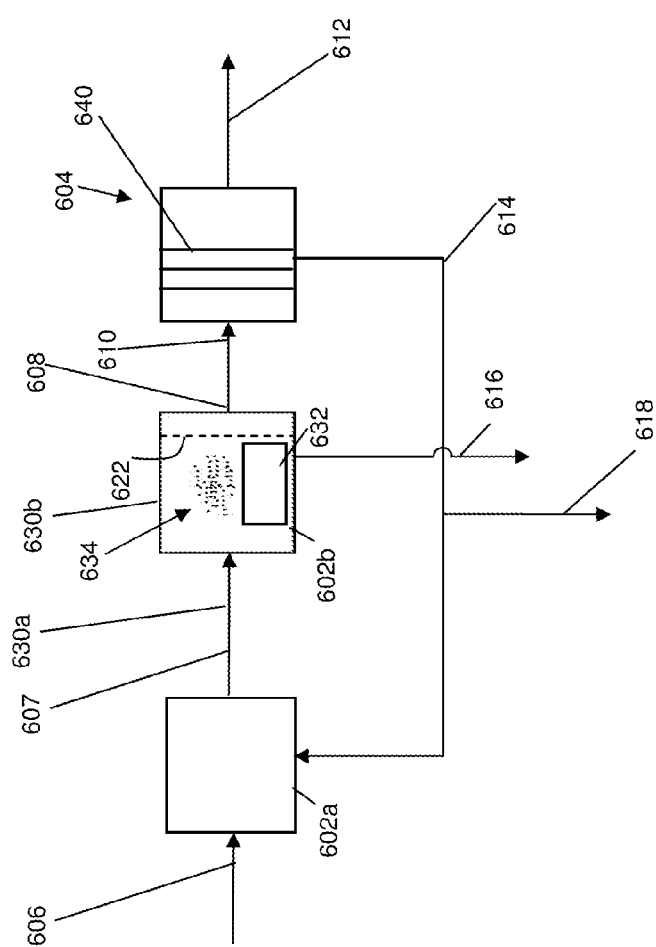
FIG. 6 is a schematic diagram of an additional embodiment using a series of biological reactors in which adsorbent material is maintained in suspension in only one of the biological reactors.

It will also be appreciated by one of ordinary skill in the art that a system similar to system 500 can be provided according to the present invention using separate biological reactors rather than divided sections of a biological reactor, as shown schematically in FIG. 6, or a combination of divided sections of a biological reactor and separate reactors.

FIG. 6 is a schematic depiction of another embodiment of a water treatment system 600. In system 600, a series of biological reactors are provided, including a first biological reactor 602a that is substantially free of adsorbent material, and a second biological reactor 602b that contains a suspension of adsorbent material 634 that can be added, e.g., one or both of locations 630a and 630b. A membrane operating system 604 is positioned downstream of biological reactor 602a and 602b. The second biological reactor 602b includes a screening/separation system 622 is positioned in section 602b to substantially prevent passage of adsorbent material to the membrane operating system 604.

The hydraulic flow between reactors 602a and 602b is engineered to provide a flow in the downstream direction to maintain adsorbent material only in zone 602b, i.e., to prevent backflow of adsorbent material from reactor 602b to reactor 602a, and can be designed so as to control the rate of flow between zones 602a and 602b.

During operation, an influent wastewater stream 606 is introduced into the biological reactor 602a. Micro-organisms in the first biological reactor 602a are capable of breaking down at least a portion of the biologically labile compounds contained in the mixed liquor suspended solids. The simple organics in the mixed liquor suspended solids serve as a food source for the micro-organisms. The partially-treated wastewater is passed via conduit 607 to the biological reactor 602b.

Partially-treated wastewater from the biological reactor 602a can also be gravity-fed to the biological reactor 602b, or passed by other means know to those having ordinary skill in the art.

Wastewater can be treated in the first biological reactor 602a to remove substantially all of the biologically labile compounds of the mixed liquor suspended solids, or, in certain embodiments, a portion of the biologically labile compounds contained in the mixed liquor suspended solids can be retained for passage into the second biological reactor 602b. In embodiments in which the biologically labile compounds contained in the mixed liquor suspended solids is reduced in the first biological reactor 602a to a level that is insufficient to efficiently support micro-organisms downstream, one or more controls are implemented to maintain an effective concentration of a micro-organism food source, particularly in the downstream biological reactor 602b. This control can be, for instance, based on the residence time of wastewater in the upstream biological reactor 602a, passing a slipstream of untreated influent wastewater directly to the biological reactor 602b, controlling the return activated sludge, introducing methanol or other simple carbon food source for the micro-organisms, or other suitable feedback or feedforward action.

Adsorbent material 634 is maintained in suspension in the biological reactor 602b using a suspension apparatus 632, which can include one or more of the suspension systems described herein, e.g., as shown in FIG. 7, 8, 9, 10, 11 or 12, in the examples herein, or any suitable conventional apparatus for circulating air, liquid or a combination of air and liquid. These conventional apparatus include, but are not limited to, air diffusion bubblers, paddles, mixers, surface aerators, liquid circulating pumps, and others that are known to one of ordinary skill in the art. It should be appreciated that, while in certain embodiments it is desirable to use a suspension apparatus 632 having relatively low energy consumption to maintain the adsorbent material in suspension, such as those described in conjunction with FIG. 7, 8, 9, 10, 11 or 12, or in Example 3, Example 4, or Example 5, other embodiments using less efficient apparatus are also suitable, as the overall volume of the zone 602b is only a portion of the total combined volume of the biological reactors 602a and 602b.

The screening/separation system 622 is positioned in biological reactor 602b to substantially prevent passage of adsorbent material 634 to the membrane operating system 604. In certain instances, adsorbent material 634 is added only to the biological reactor 602b, e.g., at location 630a associated with the conduit 607, or directly into the biological reactor 602b (location 630b). In certain preferred embodiments, adsorbent material is pre-wetted, e.g., to form a slurry, prior to introduction into the biological reactor 602b.

Note that while system 600 is shown with one substantially adsorbent-free biological reactor, and one biological reactor containing adsorbent material 634, it will be appreciated by one of ordinary skill in the art that a fewer or a greater number of biological reactors, or sections of biological reactors, of each type can be employed. The concentration of adsorbent material in biological reactor 602b can be the same concentration as employed, e.g., in the system of FIG. 1, or a higher concentration can be used, depending on factors including but not limited to the characteristics of the partially-treated wastewater to be treated in biological reactor 602b.

By having adsorbent material only in the final biological reactor, biologically labile compounds can be treated in the upstream biological reactor without adsorbent material. This permits development of a colony of micro-organisms that can biodegrade the biologically refractory organisms that cannot be biologically oxidized by the traditional microorganisms that would exist in the upstream sections of this system. It will also be appreciated by one of ordinary skill in the art that a system similar to system 600 can be provided according to the present invention using divided sections of a biological reactor rather than separate biological reactors, as shown schematically in FIG. 4, or a combination of divided sections of a biological reactor and separate reactors.

Still referring to FIG. 6, effluent from the biological reactor 602b is introduced via the screening/separation system 622 to an inlet 610 of the membrane operating system 604. In the membrane operating system 604, the wastewater passes through one or more microfiltration or ultra-filtration membranes 640, and membrane permeate is discharged via an outlet 612 while membrane retentate, including activated sludge, is returned to the biological reactor 602a via a return activated sludge line 614.

Spent adsorbent material from the biological reactor 602b can be removed periodically via a mixed liquor waste discharge port 616. A waste outlet 618 can also be connected to the return pipe 614 to divert some or all the return activated sludge for disposal, for instance, to control the concentration of the mixed liquor and/or culture.

Figure 7:
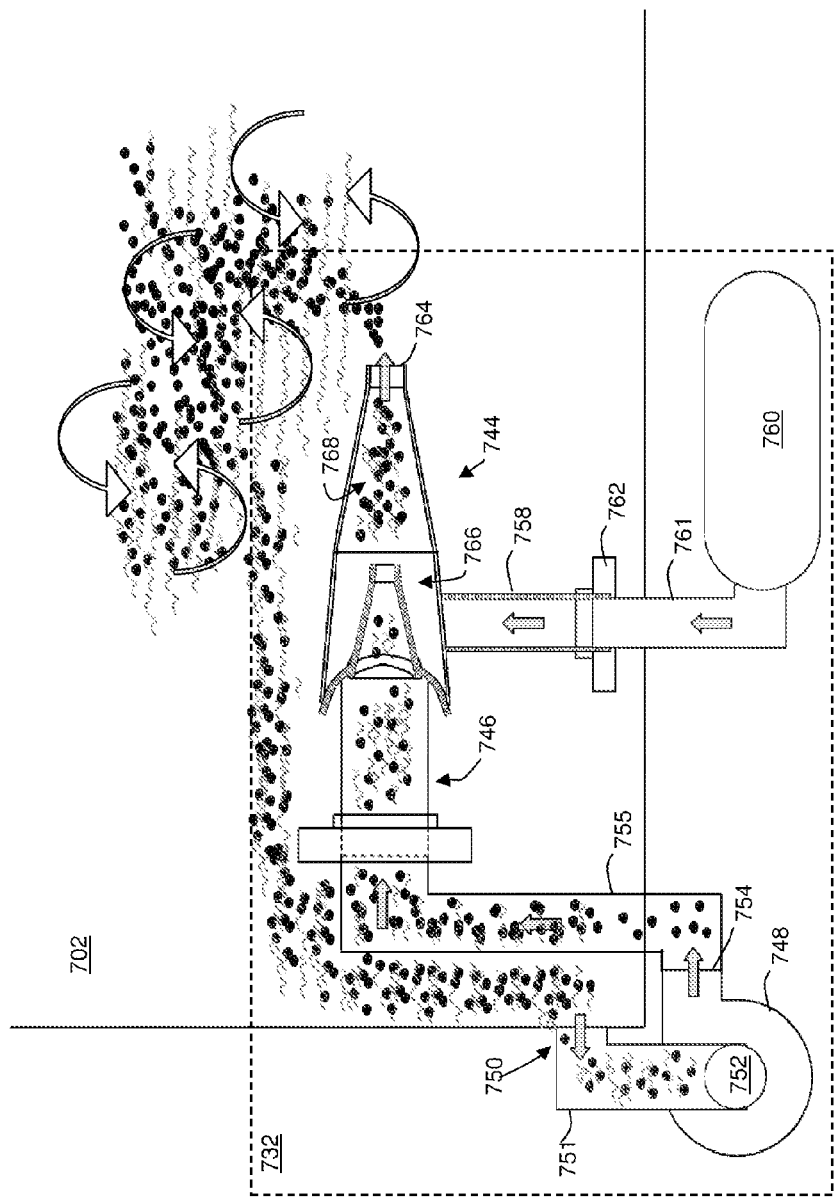
FIG. 7 and FIG. 8 are embodiments of biological reactor systems depicting a jet suspension system for suspension of adsorbent material in mixed liquor.
Figure 8:
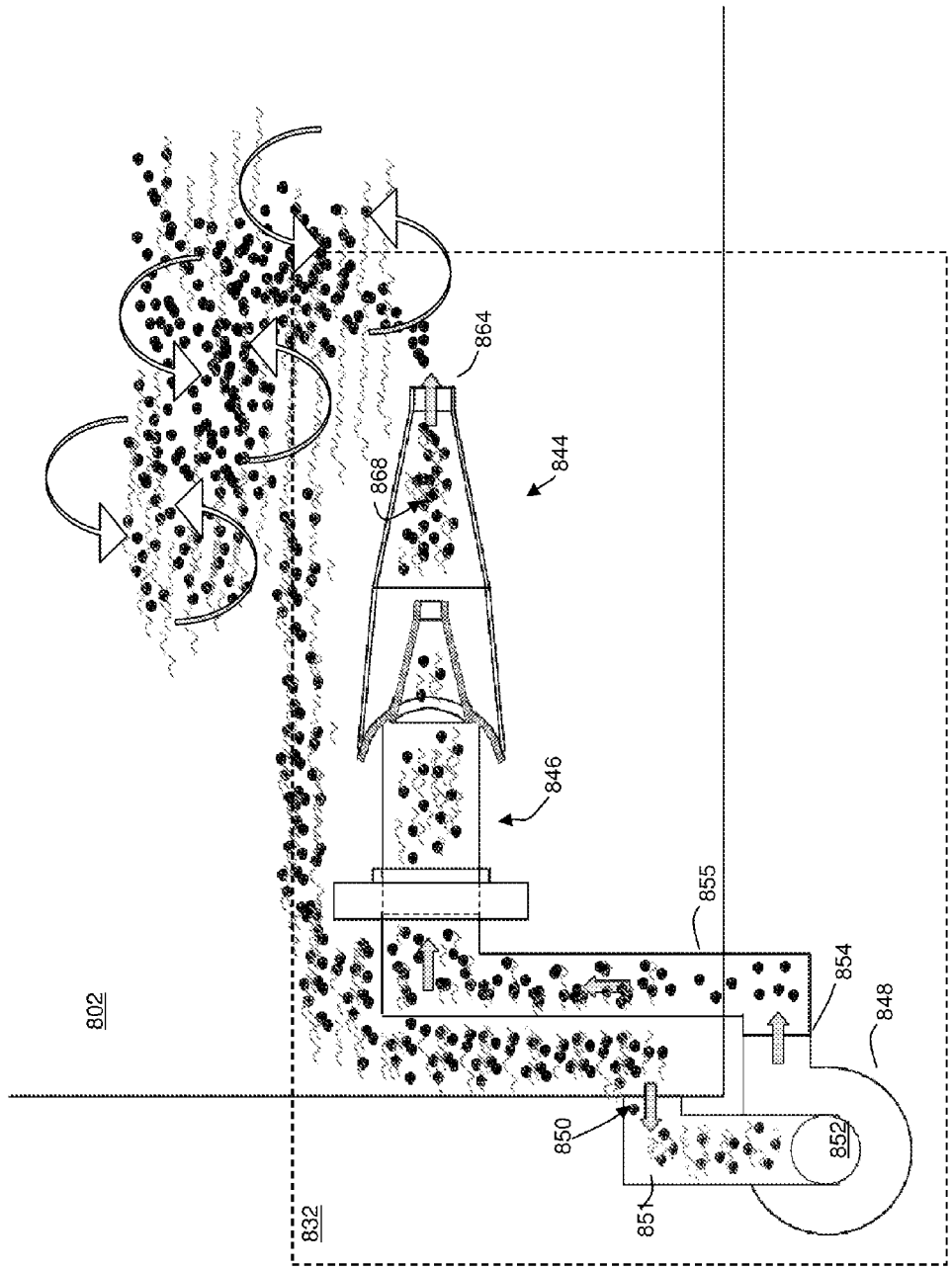
Figure 9:
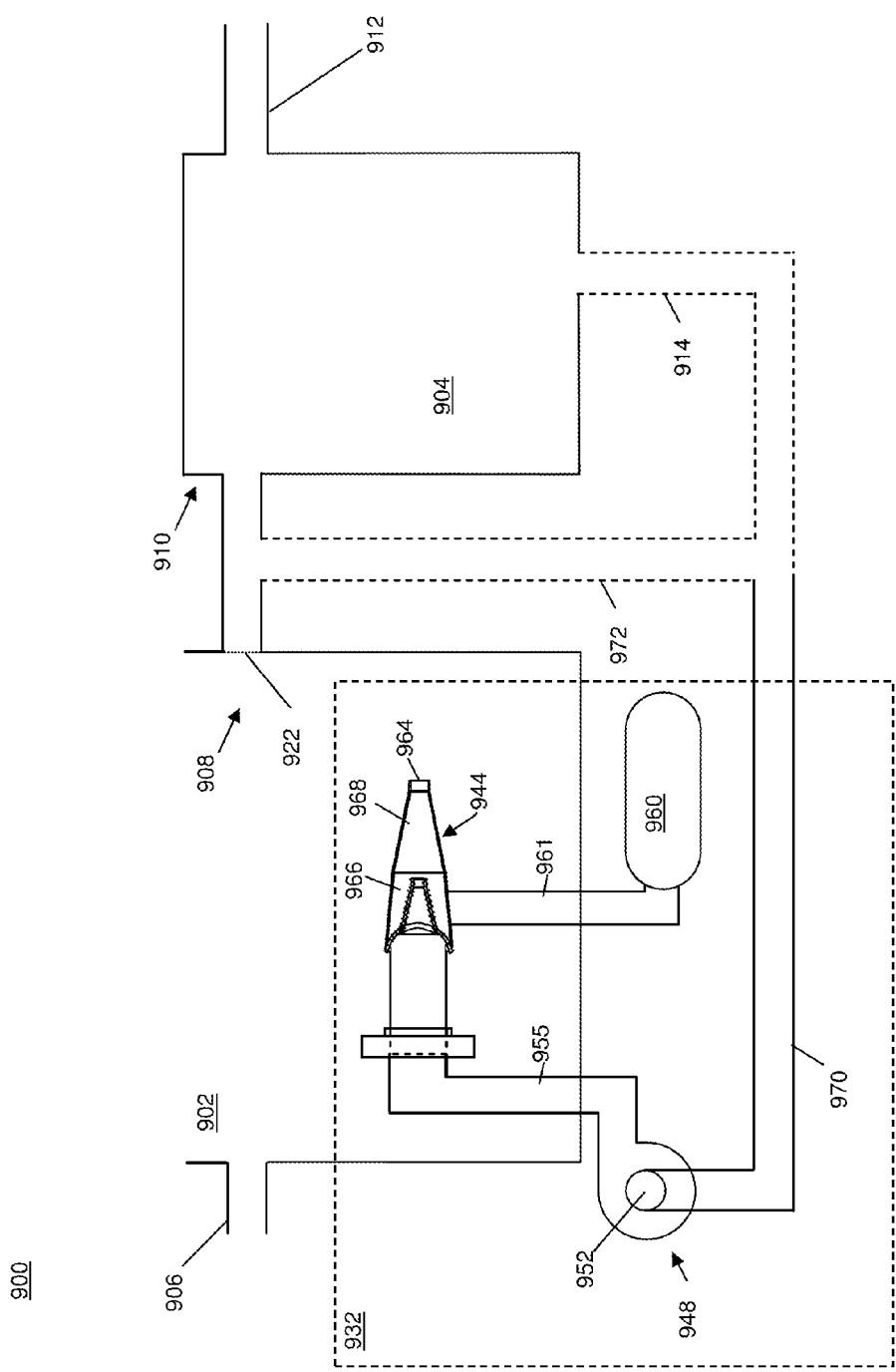
FIGS. 9 and 10 are alternative embodiments of biological reactor systems depicting a jet suspension system for suspension of adsorbent material in mixed liquor, in which mixed liquor taken from a source that has had adsorbent material removed.
Figure 10:
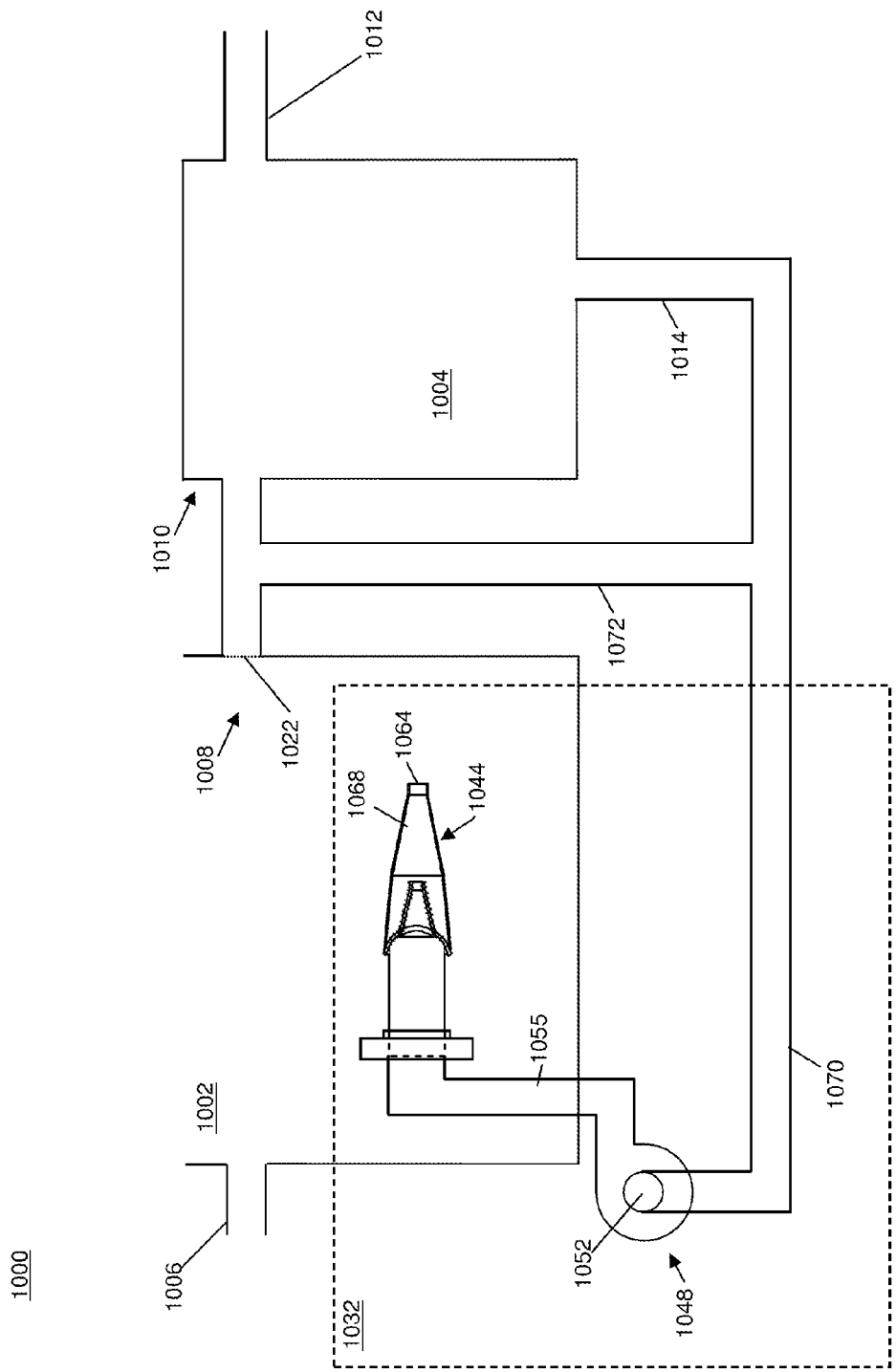
Figure 11:
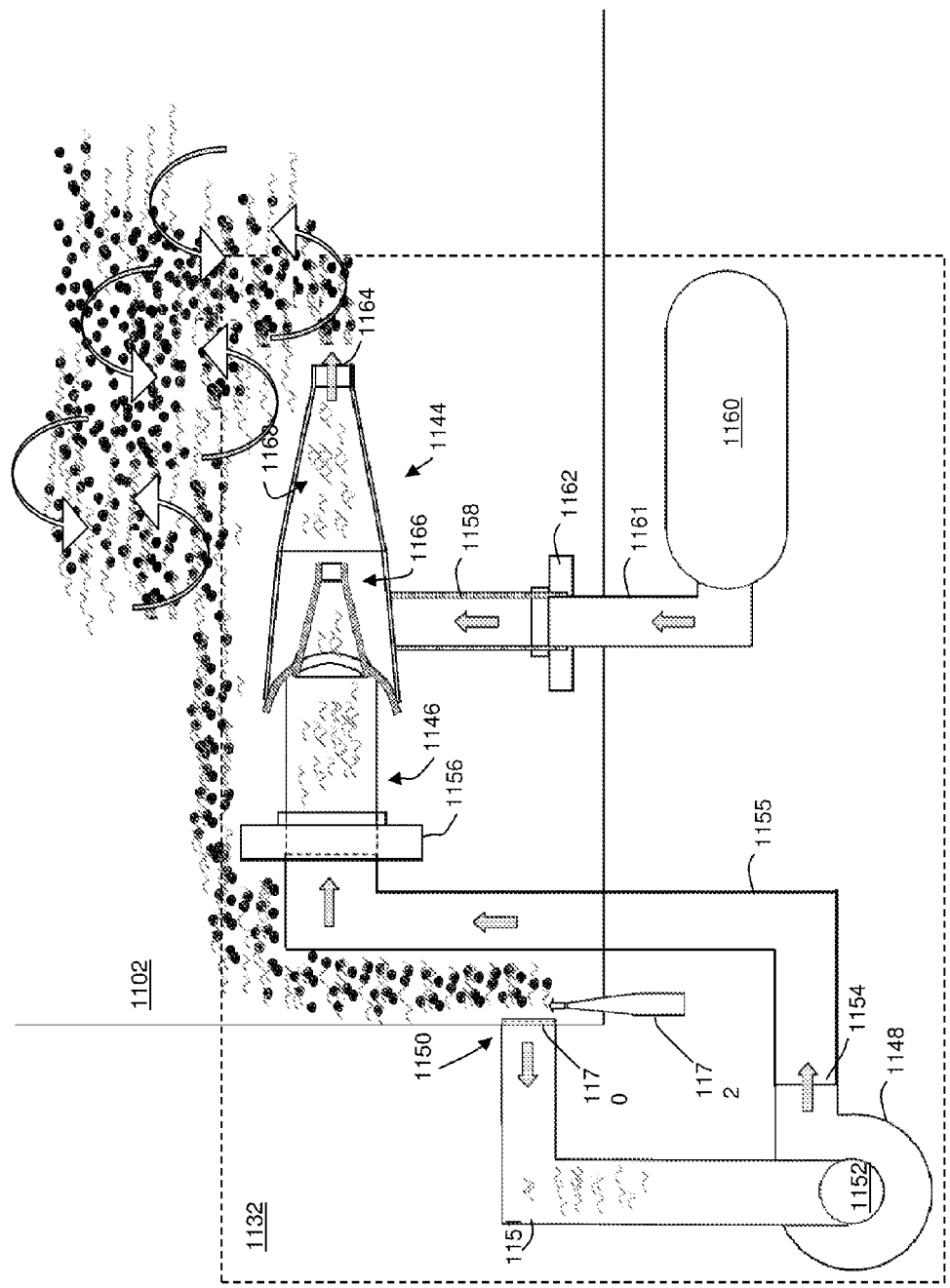
FIG. 11 is an alternative embodiment depicting a jet suspension system for suspension of adsorbent material in mixed liquor in which adsorbent material is not circulated through the jet nozzle.

Referring generally to FIGS. 7, 8, 9, 10 and 11, various alternative embodiments are shown including a jet suspension system in which mixed liquor (including MLSS having MLVSS) and adsorbent dispersed therein is circulated through a jet nozzle. This circulation provides for intimate mixing of the adsorbent and the mixed liquor, and also provides turbulence that maintains the adsorbent in suspension in the biological reactor. The turbulence can be localized turbulence, e.g., proximate the nozzle orifice, causing swirling and rolling of the fluid exiting the jet nozzle. In FIGS. 7, 8 and 11, solid black elements represent adsorbent material, and irregular linear elements represent micro-organisms or biomass.

FIG. 7 schematically depicts a suspension apparatus 732 within a biological reactor 702 (a portion of which is shown in the figure for clarity of exposition). The suspension apparatus 732 comprises a jet nozzle 744 fluidly connected to a pump 748 and a source 760 of gas. The gas can be an oxygen-containing gas in the case of an aerobic biological reactor 702, or a gas free of oxygen or substantially free of oxygen in the case of an anaerobic biological reactor 702.

The configuration shown in FIG. 7, and in certain additional embodiments described in conjunction with FIGS. 8, 9 and 10, can be deployed using, for instance, the Vari Cant® system that is commercially available from Siemens Water Technologies of Rothschild, Wis., USA. Other jet aeration systems can also be deployed for one or more of the systems shown with respect to FIGS. 8, 9 and 10. For instance, various systems include, but are not limited to, jet aeration systems that are commercially available from Fluidyne Corporation of Cedar Falls, Iowa, USA; KLa Systems of Assonet, Mass., USA; and Mixing Systems Inc. of Dayton, Ohio, USA.

Note that while the systems described herein with respect to FIGS. 7, 8, 9, 10, and 11 generally depict a pump outside of the biological reactor tank, a person having ordinary skill in the art will appreciate that one or more pumps can also be positioned inside of the tank(s). In further embodiments, one or more pumps can be positioned inside or outside of a head tank to maintain positive suction.

In addition, while the systems described herein with respect to FIGS. 7, 8, 9, 10 and 11 generally show, for purposes of illustration, the entire jet nozzle positioned in the biological reactor tank, in certain embodiments a portion of the jet nozzle(s) can be positioned outside of the biological reactor tank, with at least their outlet orifice(s) located in the biological reactor tank.

The jet nozzle 744 liquid inlet 746 and outlet orifice 764, and the pump apparatus 748 inlet 752 and outlet 754, are dimensioned and configured to allow passage of adsorbent material and MLSS, including MLVSS. Accordingly, a mixture of mixed liquor, including MLSS and MLVSS, and adsorbent material is drawn from an outlet 750 of the biological reactor 702 into an inlet 752 of the pump apparatus 748 through a line 751. The mixture is pumped out of the pump apparatus 748 via an outlet 754, through a line 755 and directed to a liquid inlet 746 integral with or otherwise in fluid communication with the jet nozzle 744.

Simultaneously, gas 760 is directed through line 761 to a gas inlet 758 integral with or otherwise in fluid communication with the jet nozzle 744 and is directed to a mixing chamber 766, where it expands and imparts motive energy to the mixed stream of mixed liquor and dispersed adsorbent material in the direction of the nozzle outlet orifice 764. The expanded gas, mixed liquor and dispersed adsorbent material pass through a throat 768 having decreasing cross-sectional area in a direction of fluid flow, in which the velocity is increased, and out of the outlet orifice 764. The combined stream of gas, liquid, and solid particles forcefully enters the biological reactor 702, and the solid granules of adsorbent material remain in suspension under continuous operation due to the liquid turbulence in the biological reactor 702.

Referring now to FIG. 8, another embodiment of a biological reactor is shown including a jet suspension system. In particular, a biological reactor 802 includes a jet suspension system 832 including a jet nozzle 844 having at least an outlet orifice 864 located in the biological reactor 802 for circulating mixed liquor having adsorbent material dispersed therein. The jet nozzle 844 is fluidly connected to a pump 848 to circulate mixed liquor having adsorbent material dispersed therein to create turbulence that maintains the adsorbent material in suspension. Any jet mixer, sprayer or other device capable of directing and discharging the mixed liquor having adsorbent material dispersed therein without requiring a gas inlet can be used as the jet nozzle 844 as will be appreciated by one having ordinary skill in the art.

In aerobic biological reactors 802, a source of oxygen-containing gas is also provided (not shown), such as a conventional air diffusion apparatus.

The liquid inlet 846 and outlet orifice 864 of the jet nozzle 844, and the inlet 852 and outlet 854 of the pump apparatus 848, are dimensioned and configured to allow passage of adsorbent material and mixed liquor suspended solids, including mixed liquor suspended volatile solids. Accordingly, a mixture of mixed liquor, including MLSS and MLVSS, and adsorbent material is drawn from an outlet 850 of the biological reactor 802 into inlet 852 of the pump apparatus 848 through a line 851. The mixture is pumped out of the pump apparatus 848 via outlet 854, through a line 855 and directed to a liquid inlet 846 integral with or otherwise in fluid communication with the jet nozzle 844. The jet nozzle 844 includes a throat portion 868 having decreasing cross-sectional area in a direction of fluid flow to increase velocity of mixed liquor and adsorbent material exiting an outlet orifice 864.

Referring generally to FIGS. 9, 10 and 11, alternative embodiments are shown including a jet suspension system in which mixed liquor and/or return activated sludge is circulated through a jet nozzle without adsorbent material. This circulation provides for intimate mixing of the adsorbent material and the mixed liquor at the outlet of the jet nozzle, and also provides turbulence that maintains the adsorbent material in suspension within the biological reactor. The turbulence can be localized turbulence, e.g., proximate the nozzle orifice, causing swirling and rolling of the fluid exiting the jet nozzle.

FIG. 9 schematically depicts a wastewater treatment system 900 including a suspension apparatus 932 within a biological reactor 902 and upstream of a membrane operating system 904. The suspension apparatus 932 comprises a jet nozzle 944 fluidly connected to a pump 948 and a source 960 of compressed gas. The system 900 includes a screening/separation system 922 which prevents passage of at least a majority of adsorbent material, for instance, at the outlet 908 of the biological reactor 902.

In certain embodiments, mixed liquor is drawn from the effluent of the biological reactor 902 into an inlet 952 of the pump apparatus 948 through conduits 972, 970, wherein conduit 972 is between the outlet 908 of the biological reactor 902 and the inlet 910 of the membrane operating system 904. In additional embodiments, return activated sludge is drawn from a conduit 914 from the membrane operating system 904 into line 970 into the inlet 952 of the pump apparatus 948. In further embodiments, a combined stream of effluent from the biological reactor 902 and return activated sludge from the membrane operating system 904 is used as the liquid providing circulation to the pump. Liquid from the effluent and/or the return activated sludge is pumped out of the pump apparatus 948 through a line 955 and directed to a liquid inlet integral with or otherwise in fluid communication with the jet nozzle 944. In conjunction, compressed gas 960 is directed through line 961 to a gas inlet integral with or otherwise in fluid communication with the jet nozzle 944 and is directed to a mixing chamber 966, where it expands and imparts motive energy to the mixed liquor in the direction of the nozzle outlet orifice 964. The expanded gas and mixed liquor pass through a throat 968 having decreasing cross-sectional area in a direction of fluid flow, in which the velocity is increased, and out of the outlet orifice 964. The combined stream of gas and liquid forcefully enters the biological reactor 902, and the solid granules of adsorbent material remain in suspension under continuous operation due to turbulence in the biological reactor 902.

FIG. 10, schematically depicts another embodiment of a wastewater treatment system, in which wastewater treatment system 1000 includes a suspension apparatus 1032 within a biological reactor 1002 and upstream of a membrane operating system 1004. The system 1000 includes a screening/separation system 1022 which prevents passage of at least a majority of adsorbent material, for instance, at the outlet 1008 of the biological reactor 1002. The suspension apparatus includes a jet nozzle 1044 fluidly connected to a pump 1048 to circulate mixed liquor to create turbulence that maintains the adsorbent in suspension. In aerobic biological reactors 1002, a source of oxygen-containing gas is also provided (not shown), such as a conventional air diffusion apparatus or any number of other devices that can transfer oxygen into the mixed liquor as would be apparent to one of ordinary skill in the art.

The liquid flow in system 1000 is similar to that of system 900 shown and described with respect to FIG. 9 above. Accordingly, in certain embodiments, mixed liquor is drawn from the effluent of the biological reactor 1002 into an inlet 1052 of the pump apparatus 1048 through conduits 1072, 1070, wherein conduit 1072 is between the outlet 1008 of the biological reactor 1002 and the inlet 1010 of the membrane operating system 1004. In additional embodiments, return activated sludge is drawn from a conduit 1014 from the membrane operating system 1004 into line 1070 into the inlet 1052 of the pump apparatus 1048. In further embodiments, a combined stream of effluent from the biological reactor 1002 and return activated sludge from the membrane operating system 1004 is used as the liquid providing circulation to the pump.

Liquid from the effluent and/or the return activated sludge is pumped out of the pump apparatus 1048 through a line 1055 and directed to a liquid inlet integral with or otherwise in fluid communication with the jet nozzle 1044. The mixed liquor passes through a throat 1068 having decreasing cross-sectional area in a direction of fluid flow, in which the velocity is increased, and out of the outlet orifice 1064. The liquid stream forcefully enters the biological reactor 1002, and the solid granules of adsorbent material remain in suspension under continuous operation due to turbulence in the biological reactor 1002.

In certain embodiments of systems 900 and 1000, it can be necessary to design the hydraulics of the system so that the flow rate through the pump is equal to, or greater than the overall flow rate through the system, i.e., represented by the flow rate of the influent 906, 1006 and the effluent 912, 1012.

FIG. 11 schematically depicts a suspension apparatus 1132 within a biological reactor 1102 (a portion of which is shown in the figure for clarity of exposition). The suspension apparatus 1132 comprises a jet nozzle 1144 fluidly connected to a pump 1148 and a source 1160 of gas. The gas can be an oxygen-containing gas in the case of an aerobic biological reactor 1102, or a gas free of oxygen or substantially free of oxygen in the case of an anaerobic biological reactor 1102.

An outlet 1150 of the biological reactor 1102 includes a screening apparatus 1170 which prevents passage of at least a majority of adsorbent material. A spray nozzle 1172 or other suitable apparatus is provided to remove build-up from the screening apparatus 1170. Spay nozzle 1172 can direct gas and/or liquid to clear the screening apparatus. In certain embodiments (not shown), spray nozzle 1172 can be connected to a pump and/or the source 1160 of compressed gas, to provide pressurized fluid to clear the screening apparatus 1170. In additional embodiments, the spray nozzle 1172 can be eliminated, for instance, when the screening apparatus 1170 is an active screening device such as a rotary screen or the like that prevents build-up of adsorbent material.

Accordingly, mixed liquor, including MLSS and MLVSS, that is substantially free of adsorbent material is drawn from the outlet 1150 of the biological reactor 1102 into an inlet 1152 of the pump apparatus 1148 through a line 1151. Mixed liquor is pumped out of the pump apparatus 1148 via an outlet 1154, through a line 1155 and directed to a liquid inlet 1146 integral with or otherwise in fluid communication with the jet nozzle 1144. In conjunction, compressed gas 1160 is directed through line 1161 to a gas inlet 1158 integral with or otherwise in fluid communication with the jet nozzle 1144 and is directed to a mixing chamber 1166, where it expands and imparts motive energy to the mixed liquor in the direction of the nozzle outlet orifice 1164. The expanded gas and mixed liquor pass through a throat 1168 having decreasing cross-sectional area in a direction of fluid flow, in which the velocity is increased, and out of the outlet orifice 1164. The combined stream of gas and liquid forcefully enters the biological reactor 1102, and the solid granules of adsorbent material remain in suspension under continuous operation due to turbulence in the biological reactor 1102.

In certain embodiments of the wastewater treatment system described herein, the system includes a gas lift suspension system which may comprise one or more draft tubes or one or more other configurations. The one or more draft tubes may be sized and shaped for a desired application and volume of a vessel, such as a biological reactor or other apparatus, to perform one or more of suspending the adsorbent material, maintaining the adsorbent material in suspension, mixing the adsorbent material throughout the vessel, and aerating the environment of the vessel, which may include aerobic microorganisms. The gas lift suspension system may be constructed of various sizes and shapes based on the size and shape of the vessel into which it is placed. The gas lift suspension system may comprise one or more draft tubes positioned within a vessel in which an adsorbent material is incorporated into the wastewater treatment system. As used herein, a "draft tube" may be a tube or other structure having one or more sidewalls open at both ends which when positioned in a vessel provides a passageway for fluid flow and may include solid particle suspension, for example, the suspension of adsorbent material and related solids in a wastewater or mixed liquor with air or other gas.

The draft tube may be constructed of any material suitable for a particular purpose as long as it is abrasion resistant, resistant to wastewater components at typical conditions for wastewater treatment, and able to withstand turbulent flows through and around the draft tube. For example, the draft tube may be formed of the same material as the vessel or may be formed of other lighter and less expensive materials, such as plastics, including fiberglass reinforced plastics, polyvinyl chloride (PVC), or acrylic. The draft tube may be preformed for insertion into the vessel, or manufactured as part of the vessel. As such, the draft tube may be designed to retrofit current systems. The gas lift suspension system may be supported on a wall of the vessel, or may be supported by a bottom portion of the vessel so long as it allows for flow through and around the draft tube. Alternatively, the gas lift suspension system may be supported by an additional structure constructed and arranged to retain and suspend the one or more draft tubes within the vessel.

An individual draft tube may be sized and shaped according to a desired application, such as to suspend an adsorbent material within the vessel and/or to operate within a preselected time period for operation. The draft tube may also be sized and shaped to provide a desired level of agitation within the draft tube to adequately suspend the adsorbent material within the vessel or to aerate the environment of the vessel. The desired gas lift suspension system volume may be provided by a single draft tube or by multiple draft tubes having a total volume substantially equal to the desired volume. A particular ratio of gas lift suspension system volume to vessel volume may be selected to provide optimal suspension of the adsorbent material within the draft tube. An individual draft tube may have a cross sectional area of any shape, such as circular, elliptical, square, rectangle, or any irregular shape. The individual draft tube may have any overall shape, such as conical, rectangular and cylindrical. In one embodiment, the draft tube is a cylinder. The overall dimensions of the draft tube, such as length, width, and height, may be selected to provide optimal suspension of the adsorbent material within the vessel. For example, particular ratios of draft tube length to draft tube width or diameter may be selected to achieve optimal suspension of the adsorbent material within the vessel. The draft tube may be comprised of two opposed sidewalls within a vessel in a construction referred to as a "trough." One or both ends of the draft tube may be constructed and arranged to assist flow of adsorbent material into and/or out of the draft tube. For example, the sidewall at a first end of the draft tube may include one or more openings forming passageways to allow some of the adsorbent material, wastewater, or other contents of the vessel that are located at or near the first end of the draft tube to enter or exit through the sidewall of the draft tube. The openings forming the passageways may have any shape to allow for sufficient suspension of the adsorbent material within the vessel. For example, openings may be triangular, square, semicircular or have an irregular shape. Multiple passageways may be identical to one another and uniformly positioned about the first end of the draft tube to equally distribute flow of adsorbent material in the draft tube.

The one or more draft tubes may be positioned at any suitable location within the vessel so long as they provide adequate suspension of the adsorbent material within the vessel. For example, a single draft tube may, but need not, be positioned centrally in relation to the vessel sidewalls. Similarly, multiple draft tubes in a single vessel may be randomly positioned or positioned in a uniform pattern in relation to the vessel sidewalls. Multiple draft tubes in a single vessel may, but need not be identical in volume or cross sectional area. For example, a single vessel may comprise cylindrical, conical and rectangular draft tubes of varying height and cross sectional area. In one embodiment, a vessel may have a first draft tube centrally positioned having a first cross sectional area and a plurality of second draft tubes positioned adjacent to the side wall of vessel in which each of the second draft tubes has a second cross sectional area smaller than the first cross sectional area. In another embodiment, a vessel has a plurality of identical draft tubes. In yet another embodiment, a first draft tube may be positioned within a second draft tube. In this embodiment, the bottoms of the draft tubes may be aligned with each other, or may be off-set from one another.

In another embodiment, the draft tube may include a baffle to promote the suspension of adsorbent material. The baffle may have any size and shape suitable for a particular draft tube. For example the baffle may be a plate suitably positioned on an inner surface of the draft tube or a cylinder positioned in the draft tube. In one embodiment, the baffle may be a solid or hollow cylinder centrally positioned within the draft tube. In another embodiment, the baffle may be a skirt that is positioned at a first end or second end of one or more draft tubes in the gas lift suspension system. The baffle may be constructed of the same material as the draft tube, or a different material that is compatible with the suspension system.

The vessel into which the draft tube may be placed may be of any size or shape suitable to suspend adsorbent material in conjunction with the gas lift suspension system. For example, the vessel may have a cross sectional area of any shape, such as circular, elliptical, square, rectangle, or any irregular shape. In some embodiments, the vessel may be constructed or modified in order to promote suitable suspending of the adsorbent material. In certain embodiments, the vessel may be constructed or modified to include sloped portions at the base of the vessel to promote the movement of adsorbent material toward the gas lift suspension system. The sloped portions may be at any angle relative to the base of the vessel to promote movement of the adsorbent material towards the gas lift suspension system.

Figure 12:
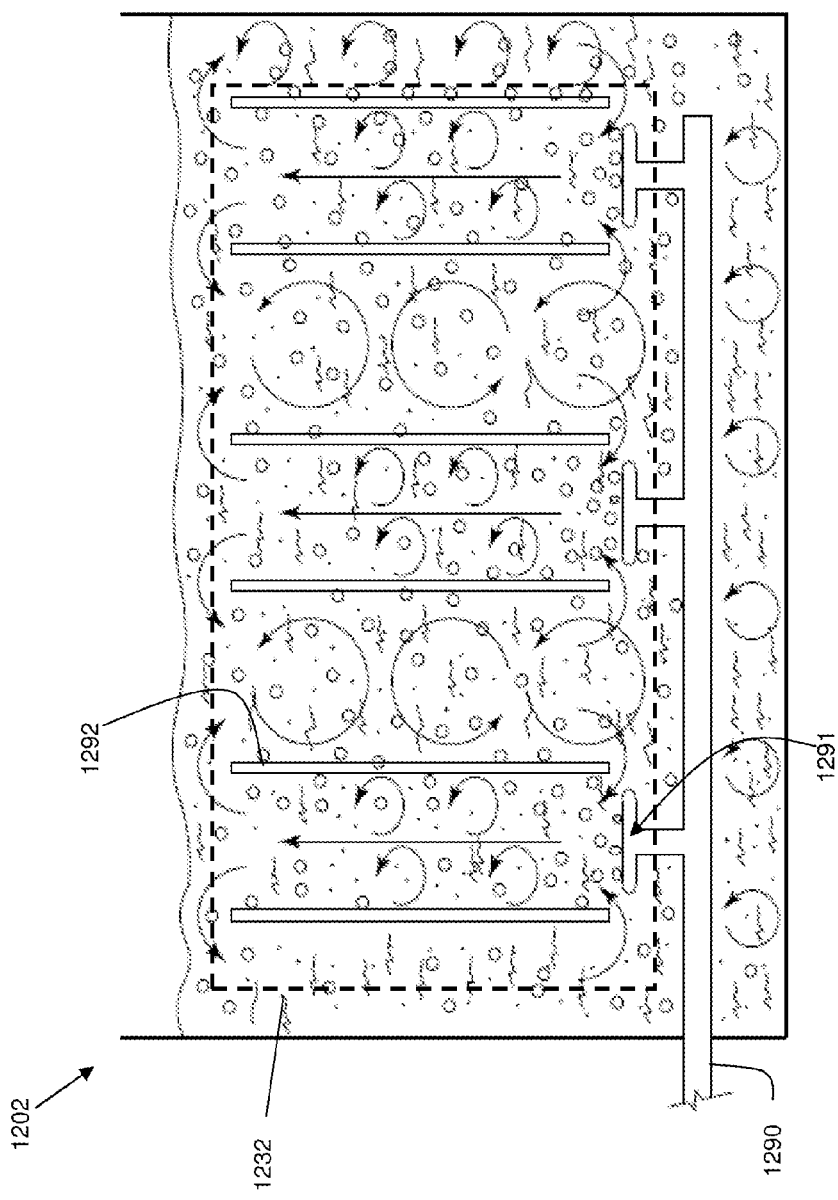
FIG. 12 is a further embodiment of a biological reactor depicting a gas lift suspension system to provide circulation to maintain adsorbent material in suspension.

Referring now to FIG. 12, an example of a gas lift suspension system 1232 for maintaining adsorbent material in suspension within a vessel such as biological reactor 1202 is schematically depicted according to one embodiment. In FIG. 12, circular elements represent bubbles of gas, small solid elements or dots represent adsorbent material and irregular linear elements represent micro-organisms or biomass. The gas lift suspension system 1232 includes one or more draft tubes 1292 configured, positioned and dimensioned to facilitate lifting of adsorbent material and maintaining the adsorbent material in suspension, as described above. Gas enters through a gas conduit 1290 and is directed into a bottom portion of the draft tube(s) 1292 via distribution nozzles or diffusers 1291. In certain alternative embodiments, gas can be directed into the bottom portion of the draft tube(s) 1292 via apertures in the gas conduit 1290 rather than, or in conjunction with, the distribution nozzles or diffusers 1291. The gas from conduit 1290 can be introduced into the vessel or biological reactor 1202 at the designated location(s) in a manner similar to a coarse bubble diffuser, and serves both as a source of oxygen or other gas for support of the micro-organism adhered to the adsorbent material and separate from the adsorbent material in the mixed liquor, and as a source of lift force for maintaining the adsorbent material and biomass in suspension in the biological reactor 1202. In particular, the gas provides upward lift as a result of its being contained in the draft tubes 1292. As the gas bubbles rise inside of the draft tubes, they cause an upward flow that provides suction on the bottom of the tube. This is the motive force used to draw the mixed liquor and adsorbent material through the tubes and lift it into suspension in the tank. The gas circulation provides adequate lift in the draft tubes to keep the contents of the tank sufficiently agitated such that the settling of adsorbent material is minimized or eliminated.

In addition, the arrangement of FIG. 12 provides adequate mixing and suspension with significantly less energy requirements as compared to other mixing and suspension systems. For example, the energy required for a gas lift system 1232 in a biological reactor 1202 using adsorbent material can be as low as one-tenth of the energy required with alternative suspension systems and may only require the gas necessary for the biological system.

Although the gas lift suspension system 1232 is shown and described in the context of a plurality of draft tubes configured and positioned proximate a source of gas, alternative structures can be employed, such as one or more troughs within a biological reactor, or other suitable structure that produces the gas lift phenomenon described above. Additionally, the directional arrows shown in FIG. 12 are merely illustrative of one possible way in which fluid flows throughout the system, and depending on the parameters of the system, including the size and shape of the vessel, the size, shape and number of draft tubes, and air flow rate, the fluid may flow through the system in any number of ways.

Figure 13A:
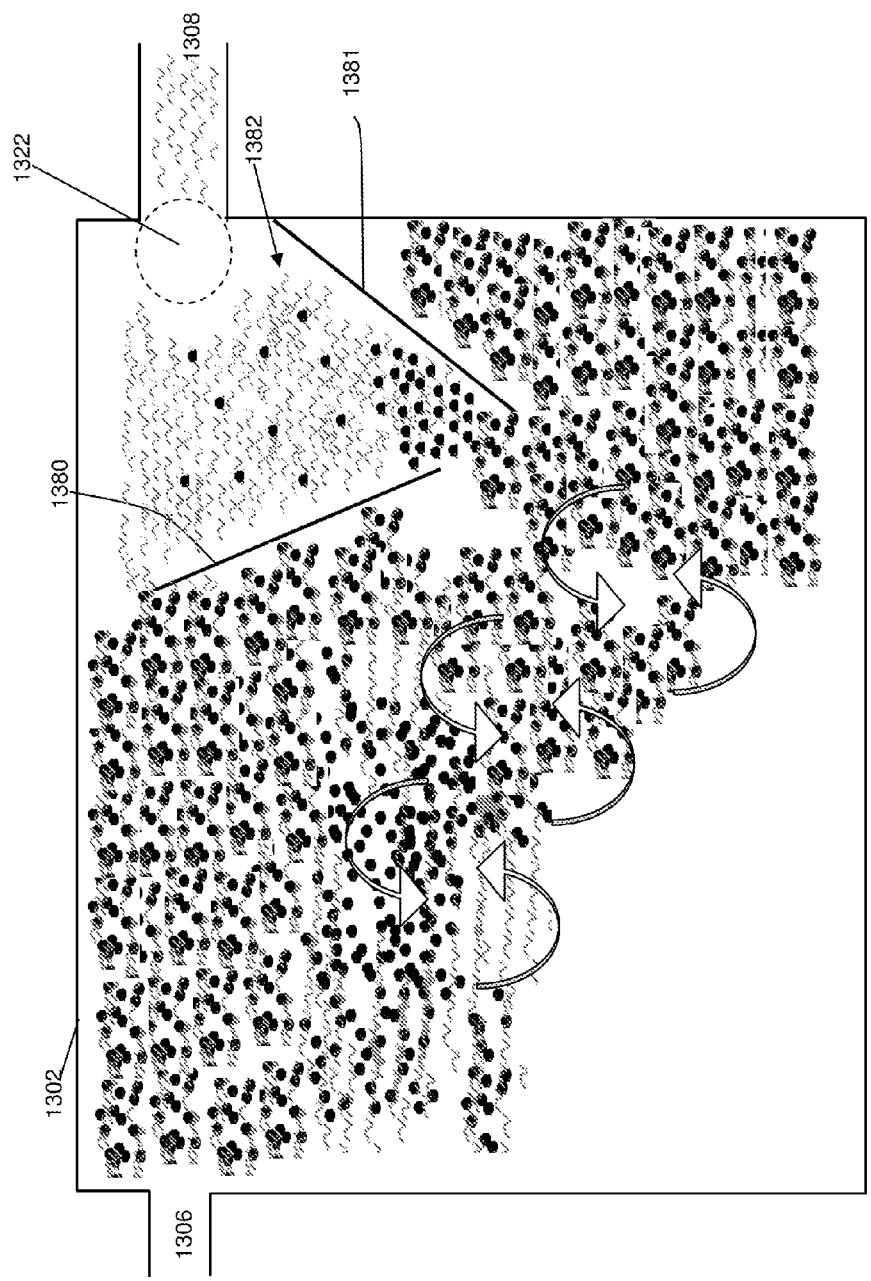
FIGS. 13A and 13B are further embodiments depicting a settling zone.
Figure 13B:
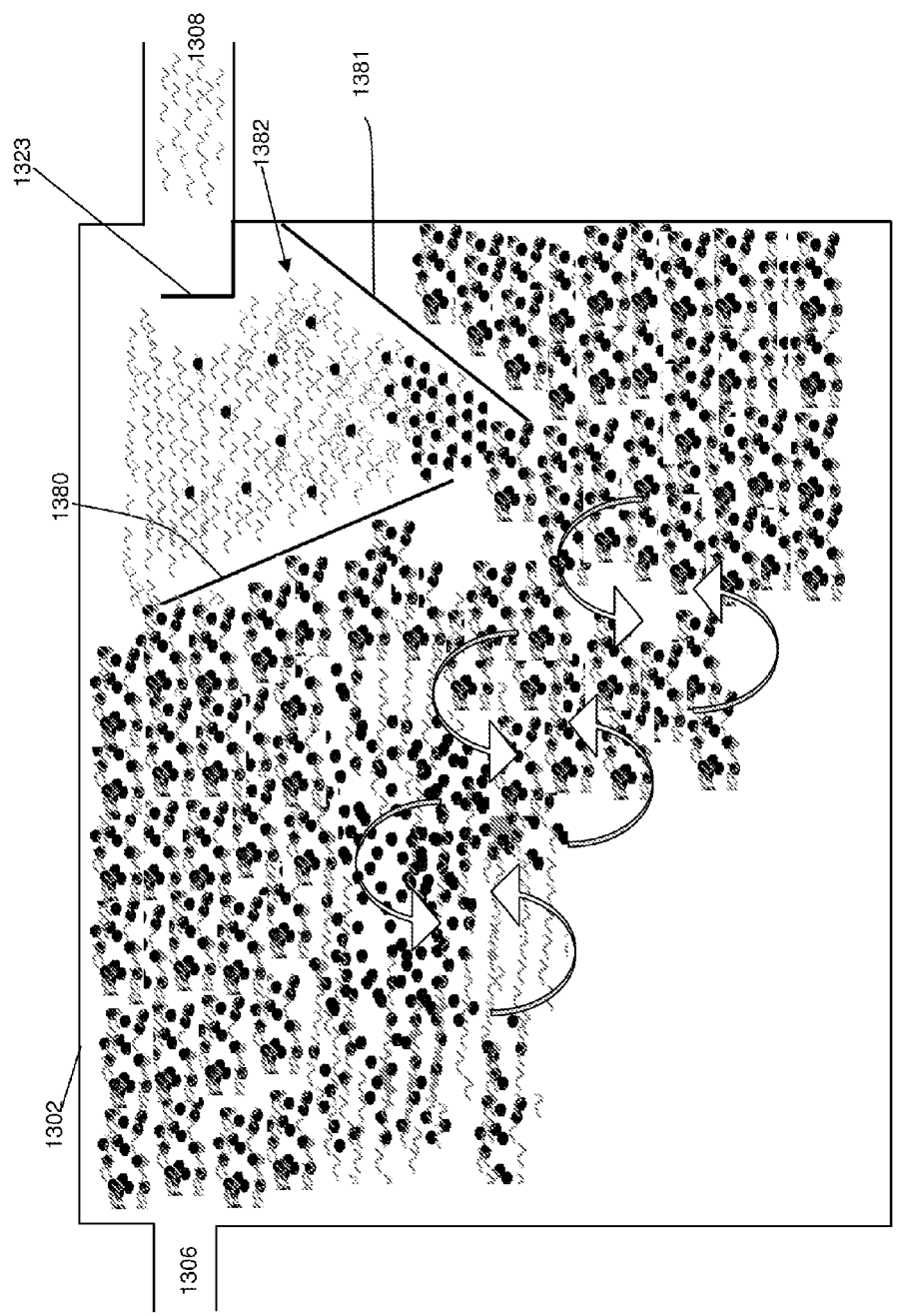

FIGS. 13A and 13B show additional embodiments of the present invention incorporating a settling zone 1382 as a portion of a separation subsystem. In FIGS. 13A and 13B, solid black elements represent adsorbent material, and irregular linear elements represent micro-organisms or biomass. A biological reactor 1302 comprises an inlet 1306 for receiving wastewater to be treated and an outlet 1308 fluidly connected to a membrane operating system (not shown). The settling zone 1382, e.g., a quiescent zone, is proximate the outlet 1308 and is generally defined by baffles 1380 and 1381, which are positioned and dimensioned to direct adsorbent material away from the settling zone 1382. The combined mixture of liquid and adsorbent material that flows over baffle 1380 settles, since turbulence due to the jet aeration or other suspension system in the biological reactor 1302 is substantially reduced in the settling zone 1382. Adsorbent material having a greater density than the suspended biological solids settles, and as it leaves the settling zone 1382, is returned to suspension by the turbulence outside of the settling zone 1382 caused by the suspension system. As shown in FIG. 13A, a screening apparatus 1322 is also provided proximate the outlet 1308. The quantity of adsorbent blocked by the screening apparatus 1322 is minimized due to the adjacent settling zone 1382. In certain preferred embodiments, screening apparatus 1322 is placed within the baffle system at a distance from the baffles that is sufficient to ensure that most of the adsorbent material will separate/settle from the mixed liquor before it reaches the screen. Consequently, the screening apparatus 1322 will receive fewer adsorbent particles which could potentially adhere to the screen surface and accelerate plugging/fouling of the screen. When screening systems are used in combination with baffle systems, the plugging/fouling potential of the screen will be greatly reduced, as will the frequency of screen cleaning.

However, it is contemplated that in certain embodiments, the screening apparatus 1322 can be eliminated altogether. The use of baffles around the outlet 1308 of the aeration tank reduces the mixing energy imparted by the suspension apparatus and leaves the settling zone 1382 free of turbulence and rising air bubbles, so that the denser adsorbent granules can separate from the mixed liquor prior to its exiting the tank by way of the effluent launderers. The baffling system allows the dense adsorbent material to separate from the mixed liquor, while at the same time, directs the mixed liquor back into the mixing zone in the aeration tank.

Alternative settling zone systems within the biological reactor are also contemplated. For example, any of the previously-mentioned screens can be used, or, as described in further detail below, a weir can be used instead of screening apparatus 1322.

The settling zone in combination with shearing action provided by pumping, mixing or jet aeration allows the adsorbent material that has had the excess biomass sheared therefrom to settle in an area without mixing. The adsorbent material will settle to the bottom of this area and re-enter the mixed liquor.

FIG. 13B shows another embodiment of a settling zone having a weir 1323. Low density biomass overflows the weir 1323 and the adsorbent settles. As adsorbent drops out of the quiescent zone, it mixes with the agitated contents of the tank including mixed liquor suspended solids and adsorbent and is re-suspended.

In embodiments of the present invention including a settling zone having an adsorbent material waste discharge port, the waste discharge port can advantageously be located proximate the settling zone. This allows the waste adsorbent material to be removed while minimizing removal of mixed liquor.

Useful adsorbent materials for the present invention include various types of carbons, such as activated carbon. In particular, granular activated carbons are very effective, since the size range and densities of the granules can be selected to enable their retention in a predetermined portion of the system and thereby substantially prevent them from fouling and/or abrading the membranes.

In systems in which the granular activated carbon is not subjected to significant shearing forces and/or inter-granule collision, the granular activated carbon can be produced from wood, coconut, bagasse, sawdust, peat, pulp-mill waste, or other cellulose-based materials. One suitable example is MeadWestvaco Nuchar® WV B having nominal mesh sizes of 14×35 (based on the U.S. Standard Sieve Series).

In additional embodiments, particularly those in which shearing action is provided by turbulence and/or inter-granule collisions in a pump and/or jet nozzle, use of adsorbent material(s) having higher hardness values are desirable. For instance, granular activated carbons derived from bitumen or coal-based materials are effective. In a particular embodiment, the granular activated carbon is derived from lignite.

Carbon materials can also be provided which are modified with a treatment process and/or species thereby providing an affinity to certain chemical species and/or metals in the wastewater. For instance, in wastewaters having a relatively high level of mercury, at least a portion of the adsorbent material preferably includes granular activated carbon impregnated with potassium iodide or sulfur. Other treatments and/or impregnated species can be provided to target specific metals, other inorganic compounds and/or organic compounds.

In addition, the adsorbent can be a material other than activated carbon. For instance, iron-based compounds or synthetic resins can be used as the adsorbent materials, alone or in combination with other adsorbent materials, e.g., in combination with granular activated carbon. Further, treated adsorbent materials other than activated carbon that target certain metals, other inorganic compounds or organic compounds can be used. For instance, in wastewaters having relatively high levels of iron and/or manganese, at least a portion of the adsorbent can comprise a granular manganese dioxide filtering media. In wastewaters having arsenic, at least a portion of the adsorbent can comprise granular iron oxide composites. In wastewaters including lead or heavy metals, at least a portion of the adsorbent can include granular alumino-silicate composites.

In one embodiment, the adsorbent material can be selected based upon a desired specific gravity range. In order to maintain the adsorbent material in suspension within acceptable energy consumption/cost ranges, specific gravity ranges relatively close to that of the wastewater are desirable. On the other hand, in embodiments in which separation is based at least in part on settling of the material, higher specific gravities are suitable. In general, the specific gravity is preferably greater than about 1.05 in water at 20° C. In certain embodiments, the specific gravity is greater than about 1.10 in water at 20° C. A suitable upper limit for the specific gravity is, in certain embodiments, about 2.65 in water at 20° C.

Therefore, the adsorbent material having a specific gravity range is selected which provides sufficient suspension and therefore sufficient contact with the wastewater and its contaminants. In addition, in certain embodiments, the specific gravity range provides sufficient settling characteristics for subsequent removal of the adsorbent material from the wastewater. In further embodiments, selection of the specific gravity of the adsorbent material is based on minimization of the energy required to maintain the adsorbent material in suspension.

Furthermore, the desired adsorbent material, such as granular activated carbon, has a hardness level that minimizes creation of fines and other particulates due to inter-granule collisions and other process effects.

The size of the adsorbent material that the separation subsystem is designed to retain and thereby prevent its passage into the membrane operating system is optimized to minimize the amount of adsorbent material and fines entering the membrane operating system. Therefore, the method and system of the invention minimizes abrasion and fouling by carbon granules or other granular materials impinging on the membranes, while still providing the operational advantages associated with the use of adsorbent material including activated carbon.

Suitable granule sizes for the adsorbent material are selected to complement the selected screening/separation methods, and the needs of the particular wastewater being treated. In certain preferred embodiments, the bottom limit of effective granule size of the adsorbent material is selected such that it can easily be separated from the flow of mixed liquor entering the membrane operating system tank(s) in which the membranes are located. In general, the effective granule size of the adsorbent material has a bottom limit of about 0.3 millimeters, where greater than about 99.5 weight % of the adsorbent material is above the bottom limit; preferably having a lower limit of about 0.3 millimeters to an upper limit of about 2.4 millimeters (corresponding to a mesh size 50 to a mesh size 8, based on United States Standard Sieve Series), where greater than 99.5 weight % of the adsorbent material is within the lower and upper limit; and in certain preferred embodiments about 0.3 millimeters to about 1.4 millimeters (corresponding to a mesh size 50 to a mesh size 14, based on the United States Standard Sieve Series) where greater than about 99.5 weight % of the adsorbent material is within the lower and upper limit. It has been demonstrated that a granular activated carbon with a minimum effective granule size of about 0.5 millimeters to about 0.6 millimeters can be easily and efficiently screened from the mixed liquor with a suitable separation system, and such effective sizes, in granular activated carbon of suitable densities, also can economically be maintained in suspension.

EXAMPLES

The present invention will now be illustrated by the following non-limiting examples.

Example 1

A pilot scale programmable logic controlled membrane biological reactor system (Petro™ MBR Pilot Unit available from Siemens Water Technologies, Rothschild, Wis., USA) having an aeration tank with an anoxic section, with an capacity of approximately 3,785 liters (1) (1,000 gallons (gal)) and a membrane operating system equivalent to a commercial membrane biological reactor system, was modified to accommodate the granular activated carbon addition described in the present invention. A wedge wire screen was situated at the inlet of a pump that transferred mixed liquor from the aeration tank to the membrane operating system.

A base synthetic feedstock included water having the following concentrations of organic/inorganic matter: 48 grams per liter (g/l) (48 ounces per cubic foot (oz/cf)) of sodium acetate; 16 g/l (16 oz/cf) of ethylene glycol; 29 g/l (29 oz/cf) of methanol; 1.9 g/l (1.0 oz/cf) of ammonium hydroxide; and 0.89 g/l (0.89 oz/cf) of phosphoric acid. The ammonium hydroxide and phosphoric acid were sources for proper nutrient balance for the bacteria within the membrane biological reactor system.

A sample wastewater mixture was prepared having high concentrations of biologically refractory and/or biologically inhibitory organic compounds. Specifically, the sample wastewater mixture contained following concentrations of biologically refractory and/or biologically inhibitory organic compounds: 90 milligrams per liter (mg/l) (0.09 ounces per cubic foot (oz/cf) of EDTA; 30 milligrams per liter (0.03 oz/cf) of di-n-butyl phthalate, 120 mg/l (0.12 oz/cf) of 2,4-dinitrophenol, 21 mg/l (0.021 oz/cf) of 2,4-dinitrotoluene and 75 mg/l of methyl tert-butyl ether. The mixture was fed to the anoxic tank.

The membrane biological reactor was first operated without granular activated carbon to obtain a baseline. It was determined that prior to the addition of granular activated carbon, only about 92% of the biologically refractory or biologically inhibitory organic chemical oxygen demand (COD) compounds in the effluent were removed, after a long period of bio-acclimation such that the membrane biological reactor was fully acclimated, thus allowing about 8% of these compounds (measured as COD) to pass into the effluent).

To determine the efficacy of granular activated carbon, 3800 grams (g) (134 ounces (oz)) MeadWestvaco Nuchar® WV B having nominal mesh sizes of 14×35 (based on U.S. Standard Sieve Series) was added to the aeration tank and the blower supplying air to the aeration tank was adjusted to feed 2124 standard liters per minute (slm) (75 scfm (scfm)) to the aeration tank, with the excess air provided to maintain the granular activated carbon in suspension. The amount of granular activated carbon added to the aeration tank was based on 20 percent of the mixed liquor suspended solids in the unit, which was determined to be approximately 5000 mg/l (5 oz/cf).

Figure 14:
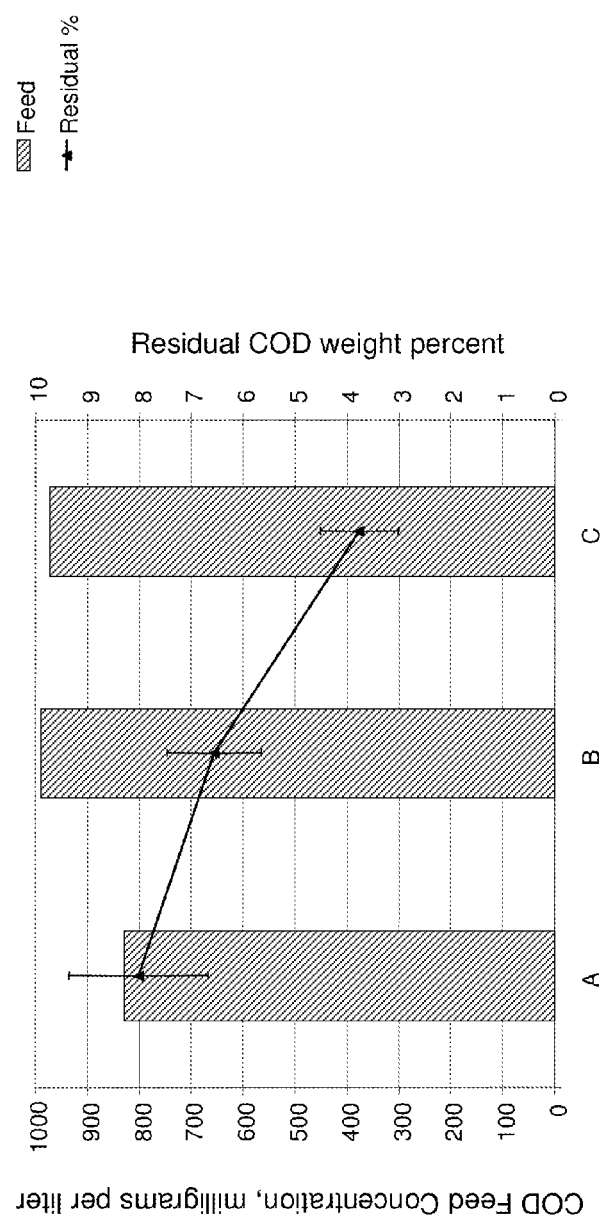
FIG. 14 is a chart depicting feed COD concentration (in milligrams per liter), and the remaining effluent COD concentrations (as percentages of the original), at various stages of biological acclimation in a membrane biological reactor system.

After acclimation of the MLVSS, the total membrane operating system effluent COD concentration was less than 4%, therefore achieving greater than 96% removal of biologically refractory or biologically inhibitory organic compounds that were measured as COD. FIG. 14 is a chart depicting feed concentration (in mg/l) of biologically refractory and biologically inhibitory compounds, and the remaining effluent concentrations (as percentages of the original), at various stages of biological acclimation of a membrane biological reactor system. In particular, FIG. 14 shows the comparison between the effluent concentrations prior to addition of granular activated carbon (stage A), during the acclimation period (stage B), and after acclimation (stage B). Once granular activated carbon was added to the system, there was a very significant initial drop in effluent COD concentration, which is not shown in FIG. 14 as the adsorption capacity of the granular activated carbon was exhausted in less than one day. The system then stabilized such that around 6.5% of the feed COD was remaining after treatment. This represented a period in which the adsorptive capacity of the carbon was exhausted and the biomass on the granular activated carbon started working to digest the biologically inhibitory organic compounds that were measured as COD. After the bacteria became fully established onto the surface of the granular activated carbon, as was confirmed with an electron microscope evaluation, the benefits of an attached growth/fixed film system became apparent. The residual COD concentration in the effluent dropped to less than 4% of the feed COD concentration, providing a COD removal efficiency of greater than 96% for a highly concentrated feed of biologically refractory or biologically inhibitory organic compounds.

Use of the method and apparatus of the invention eliminates the plugging and abrasion of the membranes by keeping the carbon out of the membrane operating system tank(s). By using larger sized carbon granules, carbon granule screening and/or separation is possible. On the other hand, the small particle size of the powdered activated carbon prevents its effective filtration from the mixed liquor.

Example 2

Laboratory particle suspension scale tests were performed using a 2000 milliliter graduated cylinder having a rotameter connected to a source of compressed air and a tube from the outlet of the rotameter to a tube that reached to the bottom of the graduated cylinder. 20 g (0.7 oz) of thoroughly dried granular activated carbon were placed in the cylinder. Room temperature distilled water was also added to the cylinder wetting the particles. The contents of the cylinder were mixed with a spatula to suspend the entire contents and remove air bubbles.

Air was added to the tube in the cylinder at increasing rates until the first solids were suspended and the air flow was recorded. The airflow was increased until approximately 50% of the solids were suspended (based upon the amount of carbon remaining on the bottom of the cylinder) and the airflow was recorded. Airflow was again increased until all of the granular activated carbon was suspended. The final airflow was recorded. The results are shown in Table 1.

TABLE 1

| Carbon | Air flow in slm (scfm) for minimal suspension, per ft² of cross-sectional area | Air flow in slm (scfm) for 50% suspension, per ft² of cross-sectional area | Air flow in slm (scfm) for 100% suspension, per ft² of cross-sectional area |
| --- | --- | --- | --- |
| Norit Darco MRX/Coal | 2.83 (0.10) | 127.4 (4.5) | 254.9 (9.0) |
| Norit GAC1240 Plus/Bituminous | 5.38 (0.19) | 135.9 (4.8) | 254.9 (9.0) |
| Norit Petrodarco 8 × 30 Lignite | 1.70 (0.06) | 85.0 (3.0) | 169.9 (6.0) |
| Calgon Filtrasorg 400 Bituminous | 1.70 (0.06) | 135.9 (4.8) | 220.9 (7.8) |
| Westates Aquacarb 1240/bituminous | 2.27 (0.08) | 85.0 (3.0) | 169.9 (6.0) |
| Jacobi Aquasorb 1000/Bitumnous | 1.42 (0.05) | 85.0 (3.0) | 169.9 (6.0) |
| Res Kem CK1240/coal | 4.25 (0.15) | 240.7 (8.5) | 339.8 (12.0) |
| Mead Westvaco Nuchar WVB 14 × 35/Wood | 1.70 (0.06) | 51.0 (1.8) | 93.4 (3.3) |
| Mead Westvaco Aquaguard 12 × 40/Wood | 1.70 (0.06) | 68.0 (2.4) | 93.4 (3.3) |

The amount of energy required to suspend the particles increased as more particles were suspended. Based upon these results, the air requirements for suspending a granulated activated carbon were calculated to be about 7,080 to about 8,500 slm per 1,000 liters of reactor volume (about 250 to about 300 scfm per 1,000 cubic feet of reactor volume). In comparison, the industry standard for suspending biological solids without granulated activated carbon about 850 slm per 1,000 liters of reactor volume (30 scfm per 1,000 cubic feet of reactor volume). The air requirement to suspend the granulated activated carbon and the biological solids was determined to be up to 10 times greater, using a simple coarse bubble diffuser system, than that to suspend the biological solids alone and to provide the required oxygen for biodegradation.

Example 3

A granular activated carbon suspension pilot unit was prepared, utilizing a vertical cylindrical tank having a diameter of 1.83 meters (m) (6 feet (ft)) and a water depth of 2.59 m (8.5 ft). One eductor jet nozzle from Siemens Water Technologies (Rothschild, Wis., USA) was installed through an outer wall of the tank at a distance of 43.5 centimeters (cm) (17.125 inches (in)) from the tank floor. The nozzle, shown in FIG. 15, was directed horizontally towards the center of the tank. A 50 mg/l concentration of granular activated carbon, Mead Westvaco Nuchar WVB1×35/Wood, was introduced into the tank.

Figure 15:
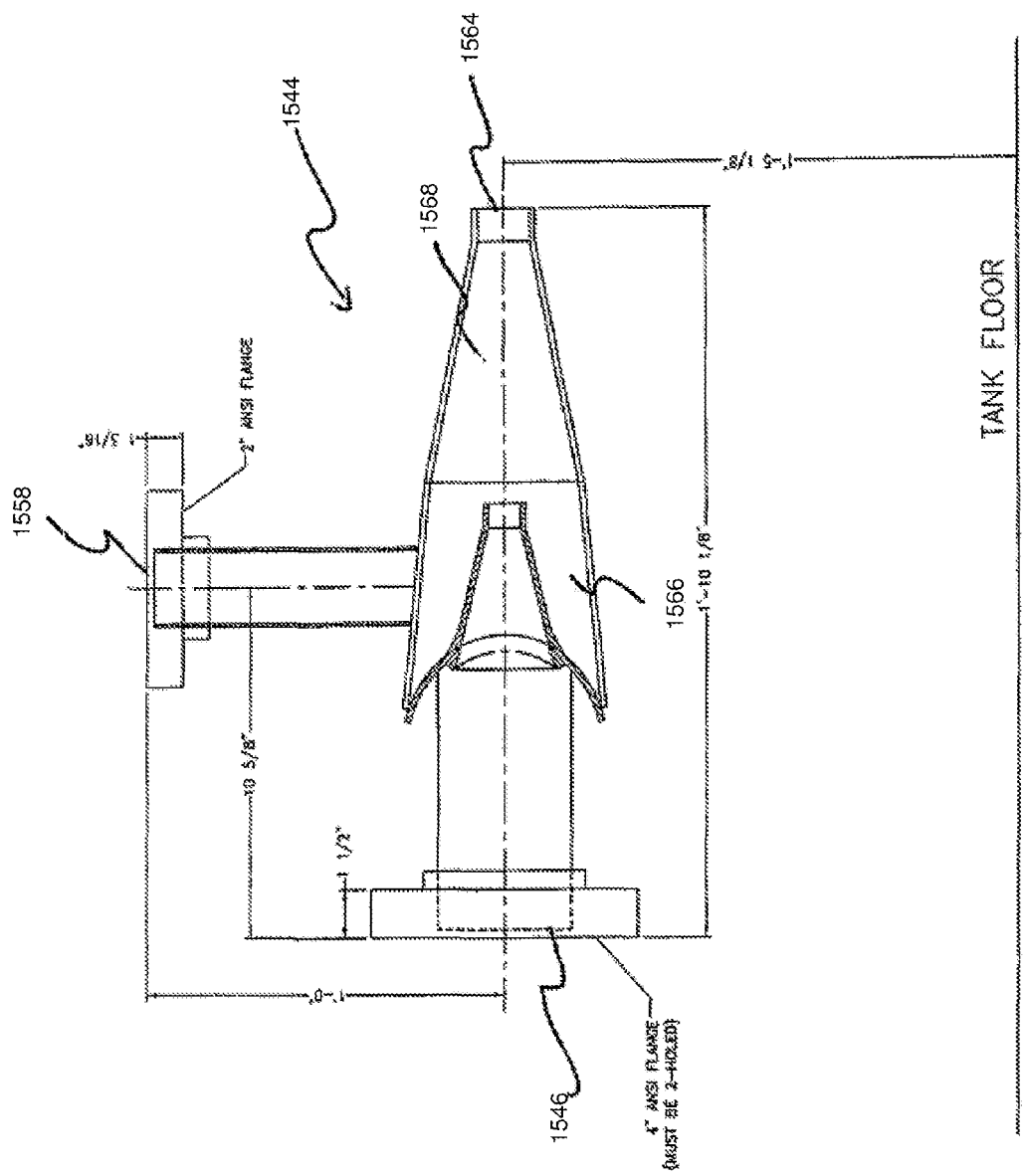
FIG. 15 is a schematic illustration of an embodiment of a jet nozzle of the type used in an example demonstrating use of a jet suspension system.

As depicted in FIG. 15, the jet nozzle system included a jet nozzle 1544 which comprised a fluid inlet 1546, a compressed air inlet 1558 and an outlet 1564. Fluid passed from inlet 1546 to a mixing chamber 1566. Compressed air also entered mixing chamber 1566 where it expanded and imparted energy to the fluid. As the air expanded, the mixture of fluid and air passed to a nozzle throat 1568 where velocity of the mixture increased. The fluid containing air exited nozzle 1544 through outlet 1564 into the tank.

Tests were conducted with various liquid flow rates and compressed air flow rates. Liquid flows ranged from 530 liters per minute (lpm) to 757 lpm (140 gallons per minute (gpm) to 200 gpm) while compressed air flow rates ranged from 0 to 850 slm (30 scfm)

At a liquid flow rate of 587 lpm (155 gpm), an air flow rate of 850 slm (30 scfm) resulted in suspension of the activated carbon, while air flows of 425 slm (15 scfm) and less resulted in deposition of the activated carbon on the bottom of the tank. Similarly, at a liquid flow rate of 644 lpm (170 gpm), an air flow rate of 850 slm (30 scfm) resulted in suspension of the activated carbon, while an air flow rate of 425 slm (15 scfm) and less resulted in settling of the activated carbon on the bottom of the tank. Increasing the liquid flow to 700 lpm (185 gpm) resulted in suspension of the activated carbon at a reduced air flow rate of 425 slm (15 scfm.).

Increasing the flow rate of the liquid through the nozzle from 644 to 700 lpm (170 to 185 gpm), an increase of less than 10%, reduced the consumption of air by 50% as compared to the air required by a coarse bubble diffuser system. As such, the jet suspension system significantly reduced the consumption of compressed air, and therefore the energy costs associated with the use of compressed air.

Example 4

Example 4 was conducted to determine the efficacy of jet nozzle to perform suspension of granular activated carbon and to demonstrate structures for minimizing passage of granular activated carbon particles to the membranes of a downstream membrane operating system. A cylindrical tank and a jet mix nozzle were used to demonstrate that jet mixing could suspend granular activated carbon completely. Various mixing liquid and gas flow rates were evaluated.

Figure 16:
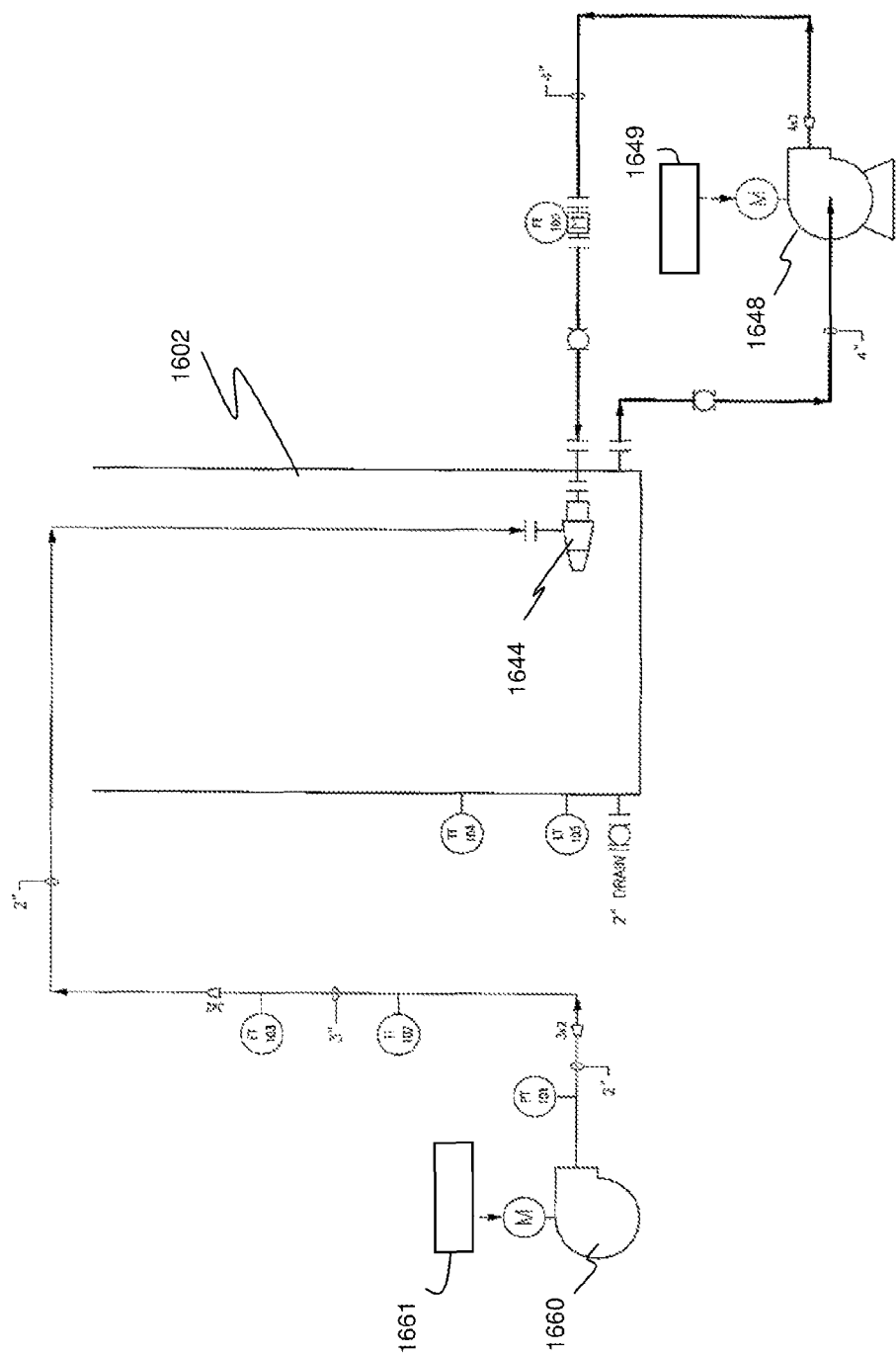
FIG. 16 is a schematic illustration of an system configuration used in another example herein.
Figure 18:
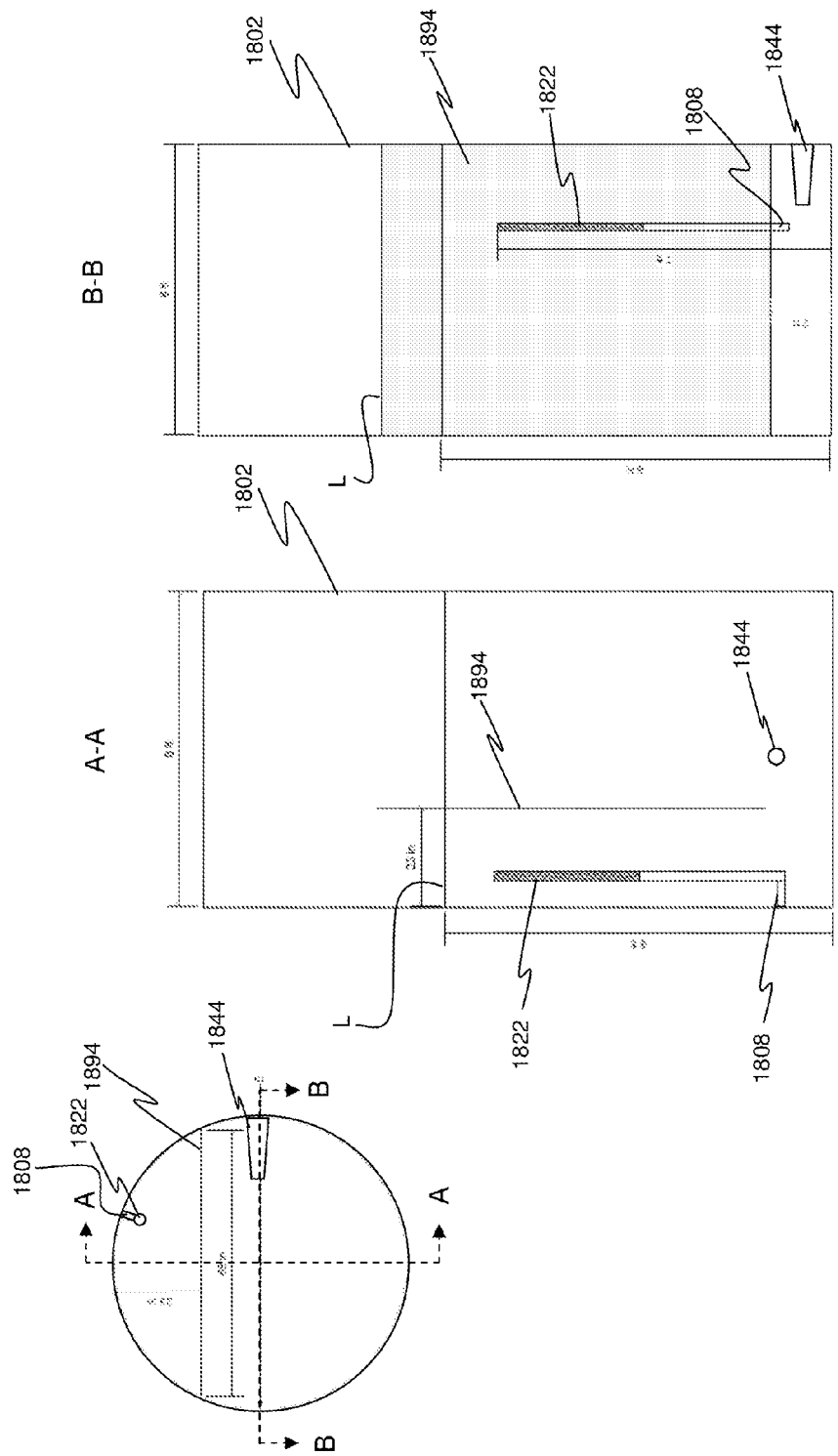
FIGS. 18 and 19 depict top and sectional views of embodiments of biological reactors employed in the system configuration of FIG. 16.
Figure 19:
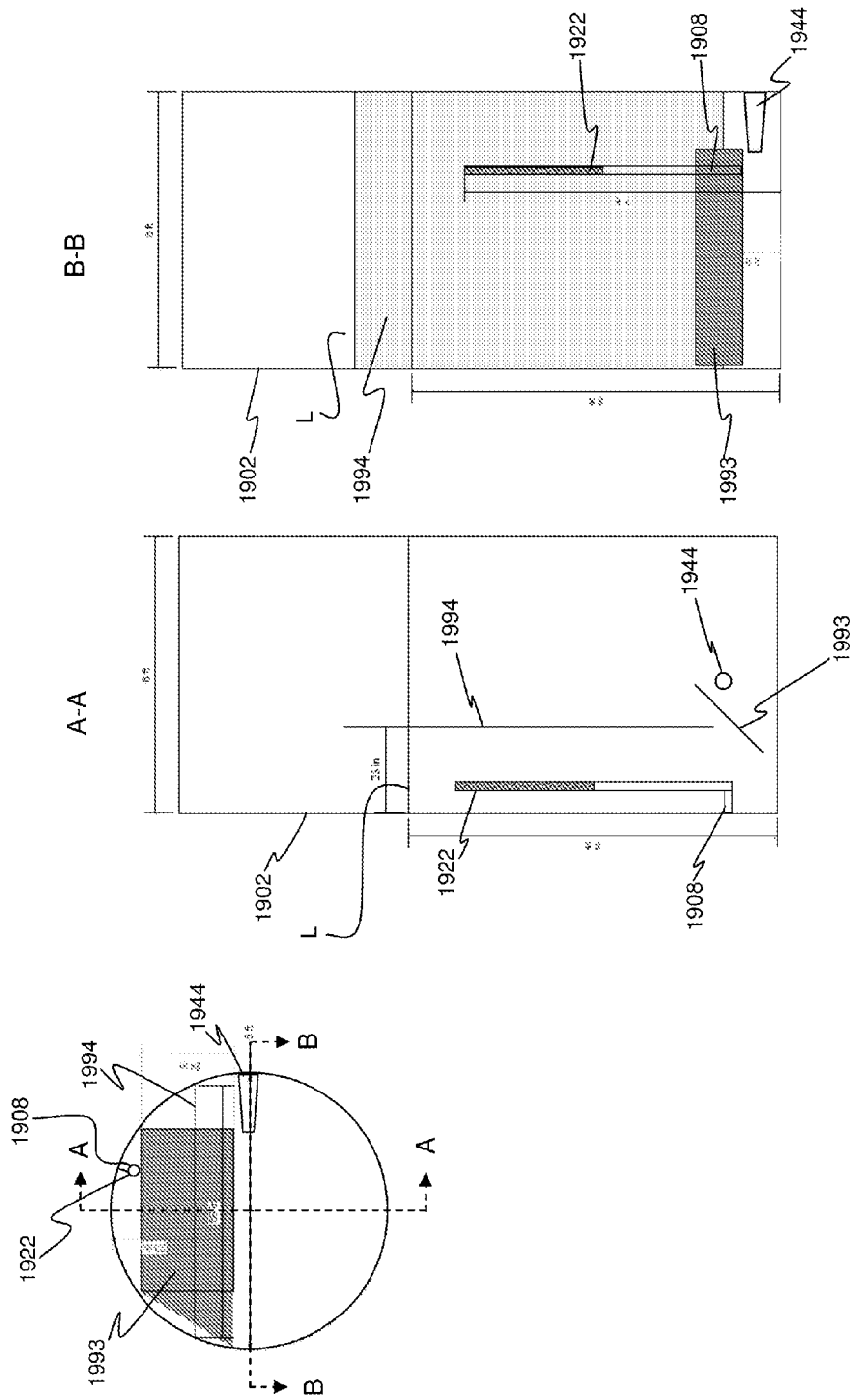

As illustrated in FIGS. 16, 18 and 19, a jet mixing/aeration nozzle 1644 was installed in a six foot diameter, 9,085 l (2,400 gal) steel tank 1602 filled with about 7,570 l (about 2,000 gal) of filtered tap water to a level L.

In this example, wood-based Mead Westvaco Nuchar® WV-B granular activated carbon and coal-based Norit Darco® MRX granular activated carbon were suspended utilizing a jet mixing nozzle in a cylindrical tank at various liquid and gas flow rates. The Mead Nuchar® WV-B granular activated carbon had a specific gravity of 1.1, an effective size of 0.6 millimeters (0.024 in), and is typically relatively softer than coal-based granular activated carbon; the Darco® MRX had a specific gravity of 1.5 and an effective size of 0.7 millimeters (0.028 in).

Approximately 50 mg/l (0.05 oz/cf) of wood-based granular activated carbon was added to the water. The low concentration of granular activated carbon was used to permit viewing of the mixing profile in the tank using a submersible video camera. Table 2 below shows the range of test conditions used.

TABLE 2

Test conditions for granular activated carbon jet suspension

| Condition | Liquid Rate, lpm (gpm) | Air Rate, slm (scfm) |
| --- | --- | --- |
| 1 | 530 (140) | 0 (0) |
| 2 | 587 (155) | 425 (15) |
| 3 | 644 (170) | 850 (30) |
| 4 | 700 (185) | 425 (15) |
| 5 | 757 (200) | 0 (0) |
| 6 | 644 (170) | 425 (15) |
| 7 | 700 (185) | 0 (0) |
| 8 | 700 (185) | 850 (30) |
| 9 | 644 (170) | 0 (0) |
| 10 | 587 (155) | 850 (30) |
| 11 | 587 (155) | 0 (0) |

Water was fed to the nozzle of jet mixing/aeration aerator 1644 by disc pump 1648 and compressed air was injected from blower 1660. Variable frequency drives 1649 and 1661 controlled the speed of the pump and blower motors, respectively, allowing adjustment of the respective feed rates. A magnetic flow meter in the discharge line of the disc pump 1648 monitored the liquid flow. The speed of the blower motor was proportional to the air flow.

Figure 17:
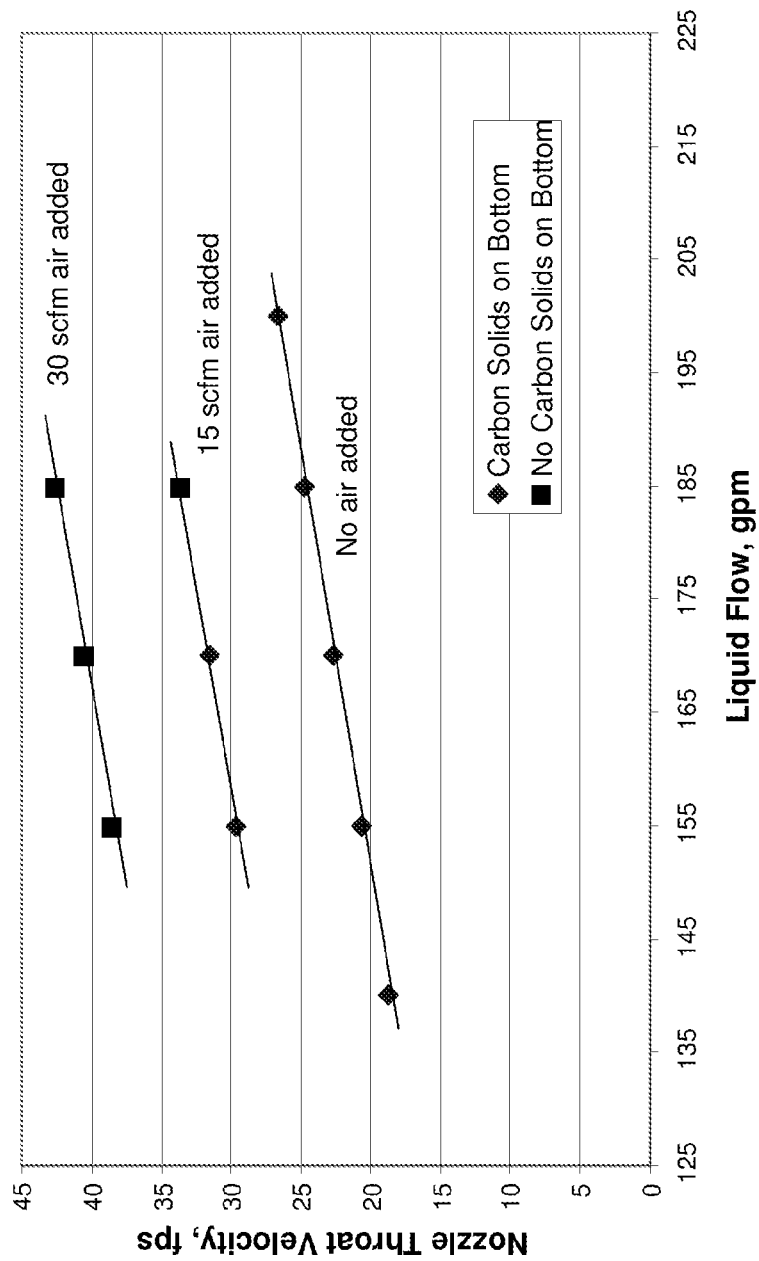
FIG. 17 is a chart depicting suspension of adsorbent material under certain nozzle throat velocities and liquid flow rates as determined under various test conditions using the system configuration of FIG. 16.

Referring to FIG. 17, the throat velocity of the jet nozzle was calculated at each test condition and plotted versus the liquid flow rate. As shown, a minimum throat velocity of approximately 10.4 meters per second (34 feet per second) was required to achieve complete suspension of the wood-based granular activated carbon. This velocity can be correlated to the specific gravity and maximum particle size of the granular activated carbon.

At the completion of the testing with the wood-based granular activated carbon, the tank was drained, cleaned and refilled with water and approximately 50 mg/l of the coal-based granular activated carbon was added. Based on a similar series of tests, it was observed that the jet aerator was able to maintain the denser granular activated carbon in suspension.

Since it is necessary to substantially prevent the granular activated carbon particles from reaching the membranes of a downstream membrane operating system, a slotted screen with 0.38 millimeter openings was positioned at the outlet of the aeration/reactor tank, so that any granular activated carbon particles that are broken down during the jet aeration circulation to particles having a diameter less than 0.38 millimeter (0.015 in) will pass through the screen, allowing them to enter the membrane operating system.

In addition, two tests were performed placing a screen on the suction side of the jet pump in the aeration/reactor tank using a quiescent zone, i.e., a zone of low turbulence, that would allow the granular activated carbon to settle before it reached the screen.

In the first test, and referring to FIG. 18, a vertical baffle 1894 was used to create a near quiescent zone in the aeration tank 1802. The baffle extended from 0.61 m (2 ft) above the bottom of the tank to above the water level. In this configuration, the screen 1822 was a wedge wire screen and was mounted near the top of the quiescent zone which required water to be pulled from the bottom of the tank 1802 through the low turbulence zone before it reached the screen 1822. The quiescent zone was sized at 40-50% greater than the calculated plug flow of the unit so that the upward velocity was less than the settling velocity of the granular activated carbon. For this configuration to be effective, the settling rate, which is dependent upon the specific gravity of the particles, must be greater than the upward velocity. The tests were performed using the coal-based granular activated for which the calculated settling rate is 1.8 meters per second. Assuming plug flow in the quiescent zone, it would need to be at least 0.39 m$^2$ (4.2 ft$^2$), to keep the upward velocity low enough to allow the granular activated carbon to settle. The actual cross-sectional area of the zone was 0.73 m$^2$ (7.8 ft$^2$).

Still referring to FIG. 18, nozzle 1844 of tank 1802 that was used to feed the pump was located approximately 15.2 cm (6 in) from the tank floor. Polyvinyl chloride pipe was attached to nozzle 1844 using a rubber boot so that a wedge wire screen 1822 could be suspended near the top of the tank and in fluid communication with the outlet 1808. The wedge wire screen was 8.9 cm (3.5 in) in diameter, 0.91 m (3 ft) long and had 0.38 millimeter (0.015 in) openings.

The mixing test was conducted with a water flow of 700 lpm (185 gpm) and an air flow of 419 slm (14.8 scfm) for a run time of approximately 18 hours. Granular activated carbon was observed on the floor of the tank under the quiescent zone with less granular activated carbon still in suspension in the turbulent portion of the tank. Occasionally, a swirling action would occur on the floor below the quiescent zone and some of the granular activated carbon would be carried upwards toward the screen.

When the pump and blower were turned off, a portion of the granular activated carbon that was present on the screen fluffed off indicating it was not strongly adhered to the screen; the remaining granular activated carbon was easily removed with a light brushing.

Referring to FIG. 19, the second test was conducted using a tank 1902, vertical baffle 1994, nozzle 1944, and screen 1922 in fluid communication with an outlet 1902 dimensioned and positioned substantially identically to equivalent elements described with respect to FIG. 18. In addition, a second baffle 1993 was positioned at an angle of 45° below the vertical baffle 1994 to dissipate the upward flow. The quiescent zone provided a means for minimizing the amount of granular activated carbon that reached the screen. Either a mechanical wiper or back-flushing pulse of water or air can be used to dislodge any granular activated carbon that may accumulate on the screen over time.

Example 5

Example 5 was conducted to demonstrate the effectiveness of air lift pump systems using draft tube and trough mixing to efficiently suspend the same wood-based and coal-based granular activated carbon materials used in Example 4. Cylindrical and rectangular tanks were used in various configurations. Attrition was measured using both the wood-based granular activated carbon and coal-based granular activated carbon of Example 4; the mixing test used the higher density coal-based granular activated carbon.

The test data established that granular activated carbon can be suspended in draft tubes and draft troughs in both cylindrical and rectangular tanks using air rates comparable to those required to sustain biological respiration in such tanks. The data also shows that at a constant air flow rate, a larger diameter draft tube is more efficient than a smaller draft tube in terms of moving the granular activated carbon from the surrounding area on the floor of the tank and into suspension.

In order to determine the extent of granular activated carbon attrition, a 0.31 m (12 in) diameter, 3.7 m (12 foot) high section of acrylic pipe was filled to 2.3 m (92 in) with 150 l (5.3 gal) of water, and 1,500 g (53 oz) of dry granular activated carbon was added to provide a concentration of approximately one weight percent. A polyvinyl chloride pipe having a diameter of 2.1 m (82 in) long, 7 cm (3 in) was secured in the center of the 0.31 m (12 in) diameter pipe to serve as the draft tube. Four slots measuring 2.54 cm (1 in) high by 1.9 cm (0.75 in) wide were provided in the bottom of the tubing for passage of the granular activated carbon and water and a 1.9 cm (0.75 in) in nozzle was placed in the center of the draft tube.

Air was introduced via the nozzle at a rate of 2,831 standard liters per hour (100 standard cubic feet per hour), which was equivalent to about 300 slm per 1000 liters of water (300 scfm per 1000 cubic feet of water). This relatively high air flow rate was chosen to produce more turbulent mixing than would be expected in a full-scale operation in order to determine attrition. The fluid was allowed to mix for approximately 10 minutes before the first sample was taken.

Attrition was measured during the test by taking grab samples of the water and granular activated carbon from the top of the acrylic pipe and pouring the sample through a 20 mesh screen. The solids that passed through the screen and which were assumed to have resulted from attrition were collected, dried and weighed.

Figure 20:
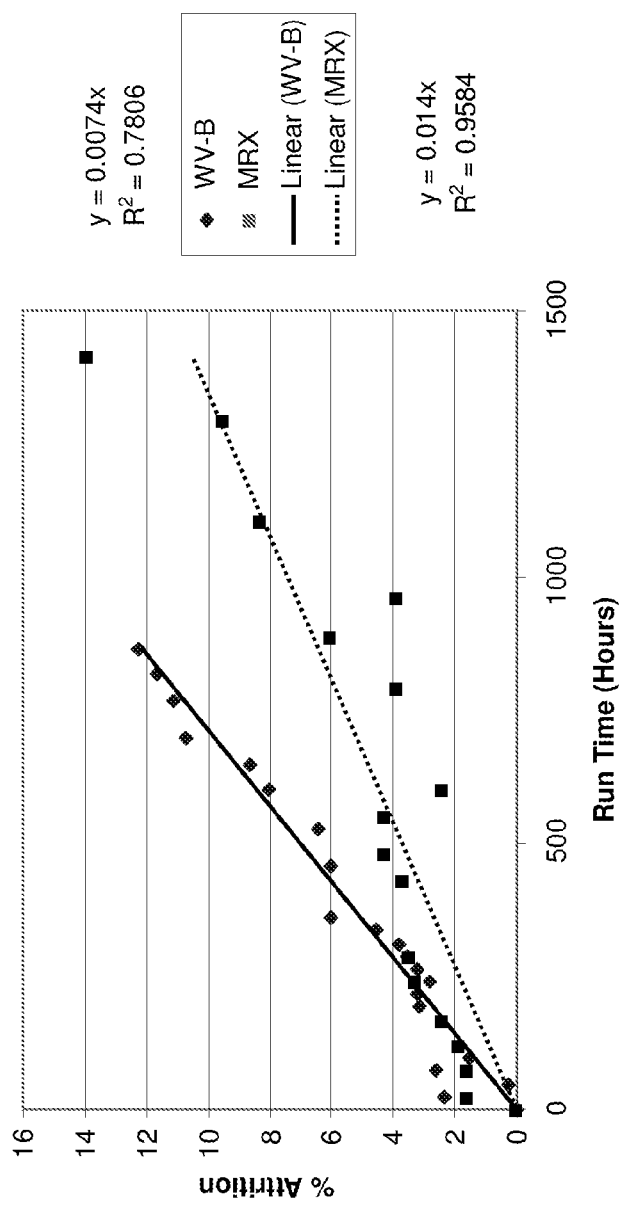
FIG. 20 is a chart depicting attrition as a function of run time for various types of adsorbent material in another example herein using a gas lift suspension system.

The results indicated that the granular activated carbon attrition rate was greater for the wood-based granular activated carbon (WV-B) than the coal-based granular activated carbon (MRX). After 30 days of operation, approximately 10% attrition of the wood-based granular activated carbon and about 5% attrition of the coal-based granular activated carbon was observed. In the practice of the invention in a working bioreactor, this amount of attrition would be made up through solids wasting during normal operation of the biological process. The results from the testing are summarized in FIG. 20. The plot also shows the y-intercept values and $R^2$ values for standard linear regression analysis for each data set.

Draft tube(s) of various configurations and variables such as the number of draft tubes, distance of the draft tube from the bottom of the tank and the draft tube diameter were tested and shown to effect performance.

In one configuration, and referring to FIG. 21, a single 0.3 m (12 in) diameter, 1.5 m (5 ft) high draft tube 2192 was placed in the center of 1.8 m (6 ft) diameter tank 2102 and positioned above the bottom of the tank on legs 2195. The tank 2102 was filled with approximately 6,435 l (1,700 gal) of water to a water level L and sufficient coal-based granular activated carbon (400-1,200 g (14.1-42.3 oz)) added to permit unaided viewing and recording of the mixing characteristics. Air was supplied by a 2.54 cm (1 in) diameter polyvinyl chloride course bubble diffuser pipe 2190 that passed through the draft tube wall and which had several 3.2 millimeter (0.125 in) diameter holes drilled through its top surface. The air flow rate was varied from 141 slm (5 scfm) to 425 slm (15 scfm), and the distance D between the bottom of the tank and draft tube was either 8.3 cm (3.25 in) or 1.9 cm (0.75 in).

As used in connection with this series of tests, the term "impact zone" is the area of the tank floor around the draft tube which was free of granular activated carbon.

It was observed that with the draft tube positioned 8.3 cm (3.25 in) above the tank floor, the impact zone was larger than when the draft tube was positioned 1.9 cm (0.75 in) above the tank floor, other conditions being the same. The optimum distance between the bottom of the draft tube and the tank floor for prevailing conditions can be determined by routine experimentation.

A two-fold increase in the amount of air added did not double the size of the impact zone. At 425 slm (15 scfm) with a gap between the floor and draft tube of 8.3 cm (3.25 in), an impact zone of approximately 71 cm (28 in) in diameter, i.e., 20 cm (8 in) beyond the outside wall of the draft tube, was produced and was the largest impact zone observed.

In an effort to expand the size of the impact zone using the same amount of air, the configuration shown in FIG. 21 was modified by addition of a skirt or flange extending horizontally from the bottom of the draft tube which increased the overall diameter of the draft tube and skirt to 71 cm (28 in). All other conditions were the same as described above. The air flow rate was varied between 141 slm (5 scfm) and 425 slm (15 scfm).

It was observed that adding a skirt to the bottom of the draft tube did increase the size of the impact zone. The impact zone was increased to 112 cm (44 in), i.e., 20 cm (8 in) beyond the outer edge of the skirt, at an air rate of 425 slm (15 scfm), as compared to an impact zone of 71 cm (28 in) with the same air rate without the skirt. The impact zone was increased in proportion to the size of the skirt.

Figure 22:
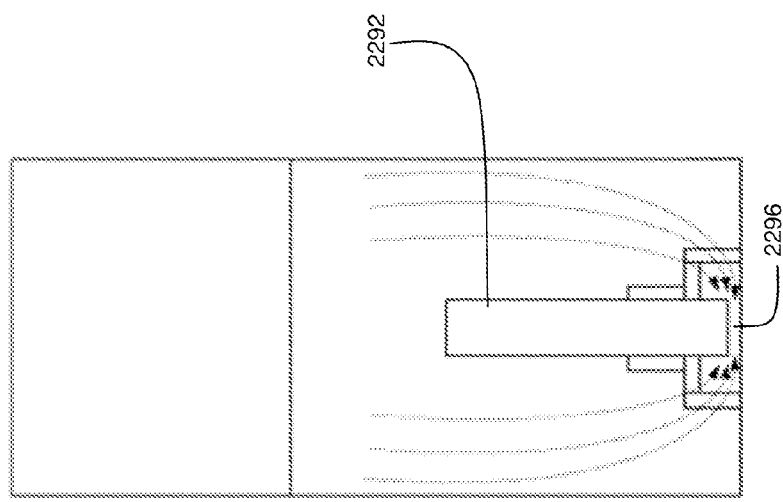
FIG. 22 is a schematic illustration of flow patterns using the gas lift suspension system of FIG. 21.

These draft tube configurations produced a flow pattern that is illustrated in FIG. 22 in which water and suspended granular activated carbon are drawn down and inwardly toward the inlet 2296 of draft tube 2290. Stagnant regions are also represented in FIG. 22.

In a further example, a smaller diameter and shorter draft tube was positioned inside a larger draft tube, both being 1.82 m (6 ft) in length with the inner draft tube mounted approximately 7.6 cm (3 in) from the bottom of the tank and the outer draft tube positioned 22.9 cm (9 in) higher than the inner draft tube. A polyvinyl chloride sheet extended from the bottom of the 15.3 cm (6 in) inner draft tube to create a 71 cm (28 in) diameter skirt. Plastic sheeting was attached to the top edge of the skirt and at a position approximately 12.7 cm (5 in) up the exterior surface of the 15.3 cm (6 in) diameter draft tube to form an inclined surface, or ramp. The modified draft tube was placed in the center of the 1.82 m (6 foot) diameter tank; the air rate was varied between 141 slm (5 scfm) and 425 slm (15 scfm).

The concentric tube produced an impact zone of approximately 112 cm (44 in), which was comparable to that of a single draft tube with a 71 cm (28 in) diameter flange skirt. In both configurations, the impact zone was approximately 112 cm (44 in).

The draft tube configuration of FIG. 21 was modified by replacing the 0.31 m (12 in) diameter draft tube with a single 15.3 cm (6 in) diameter draft tube. The air flow rate was again varied from 141 slm (5 scfm) and 425 slm (15 scfm), and the spacing between the bottom of the tank and the draft tube was tested at 8.3 cm (3.25 in) and 6.4 cm (2.5 in).

The results of these tests indicated that a variation in the spacing from 8.3 cm (3.25 in) and 6.4 cm (2.5 in) did not significantly change the diameter of the impact zone around the tube.

A two-fold increase in the air flow rate did not double the size of the impact zone. The condition that produced the largest impact zone was 425 slm (15 scfm) with a space of 8.3 cm (3.25 in) between the floor and draft tube. This configuration created an impact zone that was approximately 56 cm (22 in) in diameter, 20 cm (8 in) beyond the outside wall of the draft tube.

Based on the above tests, it can be concluded that for a given air rate, a larger diameter draft tube is more effective in suspending the granular activated carbon than a smaller draft tube within the ranges and sizes tested. It appears that more than one draft tube would be required to mix and suspend the granular activated carbon in a 1.82 m (6 foot) diameter tank. Although increasing the air rate did increase the rate of mixing and the size of the impact zone up to a point, doubling the air rate did not double the impact zone. The tank floor in an area approximately 20 cm (8 in) beyond the periphery of the draft tube, with or without a skirt or flange, was consistently cleared of granular activated carbon. Alternative constructions and/or supplemental mixing devices can be employed in the tank to push the granular activated carbon toward the draft tube impact zone(s).

In another configuration, and referring to FIG. 23, three evenly spaced 12 in diameter draft tubes 2392 were placed in a tank 2302 and secured to each other so that the center of each draft tube would be 0.61 m (24 in) from the center of the tank, with a distance of approximately 0.31 m (12 in) from the center of the draft tubes to the tank wall. Each draft tube was suspended approximately 7 cm (3 in) off the tank floor.

Air was uniformly supplied to each draft tube through 1 in diameter polyvinyl chloride pipes, each provided with two 3.2 millimeter (0.125 in) holes. The total air provided to all three of the draft tubes was 453 slm (16 scfm).

In order to supplement the mixing and movement of the granular activated carbon outside of the impact zones that formed directly adjacent to the three draft tubes, a water distribution system of 2.54 cm (1 in) polyvinyl chloride pipe with holes was fabricated for placement in the bottom of the tank. Holes were drilled approximately 32 cm (7 in) apart on alternating sides of the pipe so that the water would be directed towards the floor at a 45° angle. Water was supplied to the distribution system at 53 lpm (14 gpm) by a centrifugal pump from a separate water storage and recycling tank. This arrangement is analogous to the return water from the membrane operating system tank in a membrane bioreactor system. A second pump and valve controlled the flow of water back to the storage tank and a screen was used to retain granular activated carbon in the test tank.

It was observed that each draft tube cleared an area extending 20 cm (8 in) beyond the outside wall of the draft tube and that each hole in the water distributor system cleared an area 31-41 cm (12-16 in) long and 20-31 cm (8-12 in) wide. In the areas in between the impact zones of the draft tubes and water distributors, some granular activated carbon settled to the tank floor, but did slowly move into the impact zones where it was lifted into suspension.

In a further test of the water distribution system, the holes in the water distributor pipes were oriented to cause the water discharged to mix the tank in a circular pattern.

All other conditions including the spacing of the water distributor piping, air flow rate and water flow rate were the same as described in connection with the three 31 cm (12 in) diameter 91 cm (36 in) high draft tube in which membrane operating system return water was added uniformly to the tank.

The results from this test indicated that each draft tube cleared an area extending 20 cm (8 in) beyond the outside wall of the draft tube. Additionally, the water flow was effective at mixing the granular activated carbon in a circular pattern. The build up of granular activated carbon in the center of the tank can be eliminated by placing one draft tube in the center of the tank instead of three draft tubes around the perimeter.

It was observed that granular activated carbon was mixed to the top of the water level in the tank even when the length of the draft tubes was reduced from 152 cm (60 in) to 91 cm (36 in). Additionally, using water distributors to add return liquid to the bottom of the tank was effective to move the granular activated carbon around. When multiple draft tubes were placed inside of the tank, the size of the impact zone around each draft tube was equivalent to the size of the impact zone observed around a single draft tube, i.e., 20 cm (8 in) beyond the outer wall of the draft tube.

Figure 24:
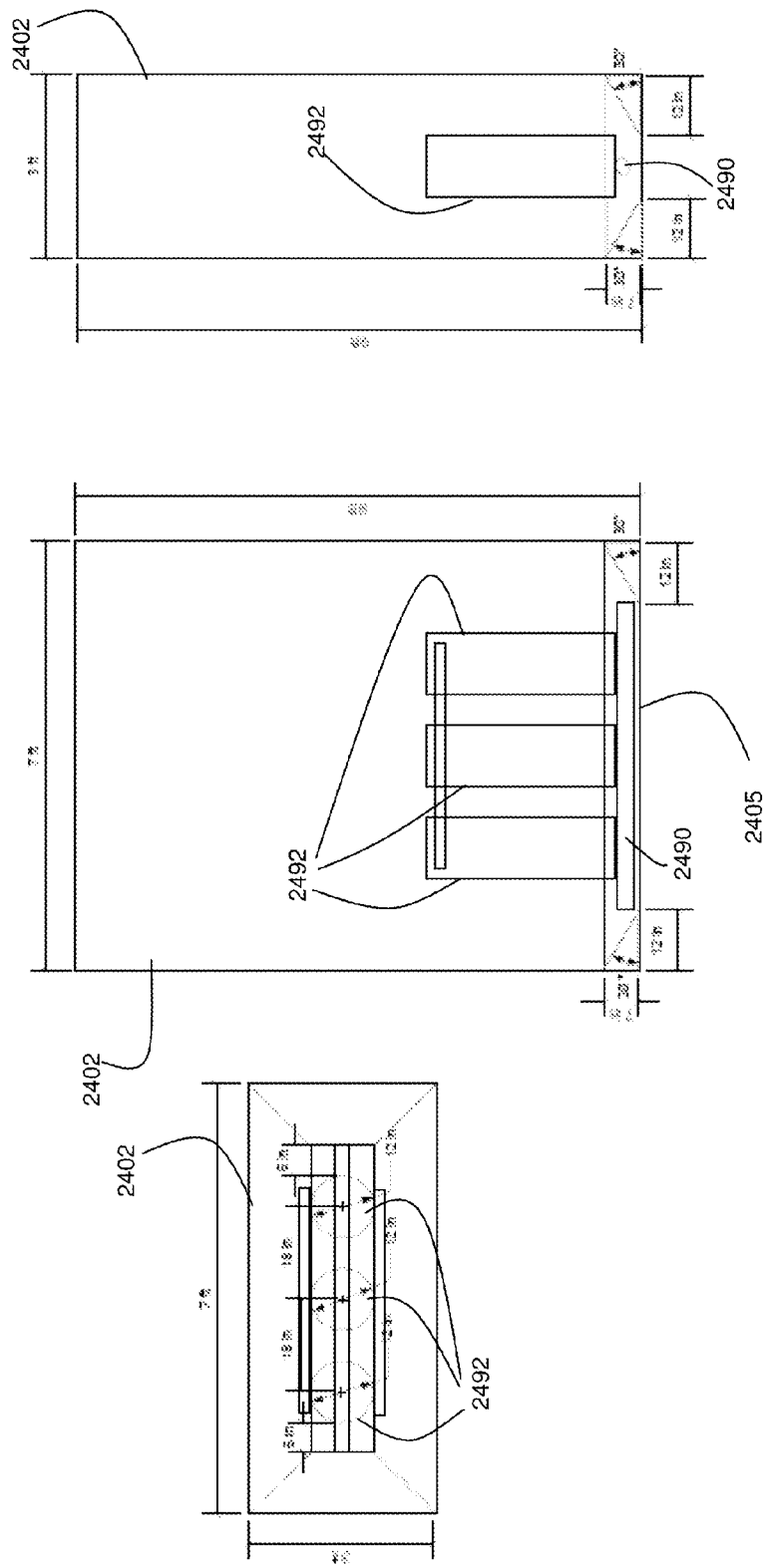
FIGS. 24 and 25 depict top, side sectional and end sectional views of embodiments of biological reactors using various configurations of gas lift suspension systems.

In another configuration, and referring to FIG. 24, and for comparison of the mixing characteristics with those of the circular tank, a rectangular tank 2402 was provided that was 0.91 m (3 ft) wide, 2.1 m (7 ft) long and 2.7 m (9 ft) deep, and was filled with 2.4 m (8 ft) of water. The blower, blower motor, and flow meter was set up and operated as discussed above.

As shown in FIG. 24, the outside 31 cm (12 in) of the tank floor 2405 was sloped at an angle of 30°, which had previously been determined to be the angle at which the granular activated carbon commenced to slide in an aqueous environment. The 30° angle of the sloping wall caused the granular activated carbon to be directed towards the draft tube inlets.

Three 31 cm (12 in) diameter draft tubes 2492, each 91 cm (36 in) high and supported approximately 12.7 cm (5 in) off of the bottom of the tank, were evenly spaced across the non-sloped portion of the tank 2402. A 7.6 cm (3 in) diameter air pipe 2490 having drilled openings was positioned below the draft tubes for introduction of air into the draft tubes via three coarse bubble diffusers. The air flow rate was varied from 221 slm (7.8 scfm) to 512 slm (18.1 scfm).

The granular activated carbon was satisfactorily mixed at all of the air rates employed in the range. The higher the air rate, the more vigorous the mixing flow, and the less time the granular activated carbon remained on the floor of the tank. During air addition, granular activated carbon was observed to be present throughout all depths of the tank.

Figure 25:
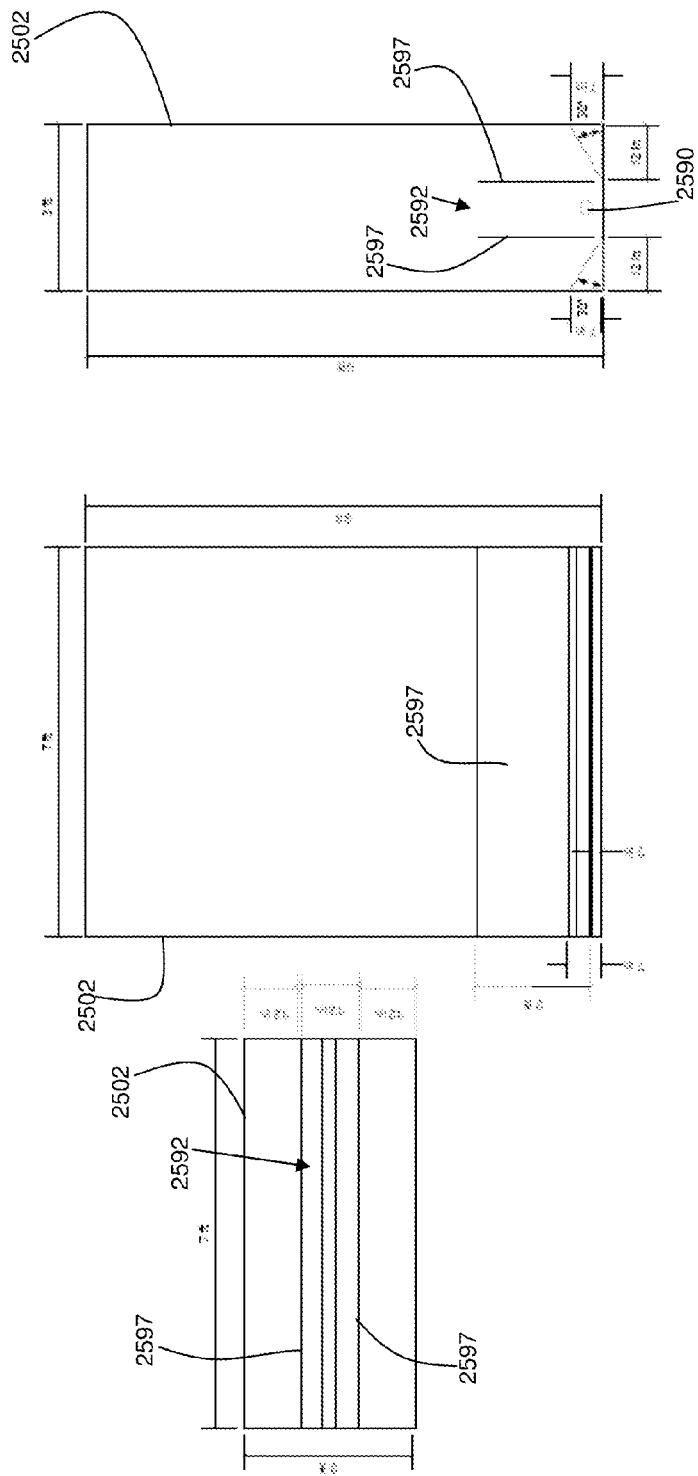

In another configuration, and with reference now to FIG. 25, a tank 2502 was provided having sloping walls and diffuser described above in connection with FIG. 24, with the addition of two parallel baffles 2597 that were 61 cm (24 in) high, spaced 31 cm (12 in) apart and positioned 6.4 cm (2.5 in) above the tank floor to form a "draft trough" 2592. The air flow rate through pipe 2590 was varied from 90.6 slm (3.2 scfm) to 331.3 slm (11.7 scfm). It was observed that the granular activated carbon was mixed and suspended well at all air rates greater than 141.6 slm (5 scfm), and increasing the air rate to above 141.6 slm (5 scfm) increased the rate of mixing.

In a further test in which the tank floor and diffuser configurations were identical to the tests described with respect to FIGS. 24 and 25, without a draft trough or draft tubes, it was found that at even 1133 slm (40 scfm), there was visibly less than 10% of the granular activated carbon in suspension, indicating that the presence of the trough is a very significant factor in the energy-efficient suspension of the granular activated carbon.

In another test configuration, the distance from the tank walls to the trough was increased. In a large aeration basin, it would be economically beneficial to be able to space the troughs apart at greater distances. A test was performed to determine the efficacy of extending the spacing between troughs to 2.1 m (7 ft). To determine this, the configuration described above and with respect to FIG. 25 was rotated 90° in the tank. Two 30° sloping walls were installed that extended 91 cm (36 in) from each end of the tank.

A coarse bubble diffuser was fabricated by drilling nine 3.2 millimeter (0.125 in) diameter holes evenly spaced along the 91 cm (36 in) of a 7.6 cm (3 in) diameter polyvinyl chloride pipe. The air flow rate was varied from 164 slm (5.8 scfm) to 402 slm (14.2 scfm).

The bubble diffuser was placed in the center of the tank. A trough was created between the two sloping tank walls around the diffuser pipe using two parallel baffles that were 91 cm (36 in) long, 61 cm (24 in) high, spaced 31 cm (12 in) apart and 6.4 cm (2.5 in) above the tank floor.

It was observed that the granular activated carbon was mixed and suspended well over the entire air rate range. The granular activated carbon was swept down the slope and into the draft trough which indicated that the spacing of the troughs could be up to 2.1 m (7 ft) apart with a 30° sloped floor between them.

Testing as described above indicated that the draft trough design was successful at suspending the granular activated carbon in the 0.91 m (3 foot) wide, 2.1 m (7 foot) long by 2.4 m (8 foot) volume of water using a 30° sloped floor or wall that extended from the vertical outside walls toward the draft trough.

Additional tests were performed using a 91 cm (36 in) long trough as described above with different configurations of the tank floor to further optimize the energy-efficient performance to suspend the granular activated carbon. The configurations included removing the sloped floor entirely, sloping the floor from the outside wall to the trough and reducing the angle from 30° to 15°, and decreasing the length of the sloped floor from 91 cm (36 in) on each end of the tank to 31 cm (12 in) on each end while maintaining the 30° angle. In addition, a test was performed in which the tank was configured with two 91 cm (36 in) long troughs at each end of the tank without a sloped floor. In each of these configurations the air flow rate was varied between 141 slm (5 scfm) to 425 slm (15 scfm).

Two draft troughs were installed on each end of a pilot aeration tank. The troughs were created by placing a 91 cm (36 in) coarse bubble diffuser at each end of the tank. The diffuser was fabricated from 7.6 cm (3 in) polyvinyl chloride pipe having 5 evenly spaced 3.2 millimeter (0.125 in) holes. Approximately 20 cm (8 in) away from the wall, i.e., 6 in from the center of the diffuser, a 91 cm (36 in) long and 61 cm (24 in) high baffle plate was mounted approximately 5.1 cm (2 in) off the tank floor.

From the testing that was performed in the rectangular pilot scale aeration tank, it was observed that adding three 31 cm (12 in) diameter, 91 cm (36 in) high draft tubes over the diffuser suspended the granular activated carbon at air rates between 227 slm (8 scfm) and 510 slm (18 scfm). However, this configuration could result in the formation of stagnant zones near the supports and in the corners of the tank. Placing a 2.1 m (7 foot) long draft trough in the center of the tank and sloping the floors at a 30° angle produced thoroughly mixing and suspension of granular activated carbon in the tank at air rates above 141 slm (5 scfm). Further testing indicated that adequate mixing can be obtained with the draft troughs spaced up to 2.1 m (7 ft) apart.

In the above-described configurations using draft tubes, there appeared to be a diminishing return from increasing the air rate. Increasing the air rate did increase the rate of mixing and the size of the impact zone. However, doubling the air rate did not double the impact zone. The impact zone for each draft tube appeared to extend approximately 20 cm (8 in) beyond the outside edge of the tube. Beyond this region, supplemental local mixing of the material in the tank was required to move the granular activated carbon on the tank floor toward and into the draft tube impact zone. A water distribution system was used to accomplish this mixing.

Granular activated carbon was suspended at all depths of the tank even when the length of the draft tube was reduced from 152 cm (60 in) to 91 cm (36 in). Sloping the floor of the tank at a 30° angle towards the draft tubes or troughs provides an effective method of circulating the granular activated carbon. The use of draft troughs and a sloped floor provided complete mixing of the granular activated carbon in the rectangular shaped tank and was less susceptible to formation of stagnant zones than using draft tubes. The draft trough was effective at lifting granular activated carbon off of the tank floor. Once the granular activated carbon was lifted above the trough, the mixing created by the coarse bubble diffusers was sufficient to lift the granular activated carbon to the top of the tank. Test results indicated that utilizing a 30° sloped surface allowed the center of the troughs to be spaced 2.1 m (7 ft) apart, and greater spacing may be possible.

Example 6

A wastewater treatment system designed substantially in accordance with one or more embodiments of the invention described above and illustrated in the figures comprises a first biological reactor, and a second biological reactor that includes granular activated carbon positioned downstream of the first biological reactor. A membrane operating system is positioned downstream of the biological reactors. Operational parameters such as flow rates, residence times, temperature, pH levels, and amount of granular activated carbon present in the system are adjusted to identify conditions for optimum performance, and provide acceptable levels of biological oxygen demand and chemical oxygen demand compounds exiting the system in the effluent. The hydraulic flow between the first reactor and the second reactor is controlled to provide a flow in the downstream direction and to maintain the granular activated carbon in the second reactor.

During operation, a wastewater stream is introduced into the first biological reactor. Phosphorus, nitrogen, and/or pH adjustment materials are added as needed to maintain optimal nutrient ratios and pH levels in the first reactor. The microorganisms in the first reactor are capable of breaking down at least a portion of the biologically labile organics in the wastewater and reduce the biological oxygen demand compounds in the effluent to an acceptable level. The second biological reactor which contains the granular activated carbon is used to treat the biologically refractory and bio-inhibitory compounds in the wastewater and reduces the chemical oxygen demand compounds in the effluent to an acceptable level.

The granular activated carbon is maintained in suspension in the second reactor using a suspension system. A screen is positioned in the second reactor to maintain the membrane operating system substantially free of granular activated carbon. The granular activated carbon is added to the second reactor as needed, based on biological oxygen demand and chemical oxygen demand compounds measured in the effluent.

Effluent from the second reactor is introduced to the membrane operating system after passing through the screen. In the membrane operating system, the treated wastewater will pass through one or more membranes. The membrane permeate will be discharged through an outlet of the membrane operating system. The retentate, including activated sludge, will be returned to the first reactor through a return activated sludge line.

Spent granular activated carbon from the second biological reactor is removed periodically through a mixed liquor waste discharge port. A waste outlet is also connected to the return activated sludge line to divert some or all of the return activated sludge for disposal, for instance, to control the concentration of components in the reactor.

The system includes a controller to monitor and adjust the system as desired. The controller directs any of the parameters within the system depending upon the desired operating conditions and desired quality of the effluent streams. The controller adjusts or regulates valves, feeders or pumps associated with each potential flow, based upon one or more signals generated by sensors or timers positioned within the system, or based upon an upward or downward trend in a characteristic or property of the system monitored over a predetermined period of time. The sensor generates a signal that can indicate that the concentration of pollutants such as biologically refractory/inhibitory organic and inorganic compounds has reached a predetermined value or trend, which triggers the controller to initiate a corresponding predetermined action upstream from, downstream from, or at the sensor. This action can include any one or more of adding granular activated carbon to the biological reactor, adding a different type of adsorbent material, adjusting flow of the wastewater to a reactor within the system, redirecting flow of the wastewater to a storage tank within the system, adjusting air flow within a biological reactor, adjusting residence time within a biological reactor, and adjusting temperature and/or pH within a biological reactor.

In order to achieve the predetermined levels of biological oxygen demand and chemical oxygen demand compounds in the effluent, the first and second reactors are operated with their own hydraulic residence times. The hydraulic residence time of the first and second reactors are varied to determine the optimum ratio of first reactor hydraulic residence time to second reactor hydraulic residence time. The total hydraulic residence time of the system should be equal to, or less than a standard single biological reactor, e.g., between about 8 and 12 hours. In a preferred mode of operation, the first reactor will have a hydraulic residence time of between about 4 hours and about 8 hours, while the second reactor will have a hydraulic residence time of about 4 hours. Generally the hydraulic residence time of the first reactor will be longer than the hydraulic residence time of the second reactor; however, the relative times will vary depending on the type of wastewater being treated. The hydraulic residence time and the flow rates of the system are used to determine the size of each reactor in accordance with standard practices in the art. The effluent from the system should be lower in chemical oxygen demand compounds by at least about 10% when compared with the effluent from a standard single biological reactor. Additionally, in a preferred embodiment, the regeneration of the granular activated carbon is accomplished through use of this system.

Example 7

A bench scale system to simulate activated sludge treatment followed by a combined activated sludge/granular activated carbon treatment was constructed and tested. This test was performed to determine the effectiveness of using granular activated carbon in a biological reactor (the second stage reactor) downstream of a biological reactor without granular activated carbon (first stage reactor).

The first stage reactor was a 4 liter (1.06 gal) tank that contained only activated sludge. A fine bubble air diffuser was used having an air flow rate of 370 $cm^3$/min (23 $in^3$/min). The second stage reactor was a 3 liter (0.79 gal) tank that contained activated sludge and a coal based granular activated carbon (AquaCarb® Carbon of Siemens Water Technologies Corp.). The granular activated carbon had a U.S. standard mesh size of 8×30. The concentration of granular activated carbon in the second stage reactor was 20 g/l (20 oz/cf). A draft tube comprising 5.1 cm (2 inches) diameter PVC piping was set up in the second stage reactor having a diameter of 12.7 cm (5 inches) to maintain the granular activated carbon in suspension with an air flow rate of 368 slm (13 scfm). The mixed liquor suspended solids concentration in the first stage reactor was about 3,470 mg/l (3.5 oz/cf) while the concentration in the second stage reactor was about 16,300 mg/l (16.3 oz/cf). The hydraulic retention time of the first stage reactor was about 6 hours and the hydraulic retention time of the second stage reactor was about 8 hours for a total system hydraulic time of about 14 hours.

The system was operated for over 30 days. The average feed concentration of soluble COD entering the first stage reactor was 130 mg/l (0.13 oz/cf) and the average soluble COD concentration of the effluent of the first stage reactor was 70 mg/l (0.07 oz/cf) and was the feed for the second stage reactor. The average soluble COD concentration measured in the effluent of the second stage reactor was 62 mg/l ((0.062 oz/cf). This greater than 10% reduction in soluble COD by the second stage reactor demonstrates the utility of processing wastewater in a system having a biological reactor containing granular activated carbon downstream of a first biological reactor without granular activated carbon.

Other aspects of the invention described herein, including a separation subsystem in the second stage reactor and use of a membrane operating system downstream of the second stage reactor, are applicable to the apparatus described in this example to achieve effective treatment of wastewater.

The method and apparatus of the present invention have been described above and in the attached drawings; however, modifications will be apparent to those of ordinary skill in the art and the scope of protection for the invention is to be defined by the claims that follow.

The invention claimed is:

1. A wastewater treatment system comprising:
   a biological reactor comprising a separation subsystem constructed and arranged to maintain adsorbent material in the biological reactor with a mixed liquor, the separation subsystem including a settling zone comprising a first baffle and a second baffle positioned and dimensioned to define a quiescent zone in which the adsorbent material separates from mixed liquor and settles into the mixed liquor in a lower portion of the biological reactor;
   a gas lift suspension system positioned in the biological reactor, the suspension system constructed and arranged to maintain adsorbent material in suspension with the mixed liquor; and
   a membrane operating system located downstream of the biological reactor that is constructed and arranged to receive treated mixed liquor from the biological reactor and discharge a membrane permeate.

2. The wastewater treatment system of claim 1, wherein the gas lift suspension system comprises at least one draft tube positioned in the biological reactor and a gas conduit having one or more apertures positioned and dimensioned to direct gas to an inlet end of the draft tube.

3. The wastewater treatment system of claim 1, wherein the gas lift suspension system comprises at least one draft trough positioned in the biological reactor and a gas conduit having one or more apertures positioned and dimensioned to direct gas to a lower portion of the draft trough.

4. The wastewater treatment system of claim 3, wherein the draft trough is formed by a pair of baffles positioned in the biological reactor.

5. The wastewater treatment system of claim 1, wherein the separation subsystem includes a screen positioned at an outlet of the biological reactor.

6. The wastewater treatment system of claim 1, further comprising a screen positioned proximate the outlet of the biological reactor.

7. The wastewater treatment system of claim 1, further comprising a weir positioned proximate the outlet of the biological reactor.

8. The wastewater treatment system of claim 1, further comprising:
- an adsorbent material introduction apparatus in communication with the biological reactor;
- a sensor constructed and arranged to measure a parameter of the system; and
- a controller in electronic communication with the sensor programmed to instruct performance of an act based on the measured parameter of the system.

9. The wastewater treatment system of claim 8, wherein the measured parameter is the concentration of one or more predetermined compounds.

10. The wastewater treatment system of claim 8, wherein the act comprises removing at least a portion of the adsorbent material from the biological reactor.

11. The wastewater treatment system of claim 8, wherein the act comprises adding adsorbent material to the biological reactor.

12. A wastewater treatment system comprising:
- a first biological reaction zone constructed and arranged to receive and treat the wastewater;
- a second biological reaction zone including a separation subsystem, the second biological reaction zone constructed and arranged to receive effluent from the first biological reaction zone and the separation subsystem constructed and arranged to maintain an adsorbent material in the second biological reaction zone with the effluent from the first biological reaction zone, the separation subsystem including a settling zone comprising a first baffle and a second baffle positioned and dimensioned to define a quiescent zone in which the adsorbent material separates from mixed liquor and settles into the mixed liquor in a lower portion of the biological reactor;
- a gas lift suspension system constructed and arranged to maintain the adsorbent material in the second biological reaction zone; and
- a membrane operating system located downstream of the second biological reaction zone that is constructed and arranged to receive treated wastewater from the second biological reaction zone and discharge a membrane permeate.

13. The wastewater treatment system of claim 12, wherein the first biological reaction zone and the second biological reaction zone are segregated sections of the same vessel.

14. The wastewater treatment system of claim 12, wherein the first biological reaction zone and the second biological reaction zone are located in separate vessels.

15. The wastewater treatment system of claim 12, wherein the separation subsystem further includes a screen positioned at an outlet of the second biological reaction zone.

16. The wastewater treatment system of claim 12, wherein the separation subsystem further comprises a screen positioned proximate the outlet of the second biological reaction zone.

17. The wastewater treatment system of claim 12, wherein the separation subsystem further comprises a weir positioned proximate the outlet of the second biological reaction zone.

18. The wastewater treatment system of claim 12, wherein the first biological reaction zone and the second biological reaction zone are constructed and arranged to support biological oxidation.

19. The wastewater treatment system of claim 12, further comprising an anoxic zone upstream of the first biological reaction zone.

20. The wastewater treatment system of claim 12, wherein the gas lift suspension system comprises at least one draft tube positioned in the second biological reaction zone and a gas conduit having one or more apertures constructed and arranged to direct gas to an inlet end of the draft tube.

21. The wastewater treatment system of claim 12, wherein the gas lift suspension system comprises at least one draft trough positioned in the second biological reaction zone and a gas conduit having one or more apertures constructed and arranged to direct gas to a lower portion of the draft trough.

22. The wastewater treatment system of claim 21, wherein the draft trough is formed by at least two baffles positioned in the second biological reaction zone.

23. The wastewater treatment system of claim 12, further comprising
- a source of adsorbent material introduction apparatus in communication with the second biological reaction zone;
- a sensor constructed and arranged to measure a parameter of the system; and
- a controller in electronic communication with the sensor and programmed to instruct performance of an act based on the measured parameter of the system.

24. The wastewater treatment system of claim 23, wherein the measured parameter is the concentration of at least one predetermined compounds.

25. The wastewater treatment system of claim 23, wherein the act comprises removing at least a portion of the adsorbent material from the second biological reaction zone.

26. The wastewater treatment system of claim 23, wherein the act comprises adding adsorbent material to the second biological reaction zone.

27. A wastewater treatment system comprising:
- a biological reactor comprising a separation subsystem constructed and arranged to maintain adsorbent material in the biological reactor with a mixed liquor;
- a gas lift suspension system positioned in the biological reactor, the suspension system constructed and arranged to maintain adsorbent material in suspension with the mixed liquor, the gas lift suspension system including at least a pair of baffles positioned in the biological reactor forming at least one draft trough positioned in the biological reactor, and a gas conduit having one or more apertures positioned and dimensioned to direct gas to a lower portion of the draft trough; and
- a membrane operating system located downstream of the biological reactor that is constructed and arranged to receive treated mixed liquor from the biological reactor and discharge a membrane permeate.

28. The wastewater treatment system of claim 27, wherein the separation subsystem includes a screen positioned at an outlet of the biological reactor.

29. The wastewater treatment system of claim 27, wherein the separation subsystem includes a settling zone located proximate the outlet of the biological reactor.

30. The wastewater treatment system of claim 29, wherein the settling zone comprises a first baffle and a second baffle positioned and dimensioned to define a quiescent zone in which the adsorbent material separates from mixed liquor and settles into the mixed liquor in a lower portion of the biological reactor.

31. The wastewater treatment system of claim 29, further comprising a screen positioned proximate the outlet of the biological reactor.

32. The wastewater treatment system of claim 29, further comprising a weir positioned proximate the outlet of the biological reactor.

33. The wastewater treatment system of claim 27, further comprising:
- an adsorbent material introduction apparatus in communication with the biological reactor;
- a sensor constructed and arranged to measure a parameter of the system; and
- a controller in electronic communication with the sensor programmed to instruct performance of an act based on the measured parameter of the system.

34. The wastewater treatment system of claim 33, wherein the measured parameter is the concentration of one or more predetermined compounds.

35. The wastewater treatment system of claim 33, wherein the act comprises removing at least a portion of the adsorbent material from the biological reactor.

36. The wastewater treatment system of claim 33, wherein the act comprises adding adsorbent material to the biological reactor.

37. A wastewater treatment system comprising:
- a first biological reaction zone constructed and arranged to receive and treat the wastewater;
- a second biological reaction zone including a separation subsystem, the second biological reaction zone constructed and arranged to receive effluent from the first biological reaction zone and the separation subsystem constructed and arranged to maintain an adsorbent material in the second biological reaction zone with the effluent from the first biological reaction zone;
- a gas lift suspension system constructed and arranged to maintain the adsorbent material in the second biological reaction zone, the gas lift suspension system including at least a pair of baffles positioned in the biological reactor forming at least one draft trough positioned in the biological reactor, and a gas conduit having one or more apertures positioned and dimensioned to direct gas to a lower portion of the draft trough; and
- a membrane operating system located downstream of the second biological reaction zone that is constructed and arranged to receive treated wastewater from the second biological reaction zone and discharge a membrane permeate.

38. The wastewater treatment system of claim 37, wherein the first biological reaction zone and the second biological reaction zone are segregated sections of the same vessel.

39. The wastewater treatment system of claim 37, wherein the first biological reaction zone and the second biological reaction zone are located in separate vessels.

40. The wastewater treatment system of claim 37, wherein the separation subsystem includes a screen positioned at an outlet of the second biological reaction zone.

41. The wastewater treatment system of claim 37, wherein the separation subsystem further comprises a screen positioned proximate the outlet of the second biological reaction zone.

42. The wastewater treatment system of claim 37, wherein the separation subsystem further comprises a weir positioned proximate the outlet of the second biological reaction zone.

43. The wastewater treatment system of claim 37, wherein the first biological reaction zone and the second biological reaction zone are constructed and arranged to support biological oxidation.

44. The wastewater treatment system of claim 37, further comprising an anoxic zone upstream of the first biological reaction zone.

45. The wastewater treatment system of claim 37, wherein the gas lift suspension system comprises at least one draft tube positioned in the second biological reaction zone and a gas conduit having one or more apertures constructed and arranged to direct gas to an inlet end of the draft tube.

46. The wastewater treatment system of claim 37, wherein the gas lift suspension system comprises at least one draft trough positioned in the second biological reaction zone and a gas conduit having one or more apertures constructed and arranged to direct gas to a lower portion of the draft trough.

47. The wastewater treatment system of claim 46, wherein the draft trough is formed by at least two baffles positioned in the second biological reaction zone.

48. The wastewater treatment system of claim 37, further comprising
- a source of adsorbent material introduction apparatus in communication with the second biological reaction zone;
- a sensor constructed and arranged to measure a parameter of the system; and
- a controller in electronic communication with the sensor and programmed to instruct performance of an act based on the measured parameter of the system.

49. The wastewater treatment system of claim 48, wherein the measured parameter is the concentration of at least one predetermined compounds.

50. The wastewater treatment system of claim 48, wherein the act comprises removing at least a portion of the adsorbent material from the second biological reaction zone.

51. The wastewater treatment system of claim 48, wherein the act comprises adding adsorbent material to the second biological reaction zone.

* * * * *